(12) United States Patent
Na et al.

(10) Patent No.: US 12,176,149 B2
(45) Date of Patent: Dec. 24, 2024

(54) MULTILAYER ELECTRONIC COMPONENT

(71) Applicant: SAMSUNG ELECTRO-MECHANICS CO., LTD., Suwon-si (KR)

(72) Inventors: Jae Young Na, Suwon-si (KR); Jin Hyung Lim, Suwon-si (KR); Sung Soo Kim, Suwon-si (KR); Seung Hun Han, Suwon-si (KR); Ji Hong Jo, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 79 days.

(21) Appl. No.: 17/953,923

(22) Filed: Sep. 27, 2022

(65) Prior Publication Data
US 2023/0215636 A1     Jul. 6, 2023

(30) Foreign Application Priority Data
Dec. 31, 2021 (KR) .......................... 10-2021-0193640

(51) Int. Cl.
| | |
|---|---|
| H01G 4/12 | (2006.01) |
| H01G 4/248 | (2006.01) |
| H01G 4/30 | (2006.01) |

(52) U.S. Cl.
CPC .......... *H01G 4/1236* (2013.01); *H01G 4/248* (2013.01); *H01G 4/30* (2013.01)

(58) Field of Classification Search
CPC .......... H01G 4/30; H01G 4/232; H01G 4/248; H01G 4/1236
USPC ......... 361/301.4, 306.3, 321.1, 321.3, 321.4, 361/311, 312
See application file for complete search history.

(56) References Cited

U.S. PATENT DOCUMENTS

| | | | |
|---|---|---|---|
| 10,366,834 B1 * | 7/2019 | Lee .......................... | H01G 4/012 |
| 2004/0240146 A1 * | 12/2004 | Kayatani ................ | H01G 2/103 |
| | | | 361/306.3 |
| 2009/0191418 A1 * | 7/2009 | Nakano .................... | H01C 7/18 |
| | | | 428/469 |

(Continued)

FOREIGN PATENT DOCUMENTS

| | | |
|---|---|---|
| JP | 2016-178219 A | 10/2016 |
| JP | 2017-59630 A | 3/2017 |
| KR | 10-2016-0064260 A | 6/2016 |

*Primary Examiner* — Arun Ramaswamy
(74) *Attorney, Agent, or Firm* — Morgan, Lewis & Bockius LLP

(57) ABSTRACT

A multilayer electronic component includes a body including first and second surfaces opposing each other in a first direction, and third and fourth surfaces connected to the first and second surfaces and opposing each other in a second direction; a first external electrode including a first connection portion disposed on the third surface, and a third band portion extending from the first connection portion to a portion of the second surface; a second external electrode including a second connection portion disposed on the fourth surface, and a fourth band portion extending from the second connection portion to a portion of the second surface; an insulating layer disposed on the first and second connection portions and covering the second surface and the third and fourth band portions; the insulating layer includes an oxide including zirconium (Zr).

39 Claims, 21 Drawing Sheets

(56) References Cited

U.S. PATENT DOCUMENTS

| | | | |
|---|---|---|---|
| 2012/0250217 A1* | 10/2012 | Fukunaga | H01G 4/012 361/301.4 |
| 2015/0070817 A1* | 3/2015 | Morita | C04B 35/465 361/301.4 |
| 2015/0223340 A1* | 8/2015 | Jung | H01G 4/008 156/89.12 |
| 2015/0364253 A1* | 12/2015 | Arnold | H05K 1/111 228/180.22 |
| 2016/0276104 A1 | 9/2016 | Nishisaka et al. | |
| 2017/0076864 A1 | 3/2017 | Okai | |
| 2017/0076865 A1* | 3/2017 | Tanaka | H01G 4/232 |
| 2018/0108479 A1* | 4/2018 | Sato | H01G 4/12 |
| 2019/0096583 A1* | 3/2019 | Sasaki | H01G 4/232 |
| 2019/0131076 A1* | 5/2019 | Fukumura | H01G 4/232 |
| 2020/0066444 A1* | 2/2020 | Yang | H01G 4/232 |
| 2020/0365326 A1* | 11/2020 | Masunari | H01G 2/065 |

\* cited by examiner

MULTILAYER ELECTRONIC COMPONENT

CROSS-REFERENCE TO RELATED APPLICATION(S)

This application claims benefit of priority to Korean Patent Application No. 10-2021-0193640 filed on Dec. 31, 2021 in the Korean Intellectual Property Office, the disclosure of which is incorporated herein by reference in its entirety.

TECHNICAL FIELD

The present disclosure relates to a multilayer electronic component.

BACKGROUND

A multilayer ceramic capacitor (MLCC), a multilayer electronic component, may be a chip-type capacitor which may be mounted on a printed circuit board of various types of electronic product such as an imaging device as a liquid crystal display (LCD) and a plasma display panel (PDP), a computer, and the like, smartphones and mobile phones and may charge or discharge electricity.

Such a multilayer ceramic capacitor may be used as a component of various electronic devices since a multilayer ceramic capacitor may have a relatively small size and high capacitance and may be easily mounted. As various electronic devices such as a computer and a mobile device have been miniaturized and have been designed to have high output, the demand for miniaturization and high capacitance of a multilayer ceramic capacitor has increased.

Also, as the interest in electronic components for vehicle has recently increased, a multilayer ceramic capacitor has also been required to have high reliability properties to be used in automobiles or an infotainment system.

For miniaturization and high capacitance of the multilayer ceramic capacitor, it may be necessary to increase the number of laminated layers by reducing thicknesses of internal electrodes and dielectric layers.

Also, it may be necessary to reduce a mounting space to mount a greater number of components within a limited area of a substrate.

Also, as a thickness of a margin decreases with miniaturization and high capacitance of a multilayer ceramic capacitor, permeation of external moisture and a plating solution may be facilitated, and accordingly, reliability may be weakened. Accordingly, a method for protecting a multilayer ceramic capacitor from permeation of external moisture or a plating solution may be necessary.

SUMMARY

An aspect of the present disclosure is to provide a multilayer electronic component having improved capacitance per unit volume.

An aspect of the present disclosure is to provide a multilayer electronic component having improved reliability.

An aspect of the present disclosure is to provide a multilayer electronic component having a reduced mounting space.

According to an aspect of the present disclosure, a multilayer electronic component includes a body including a dielectric layer and first and second internal electrodes alternately disposed with the dielectric layer interposed therebetween, and including first and second surfaces opposing each other in a first direction, third and fourth surfaces connected to the first and second surfaces and opposing each other in a second direction, and fifth and sixth surfaces connected to the first to fourth surfaces and opposing each other in a third direction; a first external electrode including a first connection portion disposed on the third surface, a first band portion extending from the first connection portion to a first portion of the first surface, and a third band portion extending from the first connection portion to a first portion of the second surface; a second external electrode including a second connection portion disposed on the fourth surface, a second band portion extending from the second connection portion to a second portion of the first surface, and a fourth band portion extending from the second connection portion to a second portion of the second surface; an insulating layer disposed on the first and second connection portions and covering the second surface and the third and fourth band portions, the insulating layer including a first oxide including zirconium (Zr); a first plating layer disposed on the first band portion; and a second plating layer disposed on the second band portion.

According to another aspect of the present disclosure, a multilayer electronic component includes a body including a dielectric layer and first and second internal electrodes alternately disposed with the dielectric layer interposed therebetween, and including first and second surfaces opposing each other in a first direction, third and fourth surfaces connected to the first and second surfaces and opposing each other in a second direction, and fifth and sixth surfaces connected to the first to fourth surfaces and opposing each other in a third direction; a first external electrode including a first connection portion disposed on the third surface and a first band portion extending from the first connection portion to a first portion of the first surface; a second external electrode including a second connection portion disposed on the fourth surface and a second band portion extending from the second connection portion to a second portion of the first surface; an insulating layer disposed on the second surface and extending to the first and second connection portions, the insulating layer including a first oxide including zirconium (Zr); a first plating layer disposed on the first band portion; and a second plating layer disposed on the second band portion.

According to another aspect of the present disclosure, a multilayer electronic component includes a body including a dielectric layer and first and second internal electrodes alternately disposed with the dielectric layer interposed therebetween, and including first and second surfaces opposing each other in a first direction, third and fourth surfaces connected to the first and second surfaces and opposing each other in a second direction, and fifth and sixth surfaces connected to the first to fourth surfaces and opposing each other in a third direction; a first external electrode including a first connection portion disposed on the third surface, a first band portion extending from the first connection portion to a first portion of the first surface, and a third band portion extending from the first connection portion to a first portion of the second surface; a second external electrode including a second connection portion disposed on the fourth surface, a second band portion extending from the second connection portion to a second portion of the first surface, and a fourth band portion extending from the second connection portion to a second portion of the second surface; an insulating layer disposed on the first and second connection portions and covering the second surface and the third and fourth band portions, the insulating layer including a first oxide including zirconium (Zr) and is substantially free of yttrium (Y); a first plating layer disposed on the first band portion; and a second plating layer disposed on the second band portion.

According to another aspect of the present disclosure, a multilayer electronic component includes a body including a dielectric layer and first and second internal electrodes alternately disposed with the dielectric layer interposed therebetween, and including first and second surfaces opposing each other in a first direction, third and fourth surfaces connected to the first and second surfaces and opposing each other in a second direction, and fifth and sixth surfaces connected to the first to fourth surfaces and opposing each other in a third direction; a first external electrode including a first connection portion disposed on the third surface and a first band portion extending from the first connection portion to a first portion of the first surface; a second external electrode including a second connection portion disposed on the fourth surface and a second band portion extending from the second connection portion to a second portion of the first surface; an insulating layer disposed on the second surface and extending to the first and second connection portions, the insulating layer including a first oxide including zirconium (Zr) and is substantially free of yttrium (Y); a first plating layer disposed on the first band portion; and a second plating layer disposed on the second band portion.

According to another aspect of the present disclosure, a multilayer electronic component includes a body including a dielectric layer and first and second internal electrodes alternately disposed with the dielectric layer interposed therebetween, and including first and second surfaces opposing each other in a first direction, third and fourth surfaces connected to the first and second surfaces and opposing each other in a second direction, and fifth and sixth surfaces connected to the first to fourth surfaces and opposing each other in a third direction; a first external electrode including a first connection portion disposed on the third surface, a first band portion extending from the first connection portion to a first portion of the first surface, and a first corner portion extending from the first connection portion to a corner connecting the second surface to the third surface; a second external electrode including a second connection portion disposed on the fourth surface, a second band portion extending from the second connection portion to a second portion of the first surface, and a second corner portion extending from the first connection portion to a corner connecting the second surface to the fourth surface; an insulating layer disposed on the first and second connection portions and covering the second surface and the first and second corner portions, the insulating layer including a first oxide including zirconium (Zr); a first plating layer disposed on the first band portion; and a second plating layer disposed on the second band portion, wherein, an average distance in the second direction from an extension line of the third surface to an end of the third band portion is defined as B3, an average distance in the second direction from an extension line of the fourth surface to an end of the fourth band portion is defined as B4, an average size of a region in which the third surface and the second internal electrode are spaced apart from each other, taken in the second direction, is defined as G1, and an average size of a region in which the fourth surface and the first internal electrode are spaced apart from each other, taken in the second direction, is defined as G2, and B3≤G1 and B4≤G2 are satisfied.

According to another aspect of the present disclosure, a multilayer electronic component includes a body including a dielectric layer and first and second internal electrodes alternately disposed with the dielectric layer interposed therebetween, and including first and second surfaces opposing each other in a first direction, third and fourth surfaces connected to the first and second surfaces and opposing each other in a second direction, and fifth and sixth surfaces connected to the first to fourth surfaces and opposing each other in a third direction; a first external electrode including a first connection electrode disposed on the third surface and a first band electrode disposed on the first surface and connected to the first connection electrode; a second external electrode including a second connection electrode disposed on the fourth surface and a second band electrode disposed on the first surface and connected to the second connection electrode; a first insulating layer disposed on the first connection electrode; a second insulating layer disposed on the second connection electrode; a first plating layer disposed on the first band electrode; and a second plating layer disposed on the second band electrode, wherein the first and second insulating layers include an oxide including zirconium (Zr).

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
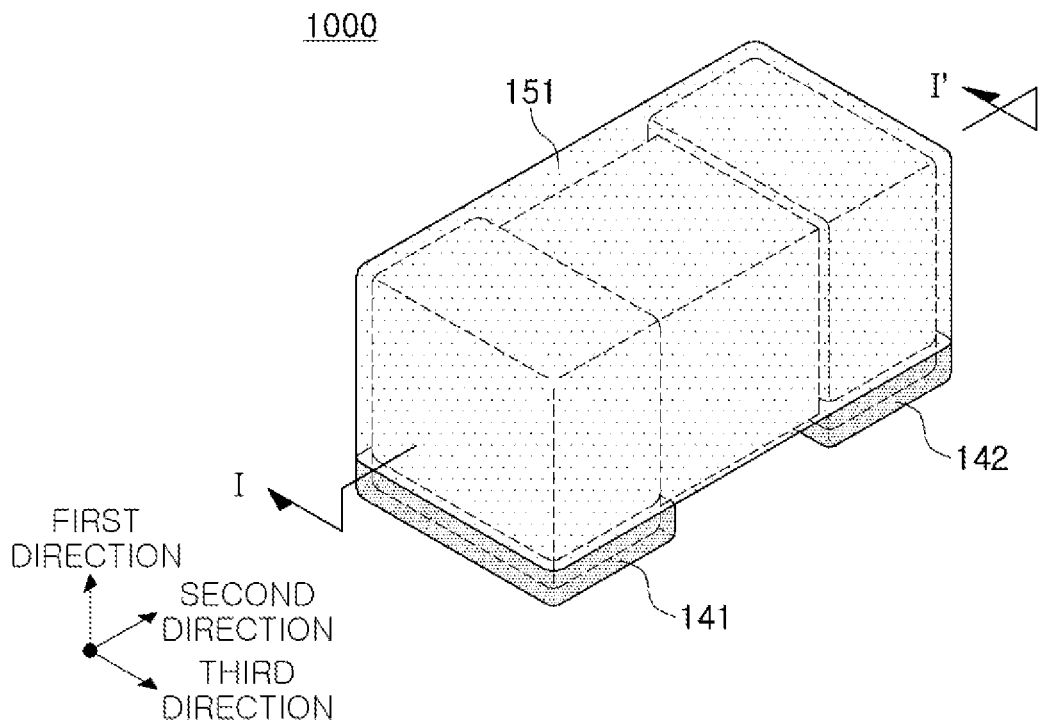
FIG. 1 is a perspective diagram illustrating a multilayer electronic component according to an example embodiment of the present disclosure.

Hereinafter, embodiments of the present disclosure will be described as below with reference to the attached drawings.

The present disclosure may, however, be exemplified in many different forms and should not be construed as being limited to the specific embodiments set forth herein. Rather, these embodiments are provided such that this disclosure will be thorough and complete, and will fully convey the scope of the disclosure to those skilled in the art. Accordingly, shapes and sizes of the elements in the drawings may be exaggerated for clarity of description. Also, elements having the same function within the scope of the same concept represented in the drawing of each example embodiment will be described using the same reference numeral.

In the drawings, the same elements will be indicated by the same reference numerals. Also, redundant descriptions and detailed descriptions of known functions and elements that may unnecessarily render the gist of the present disclosure obscure will not be provided. In the accompanying drawings, some elements may be exaggerated, omitted or briefly illustrated, and the sizes of the elements do not necessarily reflect the actual sizes of these elements. Also, it will be understood that when a portion "includes" an element, it may further include another element, not excluding another element, unless otherwise indicated.

In the drawings, a first direction may be defined as a laminating direction or a thickness (T) direction, a second direction may be defined as a length (L) direction, and a third direction may be defined as a width (W) direction.

FIG. 1 is a perspective diagram illustrating a multilayer electronic component according to an example embodiment.

Figure 2:
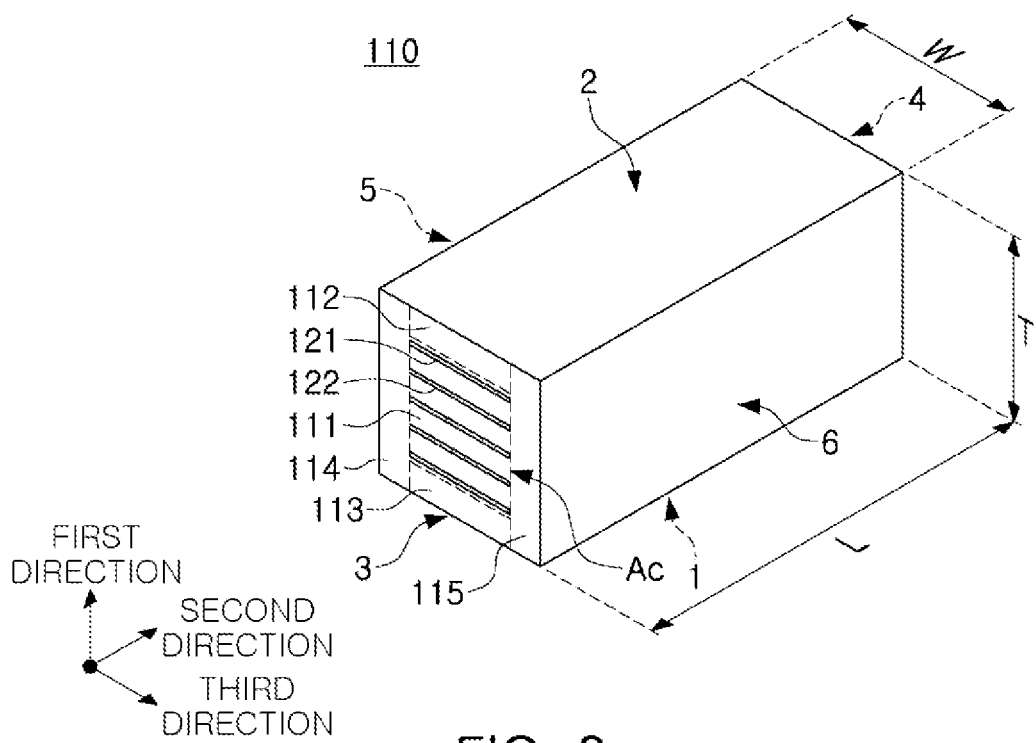
FIG. 2 is a perspective diagram illustrating a body of the multilayer electronic component in FIG. 1.

FIG. 2 is a perspective diagram illustrating a body of the multilayer electronic component in FIG. 1.

Figure 3:
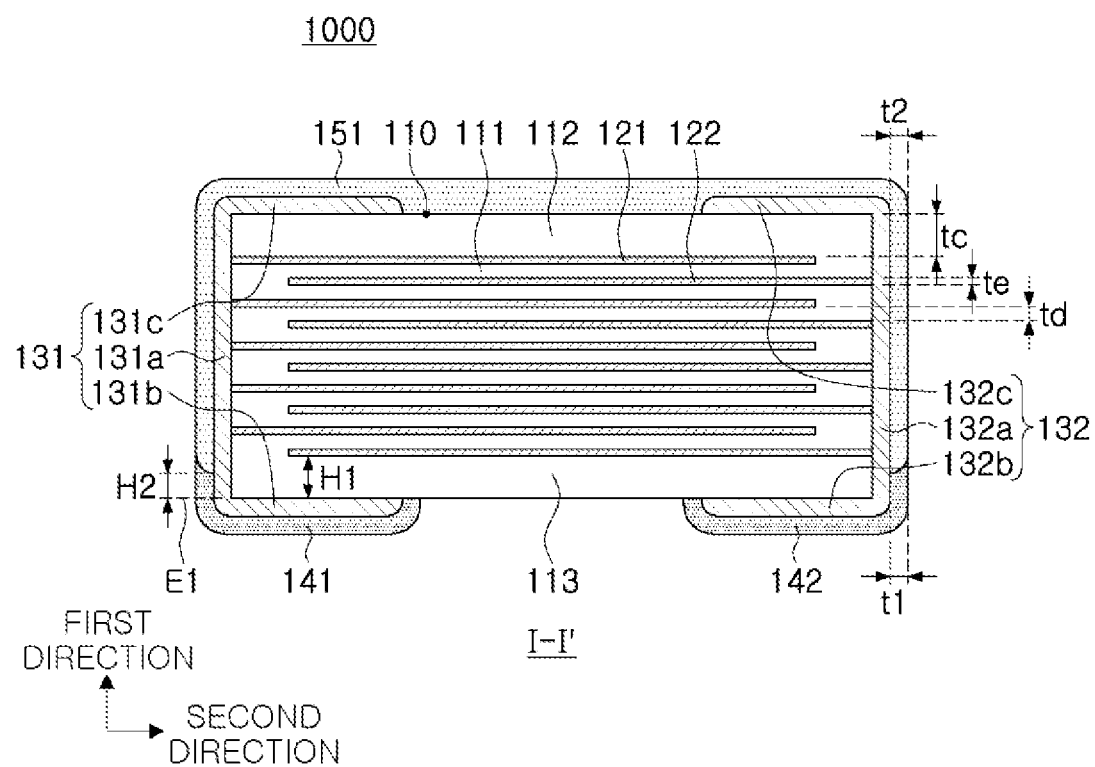
FIG. 3 is a cross-sectional diagram taken along line I-I' in FIG. 1.

FIG. 3 is a cross-sectional diagram taken along line I-I' in FIG. 1.

Figure 4:
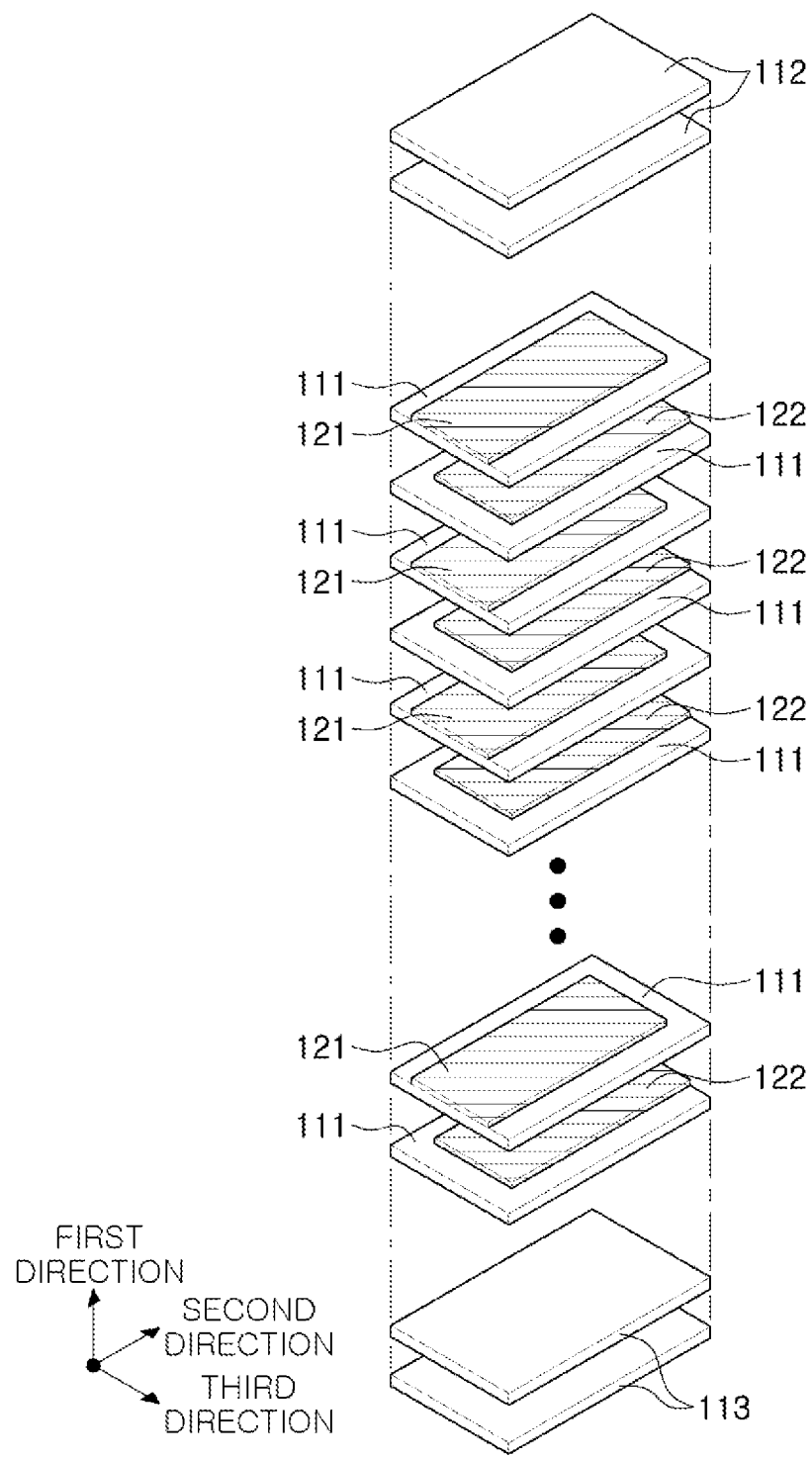
FIG. 4 is an exploded perspective diagram illustrating a body in FIG. 2.

FIG. 4 is an exploded perspective diagram illustrating a body in FIG. 2.

Figure 5:
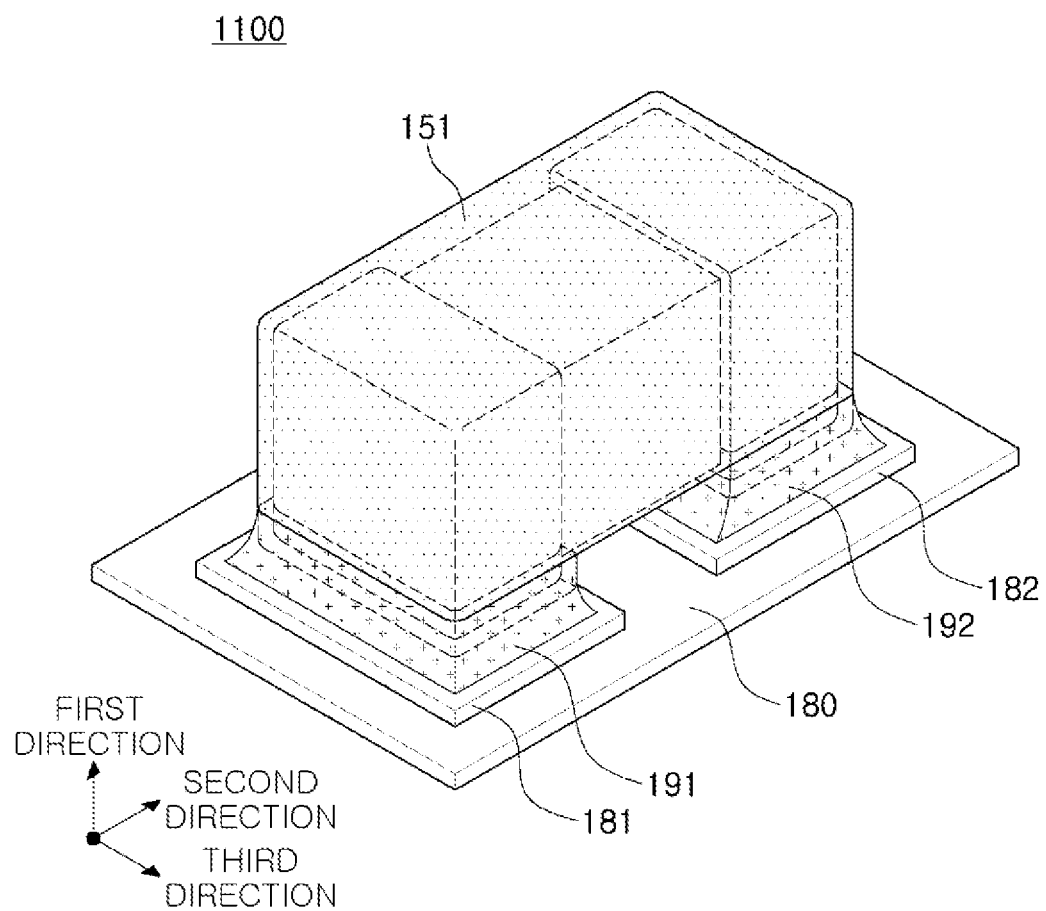
FIG. 5 is a perspective diagram illustrating a substrate on which a multilayer electronic component in FIG. 1 is mounted.

FIG. 5 is a perspective diagram illustrating a substrate on which a multilayer electronic component in FIG. 1 is mounted.

Hereinafter, a multilayer electronic component 1000 in an example embodiment will be described with reference to FIGS. 1 to 5.

The multilayer electronic component 1000 in an example embodiment may include a dielectric layer 111 and first and second internal electrodes 121 and 122 alternately disposed with the dielectric layer 111 interposed therebetween, and may further include a body 110 including first and second surfaces 1 and 2 opposing each other in the first direction, third and fourth surfaces 3 and 4 connected to the first and second surfaces 1 and 2 and opposing in the second direction, and fifth and sixth surfaces 5 and 6 connected to the first and second surfaces 1 and 2 and the third and fourth surfaces 3 and 4 and opposing each other in the third direction; a first external electrode including a first connection portion 131*a* disposed on the third surface, a first band portion 131*b* extending from the first connection portion to a first portion of the first surface, and a third band portion 131*c* extending from the first connection portion to a first portion of the second surface; a second external electrode 132 including a second connection portion 132*a* disposed on the fourth surface, a second band portion 132*b* extending from the second connection portion to a second portion of the first surface, and a fourth band portion 132*c* extending from the second connection portion to a second portion of the second surface; an insulating layer 151 disposed on the first and second connection portions and covering the second surface and the third and fourth band portions 131*c* and 132*c*; a first plating layer 141 disposed on the first band portion 131*b*; and a second plating layer 142 disposed on the second band portion 132*b*, and the insulating layer 151 may include an oxide including zirconium (Zr).

In the body 110, the dielectric layer 111 and the internal electrodes 121 and 122 may be alternately laminated.

The shape of the body 110 may not be limited to any particular shape, but as illustrated, the body 110 may have a hexahedral shape or a shape similar to a hexahedral shape. Due to reduction of ceramic powder included in the body 110 during a firing process, the body 110 may not have an exact hexahedral shape formed by linear lines but may have a substantially hexahedral shape.

The body 110 may have first and second surfaces 1 and 2 opposing each other in the first direction, third and fourth surfaces 3 and 4 connected to the first and second surfaces 1 and 2 and opposing in the second direction, and fifth and sixth surfaces 5 and 6 connected to the first and second surfaces 1 and 2 and the third and fourth surfaces 3 and 4 and opposing each other in the third direction.

In an example embodiment, the body 110 may have a first 1-3 corner connecting the first surface to the third surface, a 1-4 corner connecting the first surface to the fourth surface, a 2-3 corner connecting the second surface to the third surface and a 2-4 corner connecting the second surface to the fourth surface. The 1-3 corner and the 2-3 corner may have a form reduced (contracted) in a direction of a center of the body taken in the first direction toward the third surface, and the 1-4 corner and corner 2-4 may have a form reduced (contracted) in a direction of a center of the body taken in the first direction toward the fourth face.

As a margin region in which the internal electrodes 121 and 122 are not disposed may overlap the dielectric layer 111, a step difference may be formed due to the thickness of the internal electrodes 121 and 122, and accordingly, the corner connecting the first surface to the third to sixth surfaces and/or the corner connecting the second surface to the third to the fifth surface may have a form reduced (contracted) in a direction of a center of the body taken in the first direction with respect to the first surface or the second surface. Alternatively, a corner connecting the first surface 1 to the third to sixth surfaces 3, 4, 5, and 6 and/or a corner connecting the second surface 2 to the third to sixth surfaces 3, 4, 5, and 6 may have a form reduced (contracted) in a direction of a center of the body taken in the first direction with respect to the first surface or the second surface. Alternatively, as the corners connecting the surfaces of the body 110 are rounded by performing a separate process to prevent chipping defects, or the like, the corners connecting the first and third to sixth surfaces and/or the corner connecting the second surface to the third to sixth surfaces may have a rounded shape.

The corner may include a first 1-3 corner connecting the first surface to the third surface, a 1-4 corner connecting the first surface to the fourth surface, a 2-3 corner connecting the second surface to the third surface and a 2-4 corner connecting the second surface to the fourth surface. Also, the corners may include a 1-5 corner connecting the first surface to the fifth surface, a 1-6 corner connecting the first surface to the sixth surfaces, a 2-5 corner connecting the second surface to the fifth surface, and a 2-6 corner connecting the second surface to the sixth surface. The first to sixth surfaces of the body 110 may be almost flat surfaces, and non-flat regions may be configured as corners. Hereinafter, an extension line of each surface may refer to a line extended with respect to a flat portion of each surface.

In this case, the region disposed on the corner of the body 110 in the external electrodes 131 and 132 may be a corner portion, the region disposed on the third and fourth surfaces of the body 110 may be a connection portion, and the region disposed on the first and second surfaces of the body may be a band portion.

To prevent a step difference caused by the internal electrodes 121 and 122, after lamination, when the internal electrodes are cut to be exposed to the fifth and sixth surfaces 5 and 6 of the body, a single dielectric layer or two or more dielectric layers may be laminated on both side surfaces of the capacitance formation portion Ac in the third direction (width direction) to form margin portions 114 and 115, the portion connecting the first surface to the fifth and sixth surfaces and the portion connecting the second surface to the fifth and sixth surfaces may not have a reduced form.

The plurality of dielectric layers 111 forming the body 110 may be in a fired state, and a boundary between the adjacent dielectric layers 111 may be integrated with each other such that the boundary may not be distinct without using a scanning electron microscope (SEM).

In an example embodiment, a raw material for forming the dielectric layer 111 is not limited to any particular example as long as sufficient capacitance may be obtained. For example, a barium titanate material, a lead composite perovskite material, or a strontium titanate material may be used. The barium titanate material may include $BaTiO_3$ ceramic powder, and an example of the ceramic powder may include $(Ba_{1-x}Ca_x)TiO_3$ ($0<x<1$), $Ba(Ti_{1-y}Ca_y)O_3$ ($0<y<1$), $(Ba_{1-x}Ca_x)(Ti_{1-y}Zr_y)O_3$ ($0<x<1$, $0<y<1$) or $Ba(Ti_{1-y}Zr_y)O_3$ ($0<y<1$) in which Ca (calcium), Zr (zirconium) is partially solid-solute.

Also, various ceramic additives, organic solvents, binders, dispersants, or the like, may be added to a raw material for forming the dielectric layer 111 in the example embodiment to powder such as barium titanate ($BaTiO_3$).

The average thickness td of the dielectric layer 111 is not limited to any particular example.

However, generally, when the dielectric layer has a thickness of less than 0.6 μm, which is relatively thin, in particular, when the thickness of the dielectric layer is 0.35 μm or less, reliability may decrease.

In an example embodiment, by disposing an insulating layer on the connection portion of the external electrode, and disposing the plating layer on the band portion of the external electrode, permeation of external moisture and the plating solution may be prevented, such that reliability may improve. Accordingly, excellent reliability may be ensured even when the average thickness of the dielectric layer 111 is 0.35 μm or less.

Accordingly, when the average thickness of the dielectric layer 111 is 0.35 μm or less, the effect of improving reliability in the example embodiment may improve.

The average thickness td of the dielectric layer 111 may refer to an average thickness of the dielectric layer 111 disposed between the first and second internal electrodes 121 and 122.

The average thickness of the dielectric layer 111 may be measured by scanning a cross-sectional surface of the body 110 taken in the length and thickness direction (L-T) using a scanning electron microscope (SEM) at 10,000× magnification. More specifically, an average value may be measured by measuring thicknesses of 30 points of the dielectric layer, spaced apart by an equal distance, on the scanned image in the length direction. The 30 points spaced apart by an equal distance may be designated in the capacitance formation portion Ac. Also, when the measuring of the average value is extended to 10 dielectric layers and measuring an average value thereof, the average thickness of the dielectric layers may be further generalized.

The body 110 may include the capacitance formation portion Ac disposed in the body 110 and including the first internal electrode 121 and the second internal electrode 122 opposing each other with the dielectric layer 111 interposed therebetween, and cover portions 112 and 113 formed on upper and lower portions of the capacitance formation portion Ac in the first direction.

Also, the capacitance formation portion Ac may contribute to the formation of capacitance of the capacitor, and may be formed by alternately laminating the plurality of first and second internal electrodes 121 and 122 with the dielectric layer 111 interposed therebetween.

The cover portions 112 and 113 may include an upper cover portion 112 disposed on the capacitance formation portion Ac in the first direction and a lower cover portion 113 disposed below the capacitance formation portion Ac in the first direction.

The upper cover portion 112 and the lower cover portion 113 may be formed by laminating a single dielectric layer or two or more dielectric layers on the upper and lower surfaces of the capacitance formation portion Ac in the thickness direction, respectively, and may prevent damages to the internal electrodes caused by physical or chemical stress.

The upper cover portion 112 and the lower cover portion 113 may not include an internal electrode, and may include the same material as that of the dielectric layer 111.

That is, the upper cover portion 112 and the lower cover portion 113 may include a ceramic material, such as, for example, a barium titanate ($BaTiO_3$) ceramic material.

The average thickness of the cover portions 112 and 113 is not limited to any particular example. However, to easily implement miniaturization and high capacitance of the multilayer electronic component, the average thickness tc of the cover portions 112 and 113 may be 15 μm or less. Also, in an example embodiment, by disposing the insulating layer on the connection portion of the external electrode and the plating layer on the band portion of the external electrode, permeation of external moisture and a plating solution may be prevented such that reliability may improve. Accordingly, excellent reliability may be ensured even when the average thickness tc of the cover portions 112 and 113 is 15 μm or less.

The average thickness tc of the cover portions 112 and 113 may refer to a size in the first direction, and may be an average value of thicknesses of five points of the cover portions 112 and 113, spaced apart by an equal distance, in the first direction above or below the capacitance formation portion Ac. For example, the measurements may be taken by scanning the cross-section of the body 110 using a scanning electron microscope (SEM). Other methods and/or tools appreciated by one of ordinary skill in the art, even if not described in the present disclosure, may also be used.

Also, margin portions 114 and 115 may be disposed on a side surface of the capacitance formation portion Ac.

The margin portions 114 and 115 may include the first margin 114 disposed on the fifth surface 5 of the body 110 and the second margin 115 disposed on the sixth surface 6 of the body 110. That is, the margin portions 114 and 115 may be disposed on both end surfaces of the body 110 in the width direction.

The margin portions 114 and 115 may refer to a region of a boundary surface between both ends of the first and second internal electrodes 121 and 122 and the body on the cross-section of the body 110 taken in the width-thickness (W-T) direction.

The margin portions 114 and 115 may prevent damage to the internal electrodes caused by physical or chemical stress.

The margin portions 114 and 115 may be formed by forming internal electrodes by applying a conductive paste on a ceramic green sheet other than the region in which the margin portion is formed.

Also, to prevent the step difference due to the internal electrodes 121 and 122, after lamination, the internal electrodes may be cut to be exposed to the fifth and sixth surfaces 5 and 6 of the body, and a single dielectric layer or two or more dielectric layers may be laminated on both side surfaces of the capacitance formation portion Ac in the third direction (width direction), thereby forming the margin portions 114 and 115.

The width of the margin portion 114 and 115 is not limited to any particular example. However, an average width of the margin portions 114 and 115 may be 15 μm or less to easily obtain miniaturization and high capacitance of the multilayer electronic component. Also, in an example embodiment, by disposing the insulating layer on the connection portion of the external electrode and disposing the plating layer on the band portion of the external electrode, permeation of external moisture and a plating solution may be prevented such that reliability may improve. Accordingly, excellent reliability may be ensured even when the average width of the margin portions 114 and 115 is 15 μm or less.

The average width of the margin portions 114 and 115 may refer to the average size of the margin portions 114 and 115 in the third direction, and may be an average value of thicknesses of five points of the margin portions 114 and 115, spaced apart by an equal distance, in the third direction on the side surface of the capacitance formation portion Ac. For example, the measurements may be taken by scanning the cross-section of the body 110 using a scanning electron microscope (SEM). Other methods and/or tools appreciated by one of ordinary skill in the art, even if not described in the present disclosure, may also be used.

The internal electrodes 121 and 122 may be alternately laminated with the dielectric layer 111.

The internal electrodes 121 and 122 may include first and second internal electrodes 121 and 122. The first and second internal electrodes 121 and 122 may be alternately disposed to oppose each other with the dielectric layer 111 included in the body 110 interposed therebetween, and may be exposed to the third and fourth surfaces 3 and 4 of the body 110, respectively.

Referring to FIG. 3, the first internal electrode 121 may be spaced apart from the fourth surface 4 and may be exposed through the third surface 3, and the second internal electrode 122 may be spaced apart from the third surface 3 and may be exposed through the fourth surface 4. The first external electrode 131 may be disposed on the third surface 3 of the body and may be connected to the first internal electrode 121, and the second external electrode 132 may be disposed on the fourth surface 4 of the body and may be connected to the second internal electrode 122.

That is, the first internal electrode 121 may not be connected to the second external electrode 132, and may be connected to the first external electrode 131, and the second internal electrode 122 may not be connected to the first external electrode 131 and may be connected to the second external electrode 132. Accordingly, the first internal electrode 121 may be spaced apart from the fourth surface 4 by a predetermined distance, and the second internal electrode 122 may be spaced apart from the third surface 3 by a predetermined distance.

In this case, the first and second internal electrodes 121 and 122 may be electrically separated from each other by the dielectric layer 111 disposed therebetween.

The body 110 may be formed by alternately laminating a ceramic green sheet on which the first internal electrode 121 is printed and a ceramic green sheet on which the second internal electrode 122 is printed, and firing the sheets.

The material for forming the internal electrodes 121 and 122 is not limited to any particular example, and a material having excellent electrical conductivity may be used. For example, the internal electrodes 121 and 122 may include one or more of nickel (Ni), copper (Cu), palladium (Pd), silver (Ag), gold (Au), platinum (Pt), tin (Sn), or tungsten (W), titanium (Ti), and alloys thereof.

Also, the internal electrodes 121 and 122 may be formed by printing a conductive paste for internal electrodes including one or more of nickel (Ni), copper (Cu), palladium (Pd), silver (Ag), gold (Au), platinum (Pt), tin (Sn), tungsten (W), titanium (Ti), and alloys thereof. As the method of printing the conductive paste for internal electrodes, a screen printing method or a gravure printing method may be used, but an example embodiment thereof is not limited thereto.

The average thickness te of the internal electrodes 121 and 122 is not limited to any particular example.

However, generally, when the internal electrode is formed to have a thickness of less than 0.6 µm, which is relatively thin, in particular, when the thickness of the internal electrode is 0.35 µm or less, reliability may be deteriorated.

In an example embodiment, by disposing an insulating layer on the connection portion of the external electrode, and disposing the plating layer on the band portion of the external electrode, permeation of external moisture and a plating solution may be prevented such that reliability may improve. Accordingly, excellent reliability may be secured even when the average thickness of the internal electrodes 121 and 122 is 0.35 µm or less.

Accordingly, when the thickness of the internal electrodes 121 and 122 is 0.35 µm or less on average, the effect in the example embodiment may improve, and miniaturization and high capacitance of the ceramic electronic component may be easily obtained.

The average thickness te of the internal electrodes 121 and 122 may refer to the average thickness of the internal electrodes 121 and 122.

The average thickness of the internal electrodes 121 and 122 may be measured by scanning a cross-sectional surface of the body 110 taken in the length and thickness direction (L-T) using a scanning electron microscope (SEM) at 10,000 magnification. More specifically, an average value may be measured by measuring thicknesses of 30 points on one internal electrode, spaced apart by an equal distance, from the scanned image in the length direction. The 30 points spaced apart by an equal distance may be designated in the capacitance formation portion Ac. Also, when the measuring of the average value is extended to 10 internal electrodes and an average value thereof is measured, the average thickness of the internal electrodes may be further generalized.

The external electrodes 131 and 132 may be disposed on the third surface 3 and the fourth surface 4 of the body 110. The external electrodes 131 and 132 may include first and second external electrodes 131 and 132 disposed on the third and fourth surfaces 3 and 4 of the body 110, respectively, and connected to the first and second internal electrodes 121 and 122, respectively.

The external electrodes 131 and 132 may include the first external electrode 131 including a first connection portion 131a disposed on the third surface and a first band portion 131b extending from the first connection portion to a first portion of the first surface, and the second external electrode 132 including a second connection portion 132a disposed on the fourth surface, and a second band portion 132b extending from the second connection portion to a second portion of the first surface. The first connection portion 131a may be connected to the first internal electrode 121 on the third surface, and the second connection portion 132a may be connected to the second internal electrode 122 on the fourth surface.

Also, the first external electrode 131 may include a third band portion 131c extending from the first connection portion 131a to a first portion of the second surface, and the second external electrode 132 may include a fourth band portion 132c extending from the connection portion 132a to a second portion of the second surface. Further, the first external electrode 131 may include a first side band portion extending from the first connection portion 131a to portions (first portions) of the fifth and sixth surfaces, and the second external electrode 132 may include a second side band portion extending from the second connection portion 132a to portions (second portions) of the fifth and sixth surfaces.

However, the third band portion, the fourth band portion, the first side band portion and the second side band portion may not be provided in the example embodiment. The first and second external electrodes 131 and 132 may not be disposed on the second surface and may not be disposed on the fifth and sixth surfaces. As the first and second external electrodes 131 and 132 are not disposed on the second surface, the first and second external electrodes 131 and 132 may be disposed below an extension line of the second surface of the body. Also, the first and second connection portions 131a and 132a may be spaced apart from the fifth and sixth surfaces, and the first and second connection portions 131a and 132a may be spaced apart from the second surface. Also, the first and second band portions 131b and 132b may also be spaced apart from the fifth and sixth surfaces.

When the first and second external electrodes 131 and 132 include the third and fourth band portions 131c and 132c, an insulating layer may be formed on the third and fourth band portions 131c and 132c in the example embodiment, but an example embodiment thereof is not limited thereto. A plating layer may be disposed on the third and fourth band portions 131c and 132c to improve mounting convenience. Also, the first and second external electrodes 131 and 132 may include the third and fourth band portions 131c and 132c and may not include the side band portions, and in this case, the first and second connection portions 131a and 132a and the first to fourth band portions 131b, 132b, 131c, and 132c may be spaced apart from the fifth and sixth surfaces.

In the example embodiment, the multilayer electronic component 1000 may have two external electrodes 131 and 132. However, the number of the external electrodes 131 and 132 and the shape thereof may vary depending on the shapes of the internal electrodes 121 and 122 or other purposes.

The external electrodes 131 and 132 may be formed using any material having electrical conductivity, such as metal, and a specific material may be determined in consideration of electrical properties and structural stability, and may have a multilayer structure.

The external electrodes 131 and 132 may be a fired electrode including a conductive metal and glass, or a resin-based electrode including a conductive metal and a resin.

Also, the external electrodes 131 and 132 may have a shape in which a plastic electrode and a resin-based electrode are formed in order on a body. Also, the external electrodes 131 and 132 may be formed by transferring a sheet including a conductive metal onto the body or by transferring a sheet including a conductive metal to the fired electrode.

As the conductive metal included in the external electrodes 131 and 132, a material having excellent electrical conductivity may be used, and the material is not limited to any particular example. For example, the conductive metal may be one or more of Cu, Ni, Pd, Ag, Sn, Cr, and alloys thereof. Preferably, the external electrodes 131 and 132 may include at least one of Ni and a Ni alloy, and accordingly, connectivity with the internal electrodes 121 and 122 including Ni may improve.

The insulating layer 151 may be disposed on the first and second connection portions 131a and 132a.

Since the first and second connection portions 131a and 132a are connected to the internal electrodes 121 and 122, the first and second connection portions 131a and 132a may become paths through which a plating solution may permeate in a plating process or moisture may permeate during actual use. In the example embodiment, since the insulating layer 151 is disposed on the connection portions 131a and 132a, permeation of external moisture or a plating solution may be prevented.

The insulating layer 151 may be in contact with the first and second plating layers 141 and 142. In this case, the insulating layer 151 may be in contact with and may partially cover ends of the first and second plating layers 141 and 142, or the first and second plating layers 141 and 142 be in contact with and may partially cover ends of the insulating layer 151.

The insulating layer 151 may be disposed on the first and second connection portions 131a and 132a, and may be disposed to cover the second surface and the third and fourth band portions 131c and 132c. In this case, the insulating layer 151 may cover the third and fourth band portions 131c and 132c, and regions in which the third and fourth band portions 131c and 132c are not disposed on the second surface. Accordingly, the insulating layer 151 may cover the region in which the ends of the third and fourth band portions 131c and 132c are in contact with the body 110 and may block the moisture permeation path, thereby improving moisture resistance reliability.

The insulating layer 151 may be disposed on the second surface and may extend to the first and second connection portions 131a and 132a. Also, when the external electrodes 131 and 132 are not disposed on the second surface, the insulating layer may be disposed to entirely cover the second surface. The insulating layer 151 may not necessarily be disposed on the second surface, and the insulating layer may not be disposed on a portion or an entirety of the second surface, and also, the insulating layer may be divided into two portions and the two portions may be disposed on the first and second connection portions 131a and 132a, respectively. When the insulating layer is not disposed on an entirety of the second surface, the insulating layer may be disposed below an extension line of the second surface. Also, the insulating layer may not be disposed on the second surface, and the insulating layer may extend from the first and second connection portions 131a and 132a to the fifth and sixth surfaces and may form an insulating layer.

Further, the insulating layer 151 may be disposed to cover portions of the first and second side band portions, the fifth surface, and the sixth surface. In this case, portions of the fifth and sixth surfaces not covered by the insulating layer 151 may be exposed.

Also, the insulating layer 151 may be disposed to cover the first and second side band portions and the fifth and sixth surfaces, and in this case, the fifth and sixth surfaces may not be exposed, such that moisture resistance reliability may improve. The connection portions 131a and 132a may not also be directly exposed, thereby improving reliability of the multilayer electronic component 1000. In greater detail, the insulating layer may cover both the first and second side band portions, and may cover entire regions of the fifth and sixth surfaces other than the region in which the first and second side band portions are formed.

The insulating layer 151 may prevent the plating layers 141 and 142 from being formed on the external electrodes 131 and 132 on which the insulating layer 151 is disposed, and may improve sealing properties, such that permeation of moisture or a plating solution may be reduced.

The insulating layer may include an oxide including zirconium (Zr).

Generally, a glass-based material may be used for an insulating layer, but due to the nature of the glass-based material, it may be difficult to form a uniform film because agglomeration may occur severely during sintering, and as heat is necessary during sintering, stress may be generated in the body, which may cause cracks or delamination. Also, when an insulating layer including a glass-based material is used, a method of firing an insulating layer including a glass-based material after firing the external electrode may be used, but, in the process of sintering the insulating layer, the metal material of the external electrode may diffuse into the internal electrode, which may cause radiation cracks. Further, generally, glass materials may have hardness, such that glass materials may be broken even by a small impact.

In the example, the first oxide, an oxide including zirconium (Zr), may be applied to the insulating layer instead of the glass-based insulating layer, thereby solving the issue of the glass-based insulating layer. The oxide including zirconium (Zr) may have insulating properties, and may also have excellent impact resistance as compared to a glass-based oxide.

Specifically, when the insulating layer 151 is formed using an oxide including zirconium (Zr), a relatively uniform and dense film may be formed than in the case of using a glass material, thereby effectively improving moisture resistance reliability.

Also, when the insulating layer 151 is formed using an oxide including zirconium (Zr), hardness, strength, abrasion resistance, and moisture resistance reliability may effectively improve than when other inorganic materials are used, and corrosion resistance against acidic solutions such as a plating solution may be excellent.

A method of forming the insulating layer 151 is not limited to any particular example.

For example, after the external electrodes 131 and 132 are formed on the body 110, an insulating layer including an oxide including zirconium (Zr) may be formed using an atomic layer deposition (ALD) method. That is, the insulating layer 151 may be formed by an atomic layer deposition method, such that a dense and uniform insulating layer 151 may be more easily formed, and the thickness of the insulating layer 151 may be easily adjusted. Also, the atomic layer deposition method may be performed in a temperature range of about 60° C. to about 200° C., but an example embodiment thereof is not limited thereto, and a method of forming a uniform and dense insulating layer 151, such as a sol-gel coating method and a powder coating method, may be used.

The type of oxide including zirconium (Zr) included in the insulating layer 151 is not limited to any particular example, and may be, for example, zirconia ($ZrO_2$).

Zirconia may have high mechanical properties and may be stable in a chemically corrosive environment, and may have high strength, high toughness, low thermal conductivity and high flammability resistance. In particular, the properties may improve as the concentration of zirconia included in the insulating layer 151 increases.

In an example embodiment, in the insulating layer 151, the number of moles of zirconium (Zr) atoms based on the total number of moles of elements other than oxygen atoms may be 0.95 or more. That is, the insulating layer 151 may be substantially formed of an oxide including zirconium (Zr), other than elements detected as impurities. In this case, the oxide including zirconium (Zr) may be zirconia ($ZrO_2$). Accordingly, the effect of preventing cracks due to thermal reduction and radiation cracks due to metal diffusion, improvement of moisture resistance reliability, and improvement of corrosion resistance against a plating solution may improve.

Zirconia may be unstable because a spontaneous phase transformation may start from a monoclinic system to a tetragonal system at a relatively low temperature of 100° C. to 400° C.

Accordingly, when zirconia is included in the insulating layer 151 in a high concentration, zirconia may cause grain boundary breakage and a sudden decrease in strength of the insulating layer 151 due to the phase change of zirconia. Since this issue may also be caused by heat applied during manufacturing of a multilayer electronic component or heat generated during operations, a method of stabilizing zirconia in a relatively unstable form and forming the insulating layer 151 without deterioration of mechanical and chemical properties may be necessary.

Mg oxide or Ca oxide may stabilize tetragonal zirconia. According to an example embodiment, the insulating layer 151 may further include at least one of Mg, Ca, and oxides thereof, and accordingly, deterioration of excellent mechanical and chemical properties of zirconia included in the insulating layer 151 caused by heat applied during the process of manufacturing the multilayer electronic component or heat generated during operation may be prevented.

Meanwhile, yttrium (Y) or an oxide including yttrium (Y) may be added to stabilize zirconia included in the insulating layer 151.

However, when yttrium (Y) or an oxide including yttrium (Y) is added to zirconia, yttria stabilized zirconia (YSZ) may be formed. Yttria stabilized zirconia may have excellent mechanical properties, but may have high ion conductivity such that yttria stabilized zirconia may not be useful to be used as an insulating layer of the multilayer electronic component.

Accordingly, according to an example embodiment, the insulating layer 151 may not include yttrium (Y), thereby preventing the formation of yttria stabilized zirconia and maintaining excellent insulating properties. In an example embodiment, the insulating layer 151 may be substantially free of yttrium (Y). "Substantially free of yttrium (Y)" may mean that yttrium (Y) may be present as an inevitable impurity that may be present in other components of the insulating layer.

Various ceramic additives, organic solvents, Binders, dispersants and the like may be added to the dielectric layer 111, the cover portions 112 and 113, and the margin portions 114, 115 of the multilayer electronic component 1000 in addition to barium titanate ($BaTiO_3$). When an oxide including yttrium (Y) or yttrium (Y) is used as an additive to increase volume resistance of the dielectric layer 111, yttrium (Y) or yttrium (Y) included in the dielectric layer 111 may react with an oxide including zirconium (Zr) included in the insulating layer 151 disposed externally of the body 110, such that yttria stabilized zirconia may be formed on an interfacial surface between the body 110 and the insulating layer 151.

Accordingly, a portion of the insulating layer 151 may have ion conductivity, such that the insulating layer may not properly function as an insulating layer.

According to an example embodiment, each of the dielectric layer 111, the cover portions 112 and 113, and the margin portions 114 and 115 may not include yttrium (Y), such that the reaction between zirconium (Zr) and yttrium (Y) included in each of the dielectric layer 111, the cover portions 112 and 113, and the margin portions 114 and 115 and ion conductivity created therefrom may be prevented. Accordingly, the effect of preventing creation and spread of radiation cracks of the multilayer electronic component 1000, improvement of moisture resistance reliability, and improvement of corrosion resistance against a plating solution may improve. According to an example embodiment, each of the dielectric layer 111, the cover portions 112 and 113, and the margin portions 114 and 115 may be substantially free of yttrium (Y). "Substantially free of yttrium (Y)" may mean that yttrium (Y) may be present as an inevitable impurity that may be present in other components of the dielectric layer 111, the cover portions 112 and 113, and the margin portions 114 and 115.

In this case, the component of the insulating layer 151 may be calculated from an image observed using scanning electron microscope-energy dispersive X-ray spectroscopy (SEM-EDS). Specifically, the multilayer electronic component may be polished to a central position in the width direction (third direction), a and the number of moles of each element included in the insulating layer may be measured using EDS in the central region among regions obtained by dividing the insulating layer into 5 regions in the thickness direction, and also, the number of moles of Zr atoms based on the total number of moles of elements other than oxygen atoms may be calculated. In some embodiments, the elements other than oxygen may include Zr, elements from dielectric composition in the cover portion (Y, Al, Mg, Si, Ba, and Ti), elements from external electrodes (Cu, Ni, Pd, Ag, Sn, and Cr), and other impurities.

The average thickness t2 of the insulating layer 151 may not be limited to any particular example. However, when the average thickness t2 of the insulating layer 151 is 20 nm or less, the effect of preventing cracks caused by thermal reduction and radiation cracks caused by metal diffusion may not be sufficiently secured.

Accordingly, in an example embodiment, by configuring the average thickness t2 of the insulating layer 151 to exceed 20 nm, the effect of preventing cracks caused by thermal reduction, radiation cracks caused by metal diffusion, and the like, may be prevented.

When the average thickness t2 of the insulating layer 151 is less than 50 nm, moisture resistance reliability may not be sufficiently secured.

Accordingly, in an example embodiment, by configuring the average thickness t2 of the insulating layer 151 to be 50 nm or more, moisture resistance reliability may be secured.

When the average thickness t2 of the insulating layer 151 is 400 nm or less, sufficient corrosion resistance against a plating solution may not be secured when the plating layers 141 and 142 are formed.

In an example embodiment, by configuring the average thickness t2 of the insulating layer 151 to exceed 400 nm, corrosion resistance against a plating solution may be secured and reliability of the multilayer electronic component 1000 may improve.

The upper limit of the average thickness t2 of the insulating layer 151 is not limited to any particular example. However, when the value of the average thickness t2 of the insulating layer 151 exceeds 1000 nm, processability may deteriorate and it may be difficult to miniaturize the multilayer electronic component 1000.

Accordingly, in an example embodiment, the average thickness t2 of the insulating layer 151 may be greater than 20 nm and equal to or less than 1000 nm, preferably greater than or equal to 50 nm and equal to or less than 1000 nm, and more preferably greater than 400 nm and equal to or less than 1000 nm.

At this time, the average thickness t2 of the insulating layer 151 may be an average value of thicknesses at two points spaced apart from each other by 5 μm and two points spaced apart from each other by 10 μm with respect to a central point of the insulating layer 151 disposed on the first and second connecting portions 131a and 132a in the first direction. The thicknesses may be measured by scanning a cross-sectional surface of the body 110 using a scanning electron microscope (SEM). Other methods and/or tools appreciated by one of ordinary skill in the art, even if not described in the present disclosure, may also be used.

In an example embodiment, the insulating layer 151 may be disposed to be in direct contact with the first and second external electrodes 131 and 132, and the first and second external electrodes 131 and 132 may include a conductive metal and glass. Accordingly, since the plating layers 141 and 142 may not be disposed in the region in which the insulating layer 151 is disposed among the external surfaces of the first and second external electrodes 131 and 132, erosion of the external electrodes caused by the plating solution may be effectively prevented.

In this case, the first plating layer 141 may be disposed to cover an end disposed on the first external electrode 131 of the insulating layer 151, and the second plating layer 142 may be disposed to an end disposed on the external electrode 132. By forming the insulating layer 151 before forming the plating layers 141 and 142 on the external electrodes 131 and 132, permeation of the plating solution during the process of forming the plating layer may be reliably prevented. As the insulating layer is formed before the plating layer, the plating layers 141 and 142 may cover ends of the insulating layer 151.

The first and second plating layers 141 and 142 may be disposed on the first and second band portions 131b and 132b, respectively. The plating layers 141 and 142 may improve mounting properties, and as the plating layers 141 and 142 are disposed on the band portions 131b and 132b, the mounting space may be reduced, and also, permeation of the plating solution into an internal electrode may be reduced, such that reliability may improve. One ends of the first and second plating layers 141 and 142 may be in contact with the first surface, and the other end may be in contact with the insulating layer 151.

The type of the plating layers 141 and 142 is not limited to any particular example, and may be a plating layer including at least one of Cu, Ni, Sn, Ag, Au, Pd, and alloys thereof, and may include a plurality of layers.

As a more specific example of the plating layers 141 and 142, the plating layers 141 and 142 may be a Ni plating layer or a Sn plating layer, and a Ni plating layer and a Sn plating layer may be formed in sequence on the first and second band portions 131b and 132b.

In an example embodiment, the first and second plating layers 341 and 342 may be extended to partially cover the first and second connection portions 331a and 332a, respectively. When an average distance in the first direction from the first surface 1 to an internal electrode disposed most adjacent (closest) to the first surface 1 among the internal electrodes 121 and 122 is defined as H1, and an average distance in the first direction from an extension line of the first surface 1 to ends of the plating layers 141 and 142 disposed on the first and second connection portions 131a and 132a is defined as H2, H1>H2 may be satisfied. Accordingly, permeation of the plating solution into the internal electrode during the plating process may be prevented, thereby improving reliability. In some embodiments, an average distance in the first direction from an extension line of the first surface 1 to an end of the first plating layer 141 disposed on the first connection portion 131a or to an end of the second plating layer 142 disposed on the second connection portion 132a is defined as H2.

H1 and H2 may be average values of values measured at five points spaced apart by an equal distance in the third direction on a cross-section (L-T cross-section) obtained by cutting the body 110 in the first and second directions. H1 may be an average value of values measured at the point at which the internal electrode disposed most adjacent (closest) to the first surface 1 is connected to the external electrode in each cross-section, H2 is an average value of values measured with reference to an end of the plating layer in contact with the external electrode in each cross-section, and the extension lines of the first surface which may be a reference of where H1 and H2 are measured may be the same. For example, the measurements may be taken by scanning the cross-section of the body 110 using a scanning electron microscope (SEM). Other methods and/or tools appreciated by one of ordinary skill in the art, even if not described in the present disclosure, may also be used.

In an example embodiment, the first plating layer 141 may be disposed to cover the end disposed on the first external electrode 131 of the insulating layer 151, and the second plating layer 142 may be disposed to cover the end disposed on the second external electrode 132 of the insulating layer 151. Accordingly, cohesion force between the insulating layer 151 and the plating layers 141 and 142 may be strengthened, such that reliability of the multilayer electronic component 1000 may improve.

In an example embodiment, the insulating layer 151 may be disposed to cover the end disposed on the first external electrode 131 of the insulating layer 151, and the insulating layer 151 may be disposed to cover the end disposed on the second external electrode 132 of the insulating layer 151. Accordingly, cohesion force between the insulating layer 151 and the plating layers 141 and 142 may be strengthened, such that reliability of the multilayer electronic component 1000 may improve.

In an example embodiment, the average size of the body in the second direction is defined as L, the average distance in the second direction from an extension line of the third surface to an end of the first band portion is defined as B1, and the average size of the body in the second direction from an extension line of the fourth surface to an end of the second band portion is defined as B2, $0.2 \leq B1/L \leq 0.4$ and $0.2 \leq B2/L \leq 0.4$ may be satisfied.

When B1/L and B2/L are less than 0.2, it may be difficult to secure sufficient fixing strength. When B2/L is greater than 0.4, a leakage current may be generated between the first band portion 331b and the second band portion 332b under a high-voltage current, and the first band portion 331b and the second band portion 332b may be electrically connected due to plating spread.

B1, B2, and L may be average values of values measured at five points spaced apart by an equal distance in the third direction on a cross-section (L-T cross-section) obtained by cutting the body 110 in the first and second directions. For example, the measurements may be taken by scanning the cross-section of the body 110 using a scanning electron microscope (SEM). Other methods and/or tools appreciated by one of ordinary skill in the art, even if not described in the present disclosure, may also be used.

Referring to FIG. 5 illustrating a mounting substrate 1100 on which the multilayer electronic component 1000 is mounted, the plating layers 141 and 142 of the multilayer electronic component 1000 may be bonded to each other by electrode pads 181 and 182 and solder 191 and 192 disposed on the substrate 180.

When the internal electrodes 121 and 122 are laminated in the first direction, the multilayer electronic component 1000 may be horizontally mounted on the substrate 180 such that the internal electrodes 121 and 122 are parallel to the mounting surface. However, the example embodiment is not limited to the example of horizontal mounting, and when the internal electrodes 121 and 122 are laminated in the third direction, the multilayer electronic component may be vertically mounted on the substrate such that the internal electrodes 121 and 122 may be perpendicular to the mounting surface.

The size of the multilayer electronic component 1000 is not limited to any particular example.

However, to obtain both miniaturization and high capacitance, it may be necessary to increase the number of laminated layers by reducing the thicknesses of the dielectric layer and the internal electrode. Accordingly, the effect of improving reliability and capacitance per unit volume in the example embodiment may be significant in a multilayer electronic component having a size of 1005 (length×width to be 1.0 mm×0.5 mm) or less.

Accordingly, when manufacturing errors, external electrode sizes, or the like are considered, when the length of the multilayer electronic component 1000 is 1.1 mm or less and the width is 0.55 mm or less, the effect of improving reliability in the example embodiment may improve. Here, the length of the multilayer electronic component 1000 may refer to a maximum size of the multilayer electronic component 1000 in the second direction, and the width of the multilayer electronic component 1000 may refer to a maximum size of the multilayer electronic component 1000 in the third direction. For example, the measurements may be taken by scanning the multilayer electronic component 1000 using an optical microscope (SEM). Other methods and/or tools appreciated by one of ordinary skill in the art, even if not described in the present disclosure, may also be used.

Figure 6:
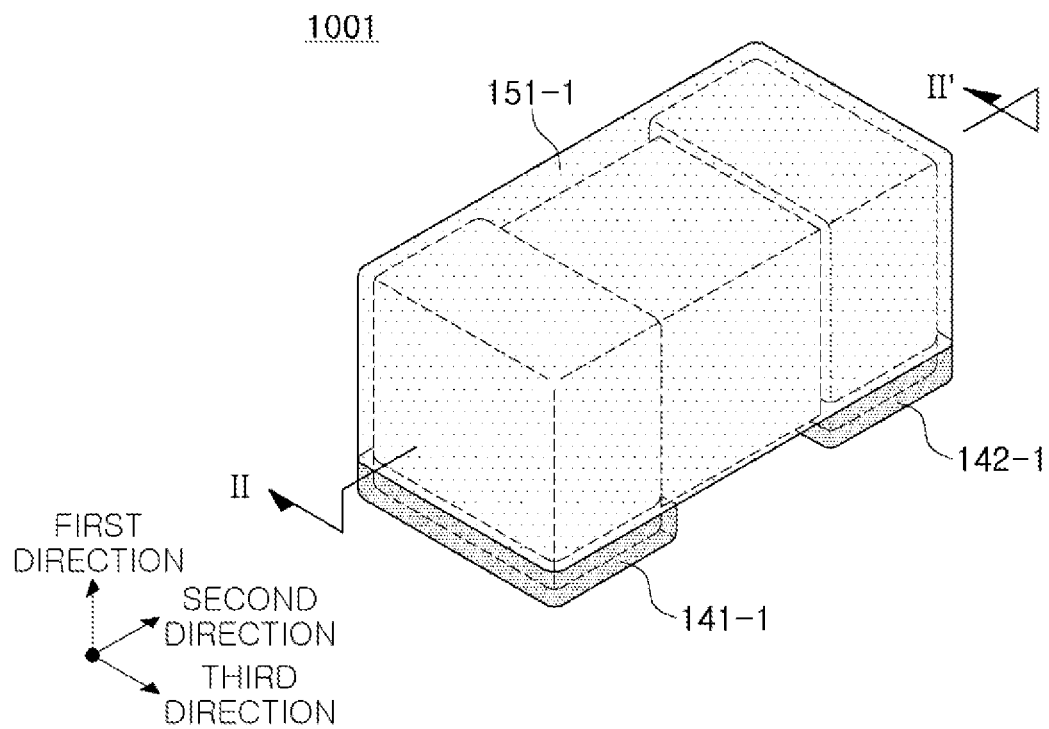
FIG. 6 is a perspective diagram illustrating a multilayer electronic component according to an example embodiment of the present disclosure.
Figure 7:
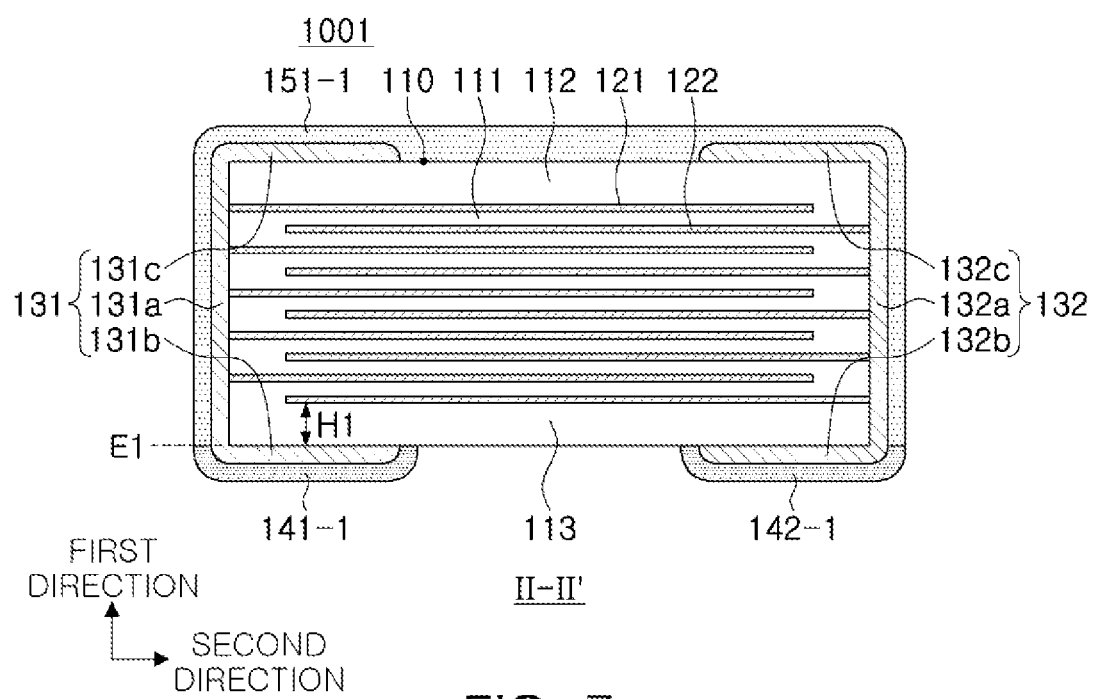
FIG. 7 is a cross-sectional diagram taken along line II-II' in FIG. 6.

FIG. 6 is a perspective diagram illustrating a multilayer electronic component 1001 according to an example embodiment. FIG. 7 is a cross-sectional diagram taken along line II-II' in FIG. 6.

Referring to FIGS. 6 and 7, in the multilayer electronic component 1001 in an example embodiment, the first and second plating layers 141-1 and 142-1 may be disposed below the extension line E1 of the first surface. Accordingly, the height of the solder may be reduced during mounting, and the mounting space may be reduced.

Also, the insulating layer 151-1 may extend to a region below the extension line of the first surface and may be in contact with the first and second plating layers 141-1 and 142-1.

Figure 8:
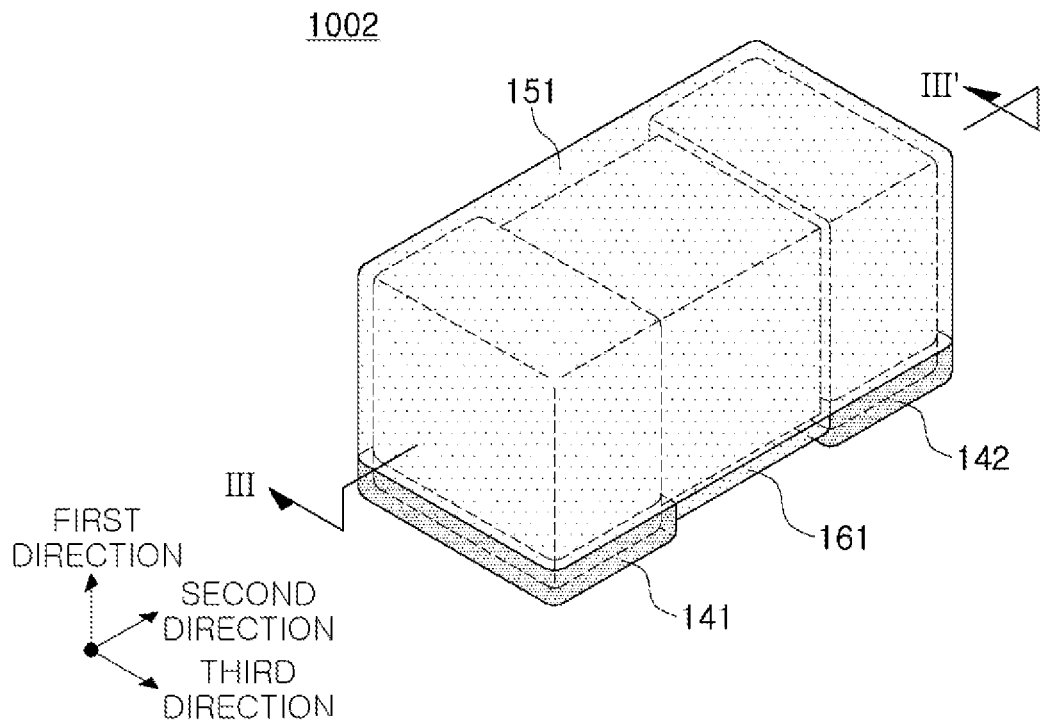
FIG. 8 is a perspective diagram illustrating a multilayer electronic component according to an example embodiment of the present disclosure.
Figure 9:
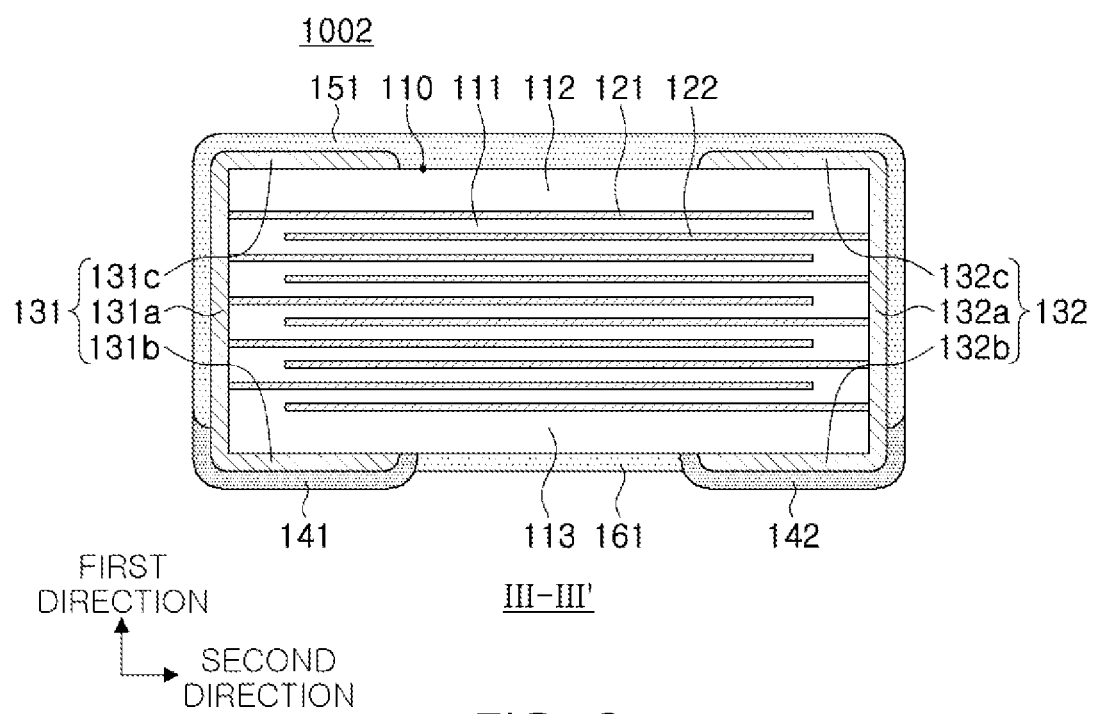
FIG. 9 is a cross-sectional diagram taken along line III-III' in FIG. 8.

FIG. 8 is a perspective diagram illustrating a multilayer electronic component 1002 according to an example embodiment. FIG. 9 is a cross-sectional diagram taken along line III-III' in FIG. 8.

Referring to FIGS. 8 and 9, the multilayer electronic component 1002 in an example embodiment may further include an additional insulating layer 161 disposed on the first surface 1 and disposed between a first band portion 131b and a second band portion 132b. Accordingly, a leakage current which may occur between the first band portion 131b and the second band portion 132b under a high voltage current may be prevented.

The type of the additional insulating layer 161 is not limited to any particular example. For example, the additional insulating layer 161 may include a second oxide, an oxide including zirconium (Zr), similarly to the insulating layer 151. The second oxide may be the same as or different from the first oxide. However, it may not be necessary to limit the additional insulating layer 161 and the insulating layer 151 to the same material, and the additional insulating layer 161 and the insulating layer 151 may be formed of different materials. For example, the additional insulating layer 161 and the insulating layer 151 may include one or more selected from epoxy resin, acrylic resin, ethyl cellulose, or the like, or may include glass.

Figure 10:
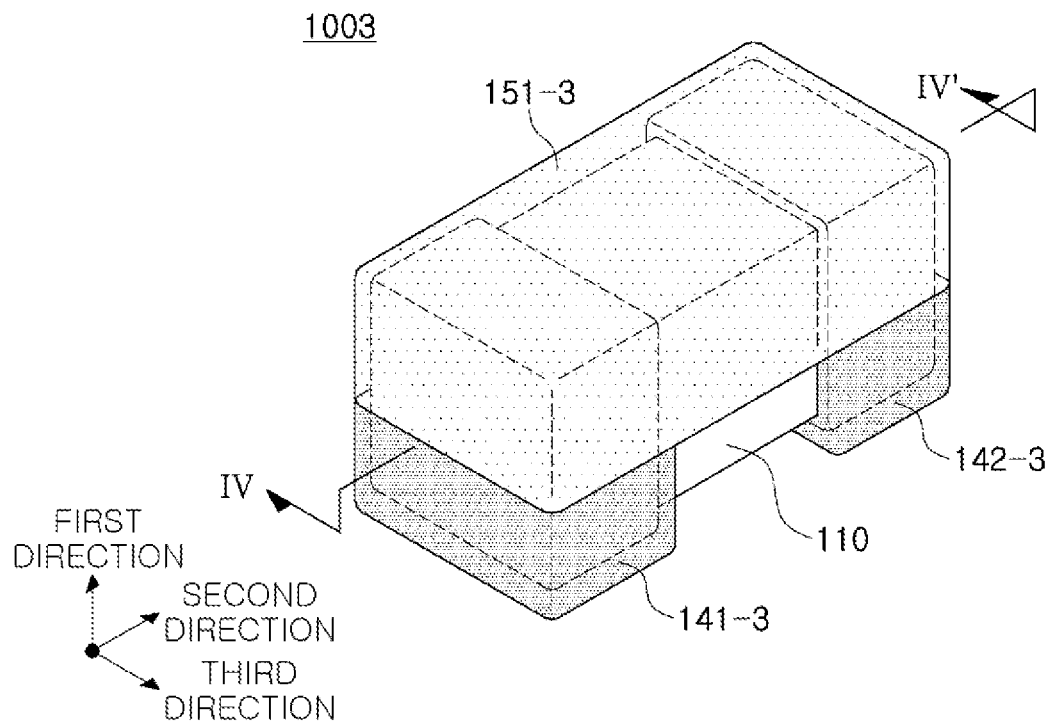
FIG. 10 is a perspective diagram illustrating a multilayer electronic component according to an example embodiment of the present disclosure.
Figure 11:
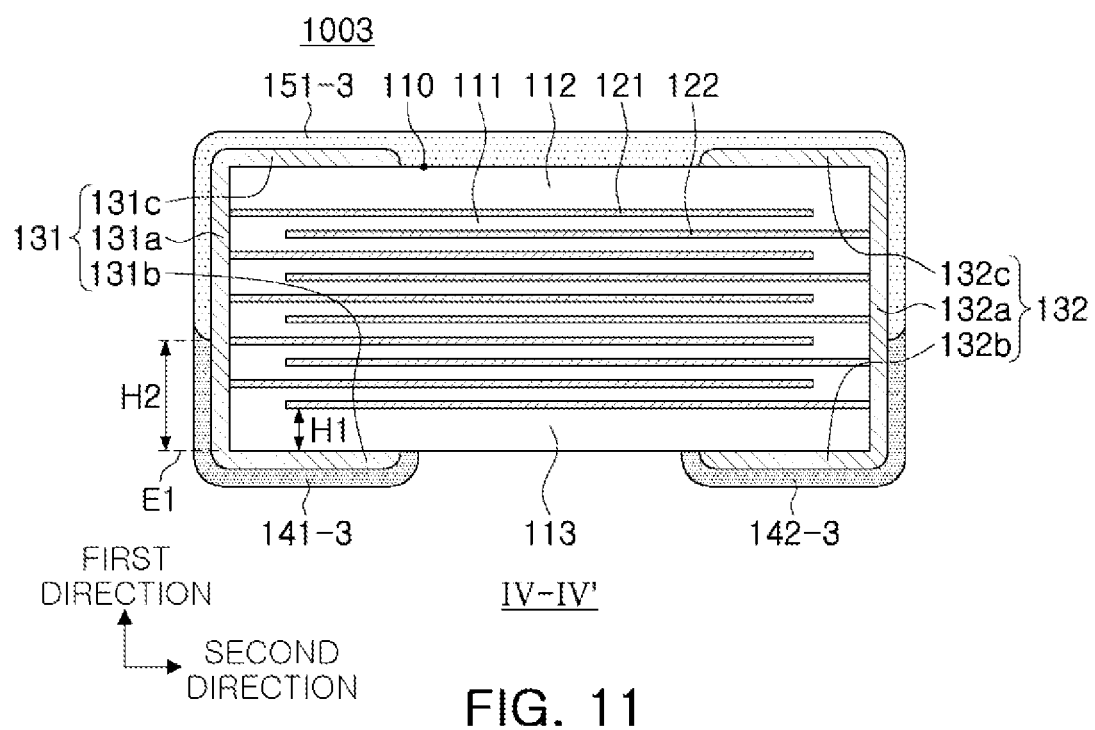
FIG. 11 is a cross-sectional diagram taken along line IV-IV' in FIG. 10.

FIG. 10 is a perspective diagram illustrating a multilayer electronic component 1003 according to an example embodiment. FIG. 11 is a cross-sectional diagram taken along line IV-IV' in FIG. 10.

Referring to FIGS. 10 and 11, in the multilayer electronic component 1003 according to an example embodiment, when an average distance in the first direction from the first surface 1 to an internal electrode disposed most adjacent (closest) to the first surface 1 among the internal electrodes 121 and 122 is defined as H1, and an average distance in the first direction from an extension line of the first surface 1 to ends of the plating layers 141-3 and 142-3 disposed on the first and second connection portions 131a and 132a is defined as H2, H1<H2 may be satisfied. Accordingly, the region in contact with solder during mounting may increase, such that cohesion strength may improve. In some embodiments, an average distance in the first direction from an extension line of the first surface 1 to an end of the first plating layer 141-3 disposed on the first connection portion 131a or to an end of the second plating layer 142-3 disposed on the second connection portion 132a is defined as H2.

More preferably, when an average size of the body 110 in the first direction is defined as T, H2<T/2 may be satisfied. That is, H1<H2<T/2 may be satisfied, which may be because, when H2 is T/2 or more, the effect of improving moisture resistance reliability by the insulating layer may degrade.

H1, H2, and T may be average values of values measured at five points spaced apart by an equal distance in the third direction on a cross-section (L-T cross-section) obtained by cutting the body 110 in the first and second directions. H1 may be an average value of values measured at the point at which the internal electrode disposed most adjacent (closest) to the first surface 1 is connected to the external electrode in each cross-section, H2 is an average value of values measured with reference to an end of the plating layer in contact with the external electrode in each cross-section, and the extension lines of the first surface which may be a reference of where H1 and H2 are measured may be the same. Also, T may be an average value obtained by measuring maximum sizes of the body 110 in the first direction in each cross-section. For example, the measurements may be taken by scanning the cross-section of the body 110 using a scanning electron microscope (SEM). Other methods and/or tools appreciated by one of ordinary skill in the art, even if not described in the present disclosure, may also be used.

Figure 12:
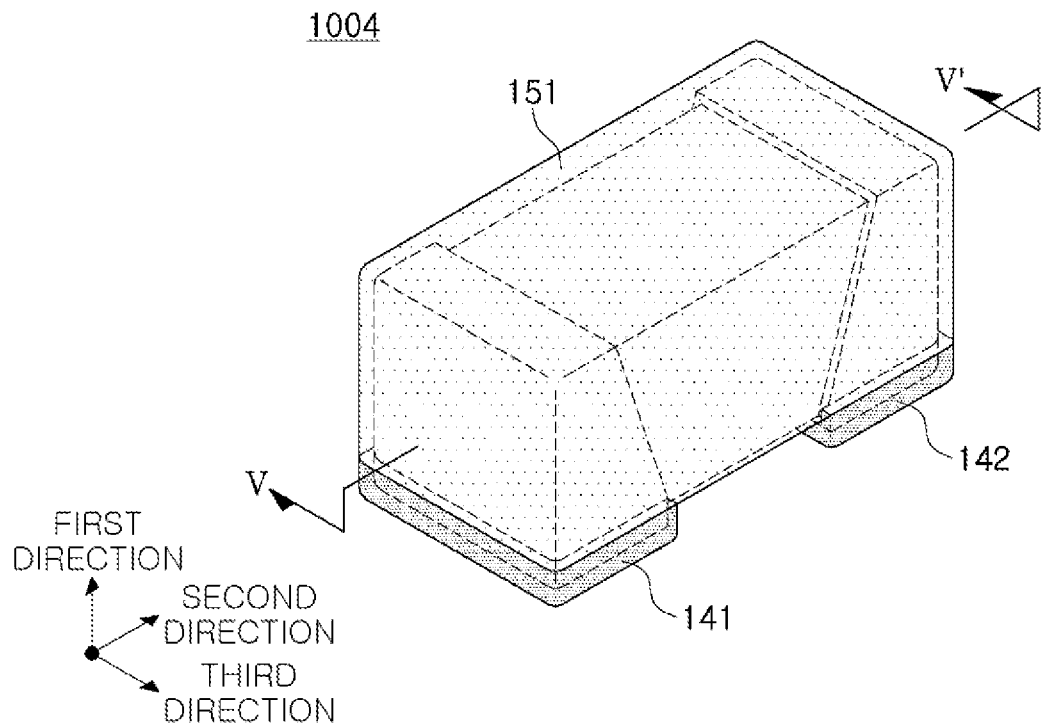
FIG. 12 is a perspective diagram illustrating a multilayer electronic component according to an example embodiment of the present disclosure.
Figure 13:
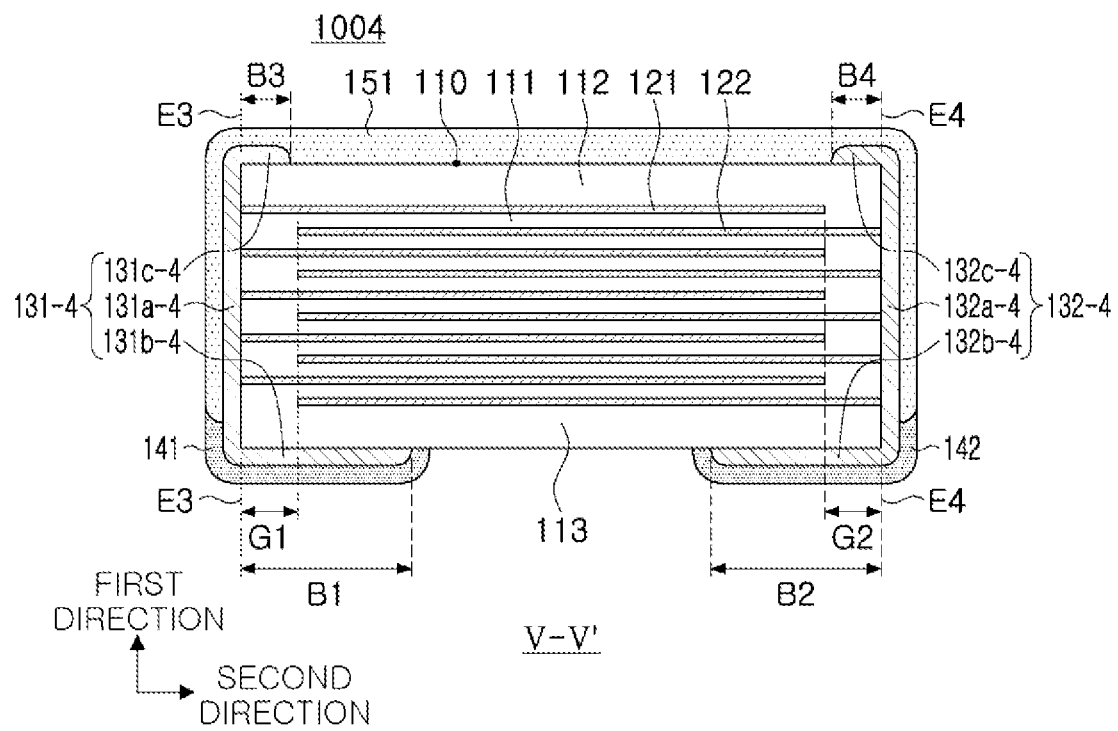
FIG. 13 is a cross-sectional diagram taken along line V-V' in FIG. 12.

FIG. 12 is a perspective diagram illustrating a multilayer electronic component 1004 according to an example embodiment. FIG. 13 is a cross-sectional diagram taken along line V-V' in FIG. 12.

Referring to FIGS. 12 and 13, in the multilayer electronic component 1004 in an example embodiment, an average length B1 of the first band portion 131b-4 may be greater than an average length B3 of the third band portion 131c-4, and an average length of the second band portion 132b-4 may be greater than an average length B4 of the fourth band portion 132c-4. Accordingly, the region in contact with the solder during mounting may increase, such that cohesion strength may improve.

In greater detail, the average distance in the second direction from an extension line of the third surface 3 to an end of the first band portion 131b-4 is defined as B1, an average distance in the second direction from an extension line of the fourth surface 4 to an end of the second band portion 132b-4 is defined as B2, an average distance in the second direction from an extension line of the third surface 3 to an end of the third band portion 131c-4 is defined as B3, and an average distance in the second direction from an extension line of the fourth surface 4 to an end of the fourth band portion 132c-4 is defined as B4, B3<B1 and B4<B2 may be may be satisfied.

In this case, when an average size of the body 110 in the second direction is defined as L, 0.2≤B1/L≤0.4 and 0.2≤B2/L≤0.4 may be satisfied.

B1, B2, B3, B4 and L may be average values of values measured at five points spaced apart by an equal distance in the third direction on a cross-section (L-T cross-section) obtained by cutting the body 110 in the first and second directions. For example, the measurements may be taken by scanning the cross-section of the body 110 using a scanning electron microscope (SEM). Other methods and/or tools appreciated by one of ordinary skill in the art, even if not described in the present disclosure, may also be used.

Also, the first external electrode 131-4 may include a first side band portion extending from the first connection portion 131a-4 to portions (first portions) of the fifth and sixth surfaces, and the second external electrode 132-4 may include a second side band portion extending from the second connection portion 132a-4 to portions (second portions) of the fifth and sixth surfaces. In this case, the sizes of the first and second side band portions in the second direction may gradually increase toward the first surface. That is, the first and second side band portions may be disposed in a tapered shape or a trapezoidal shape.

Further, when an average distance in the second direction from an extension line of the third surface to an end of the third band portion 131c-4 is defined as B3, an average distance in the second direction from an extension line of the fourth surface to an end of the fourth band portion 132c-4 is defined as B4, an average size of a region, taken in the second direction, in which the third surface and the second internal electrode 122 are spaced apart from each other is defined as G1, and an average size of a region, taken in the second direction, in which the fourth surface and the second internal electrode 122 are spaced apart from each other is defined as G2, B3≤G1 and B4≤G2 may be satisfied. Accordingly, the volume occupied by the external electrode may be reduced, such that capacitance per unit volume of the multilayer electronic component 1004 may be increased.

As for G1 and G2, an average value of sizes in the second direction, spaced apart from the third surface, measured with respect to arbitrary five second internal electrodes disposed in a central portion taken in the first direction on a cross-section obtained by cutting the body in the first and second directions in a center taken in the third direction may be G1, and an average values of sizes in the second direction, spaced apart from the fourth surface, measured with respect to arbitrary five second internal electrodes disposed in a central portion taken in the first direction in a central portion taken in the first direction may be G2.

Further, G1 and G2 may be obtained from the cross section (L-T cross-section) obtained by cutting the body 110 in the first and second directions at five points disposed with an equal distance in the third direction, and the average values thereof may be G1 and G2, such that the values may be further generalized. For example, the measurements may be taken by scanning the cross-section of the body 110 using a scanning electron microscope (SEM). Other methods and/or tools appreciated by one of ordinary skill in the art, even if not described in the present disclosure, may also be used.

However, an example embodiment thereof is not limited to B3≤G1 and B4≤G2, and the example in which B3≥G1 and B4≥G2 are satisfied may be included as an example embodiment. Accordingly, in an example embodiment, when an average distance in the second direction from an extension line of the third surface to an end of the third band portion is defined as B3, an average distance in the second direction from an extension line of the fourth surface to an end of the fourth band portion is defined as B4, an average size of the region in which the third surface and the second internal electrode are spaced apart from each other, taken in the second direction, is defined as G1, and an average size of the region in which the fourth surface and the first internal electrode are spaced apart from each other, taken in the second direction, is defined as G2, B3≥G1 and B4≥G2 may be satisfied.

In an example embodiment, when an average distance in the second direction from an extension line of the third surface E3 to an end of the first band portion is defined as B1, and an average distance in the second direction from an extension line of the fourth surface to an end of the second band portion is defined as B2, B1≥G1 and B2≥G2 may be satisfied. Cohesion strength of the multilayer electronic component 1004 with the substrate 180 may improve.

Figure 14:
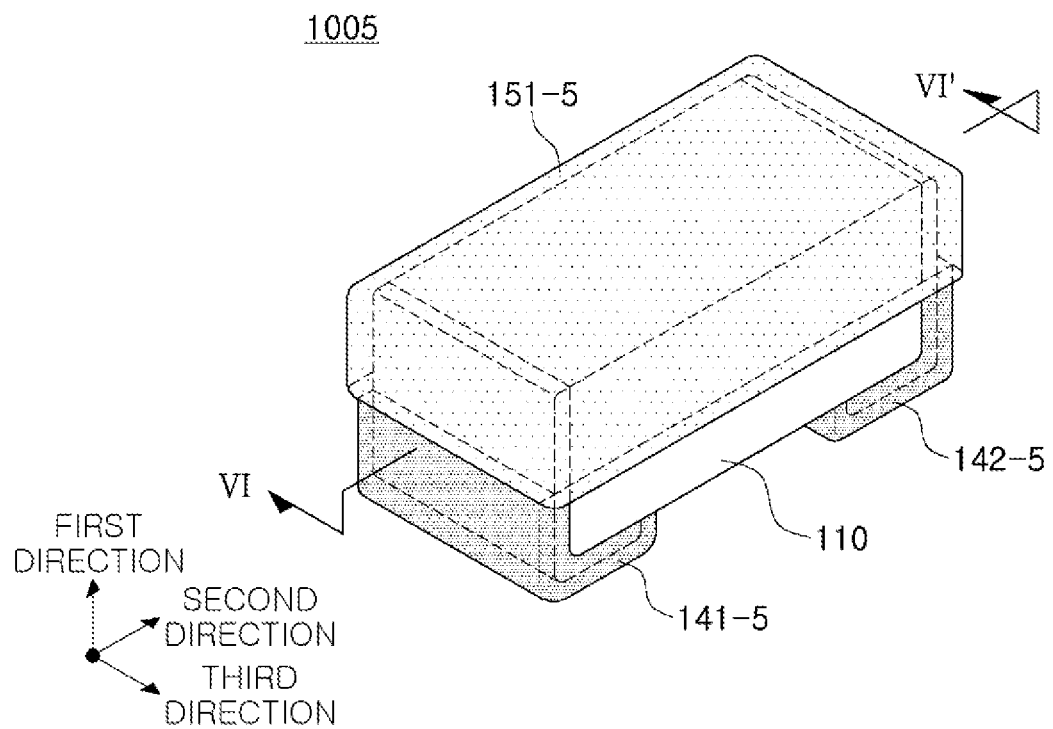
FIG. 14 is a perspective diagram illustrating a multilayer electronic component according to an example embodiment of the present disclosure.
Figure 15:
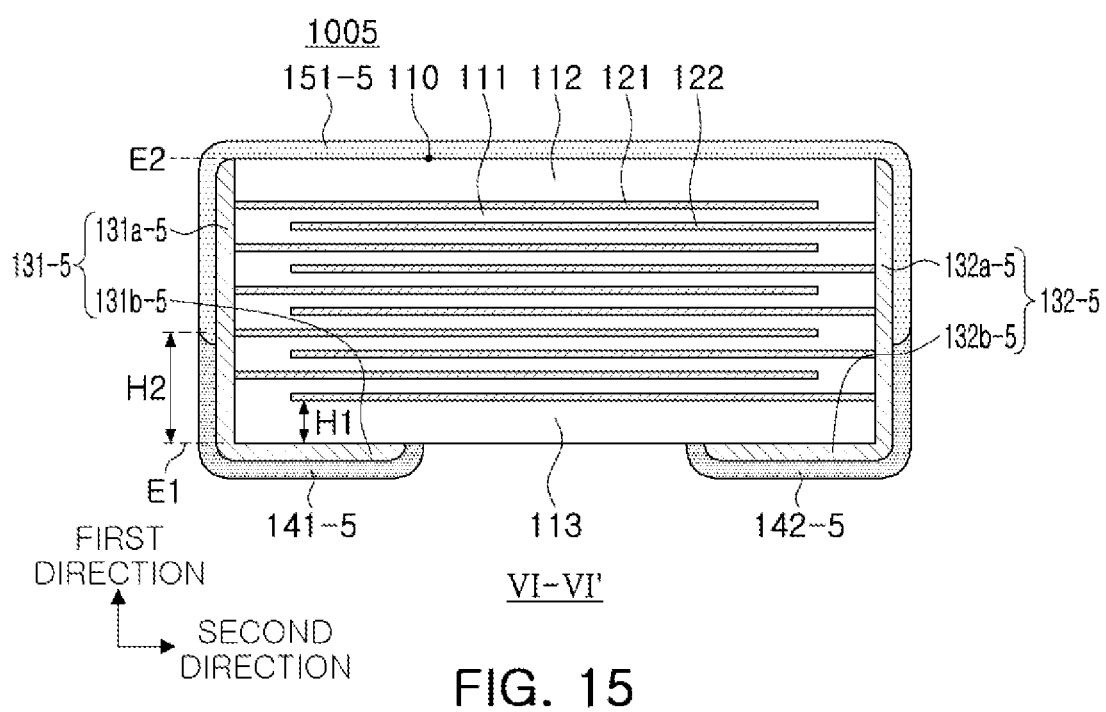
FIG. 15 is a cross-sectional diagram taken along line VI-VI' in FIG. 14.

FIG. 14 is a perspective diagram illustrating a multilayer electronic component according to an example embodiment. FIG. 15 is a cross-sectional diagram taken along line VI-VI' in FIG. 14.

Referring to FIGS. 14 and 15, the first and second external electrodes 131-5 and 132-5 of the multilayer electronic component 1005 in an example embodiment may not be disposed on the second surface, and may be disposed on the third, fourth, and first surfaces and may have an L-shape. That is, the first and second external electrodes 131-5 and 132-5 may be disposed below an extension line of the second surface.

The first external electrode 131-5 may include a first connection portion 131a-5 disposed on the third surface 3, and a first band portion 131b-5 extending from the first connection portion 131a-5 to a first portion of the first surface 1. The second external electrodes 131-5 and 132-5 may include a second connection portion 132a-5 disposed on the fourth surface 4, and a second band portion 132b-5 extending from the second connection portion 132a-5 to a second portion of the first surface 1. The external electrodes 131-5 and 132-5 may not be disposed on the second surface 2, such that the insulating layer 151-5 may be disposed to cover the entire second surface 2. Accordingly the volume occupied by the external electrodes 131-5 and 132-5 may be reduced, such that capacitance per unit volume of the multilayer electronic component 1005 may improve. However, an example embodiment thereof is not limited to the example in which the insulating layer 151-5 cover an entirety of the second surface 2, and the insulating layer may not cover a portion or an entirety of the second surface 2, and may be separated therefrom and may cover the first and second connection portions 131*a*-5 and 132*a*-5.

Also, the insulating layer 151-5 may be disposed to cover portions of the fifth and sixth surfaces, thereby improving reliability. In this case, portions of the fifth and sixth surfaces not covered by the insulating layer 151-5 may be exposed.

Further, the insulating layer 151-5 may be disposed to cover an entirety of the fifth and sixth surfaces, and in this case, the fifth and sixth surfaces may not be exposed, such that moisture resistance reliability may improve.

A first plating layer 141-5 may be disposed on the first band portion 131*b*-5, a second plating layer 142-5 may be disposed on the second band portion 132*b*-5, and the first and second plating layers 141-5 and 142-5 may extend to a portion on the first and second connection portions 131*a*-5 and 132*a*-5.

In this case, the external electrodes 131-5 and 132-5 may not be disposed on the fifth and sixth surfaces 5 and 6 as well. That is, the external electrodes 131-5 and 132-5 may be disposed only on the third, fourth, and first surfaces.

An average distance in the first direction from the first surface 1 to an internal electrode disposed most adjacent (closest) to the first surface 1 among the first and second internal electrodes 121 and 122 is defined as H1, and an average distance in the first direction from an extension line of the first surface 1 to ends of the plating layers 141-5 and 142-5 disposed on the first and second connection portions 131*a*-5 and 132*a*-5 is defined as H2, H1<H2 may be satisfied. Accordingly, the region in contact with solder during mounting may increase such that cohesion strength may improve, and the area in which the external electrodes 131-5 and 132-5 and the plating layers 141-5 and 142-5 are in contact with each other may increase such that an increase in equivalent series resistance (ESR) may be prevented. In some embodiments, an average distance in the first direction from an extension line of the first surface 1 to an end of the first plating layer 141-5 disposed on the first connection portion 131*a*-5 or to an end of the second plating layer 142-5 disposed on the second connection portion 132*a*-5 is defined as H2.

More preferably, when the average size of the body 110 in the first direction is defined as T, H2<T/2 may be satisfied. That is, H1<H2<T/2 may be satisfied, which may be because, when H2 is T/2 or more, the effect of improving moisture resistance reliability by the insulating layer may decrease.

Also, the first and second plating layers 141-5 and 142-5 may be disposed to cover a portion of the insulating layer 151-1 on the third and fourth surfaces. That is, the plating layers 141-5 and 142-5 may be disposed to cover ends of the insulating layer 151-5 on the third and fourth surfaces. Accordingly, bonding force between the insulating layer 151-5 and the plating layers 141-5 and 142-5 may be strengthened such that reliability of the multilayer electronic component 1005 may improve.

Also, the insulating layer 151-5 may be disposed to cover a portion of the first and second plating layers 141-5 and 142-5 on the third and fourth surfaces. That is, the insulating layer 151-5 may be disposed to cover ends of the plating layers 141-5 and 142-5 on the third and fourth surfaces. Accordingly, bonding force between the insulating layer 151-5 and the plating layers 141-5 and 142-5 may be strengthened such that reliability of the multilayer electronic component 1005 may improve.

Figure 16:
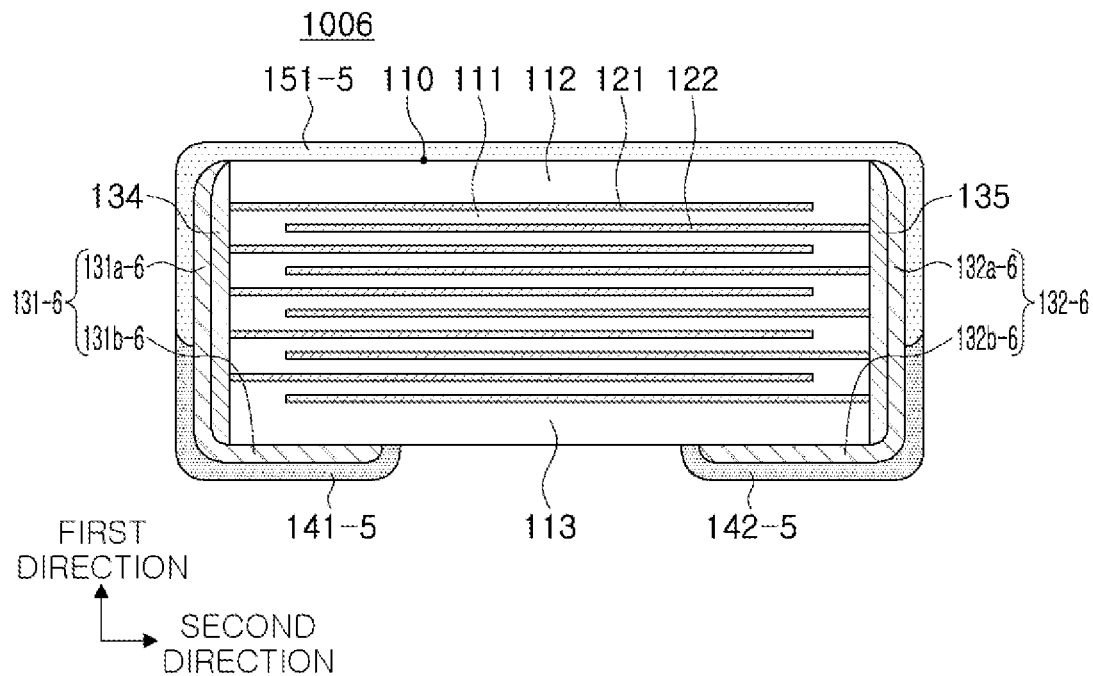
FIG. 16 is a diagram illustrating a modified example of the example in FIG. 14.

FIG. 16 is a diagram illustrating a modified example of the example in FIG. 14. Referring to FIG. 16, in the modified example 1006 of the multilayer electronic component 1005 in an example embodiment, a first additional electrode layer 134 may be disposed between the first connection portion 131*a*-6 and the third surface. A second additional electrode layer 135 may be disposed between the second connection portion 132*a*-6 and the fourth surface. The first additional electrode layer 134 may be disposed within a range not deviating from the third surface, and the second additional electrode layer 135 may be disposed within a range not deviating from the fourth surface. The first and second additional electrode layers 134 and 135 may improve electrical connectivity between the internal electrodes 121 and 122 and the external electrodes 131-6 and 132-6, and bonding strength with the external electrodes 131-6 and 132-6 may be excellent, such that mechanical bonding strength of the external electrodes 131-6 and 132-6 may further improve.

The first and second external electrodes 131-6 and 132-6 may have an L-shape in which the first and second external electrodes are not disposed on the second surface.

The first external electrode 131-6 may include a first connection portion 131*a*-6 disposed on the first additional electrode layer 134, and a first band portion 131*b*-6 extending from the first connection portion 131*a*-6 to a first portion of the first surface 1. The second external electrode 132-6 may include a second connecting portion 132*a*-6 disposed on the second additional electrode layer 135 and a second band portion 132*b*-6 extending from the second connection portion 132*a*-6 to a second portion of the first surface 1.

The first and second additional electrode layers 134 and 135 may be formed of any material having electrical conductivity, such as a metal, and specific materials may be determined in consideration of electrical properties, structural stability, or the like. Also, the first and second additional electrode layers 134 and 135 may be fired electrodes including a conductive metal and glass, or resin-based electrodes including a conductive metal and resin. Also, the first and second additional electrode layers 134 and 135 may be formed by transferring a sheet including a conductive metal to the body.

As the conductive metal included in the first and second additional electrode layers 134 and 135, a material having excellent electrical conductivity may be used, and the material is not limited to any particular example. For example, the conductive metal may be one or more of Cu, Ni, Pd, Ag, Sn, Cr, and alloys thereof. Preferably, the first and second additional electrode layers 134 and 135 may include at least one of Ni and a Ni alloy, and accordingly, connectivity with the internal electrodes 121 and 122 including Ni may further improve.

Figure 17:
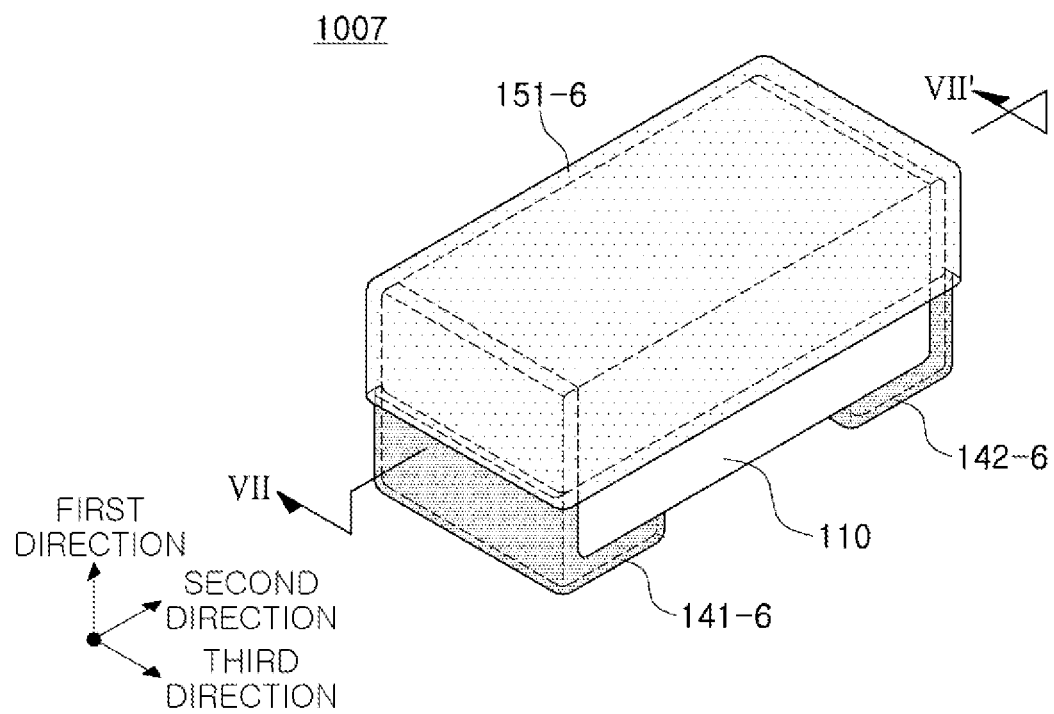
FIG. 17 is a perspective diagram illustrating a multilayer electronic component according to an example embodiment of the present disclosure.
Figure 18:
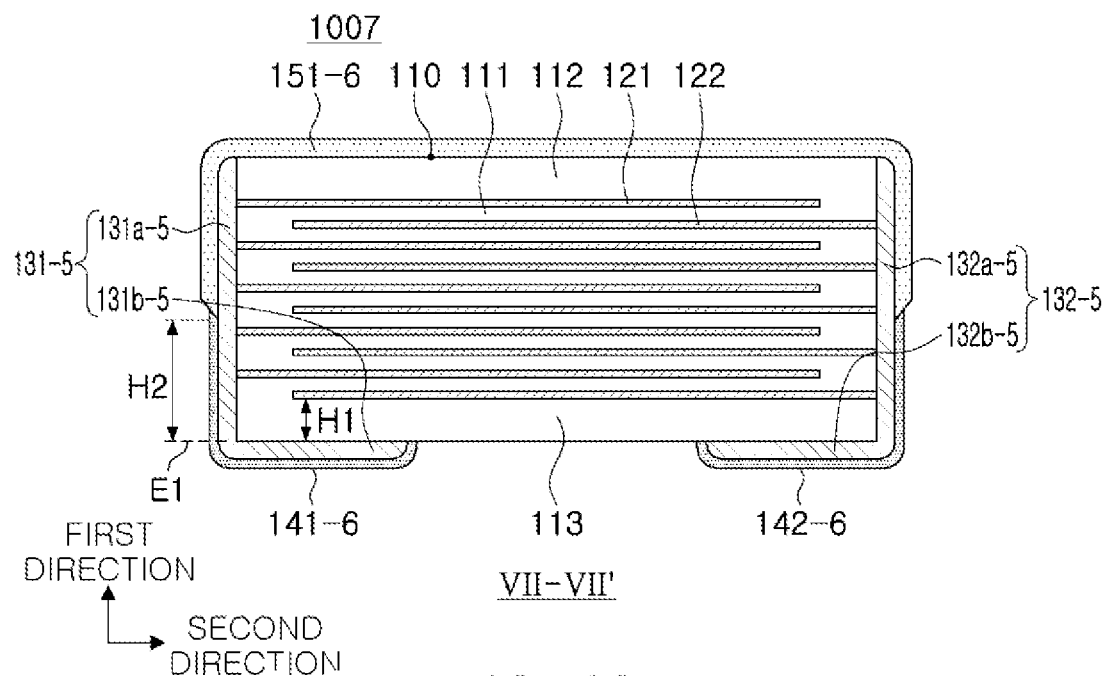
FIG. 18 is a cross-sectional diagram taken along line VII-VII' in FIG. 17.

FIG. 17 is a perspective diagram illustrating a multilayer electronic component according to an example embodiment. FIG. 18 is a cross-sectional diagram taken along line VII-VII' in FIG. 17.

Referring to FIGS. 17 and 18, an average thickness t1 of the first and second plating layers 141-6 and 142-6 of the multilayer electronic component 1006 in an example embodiment may be less than an average thickness t2 of the insulating layer 151-6.

The insulating layer 151-6 may prevent permeation of external moisture or the plating solution, but connectivity with the plating layers 141-6 and 142-62 may be relatively weak, which may cause delamination of the plating layer. When the plating layer is delaminated, cohesion strength with the substrate may be reduced. Here, the delamination of the plating layer may refer to separation of a portion of the plating layer or physical separation of the plating layer from the external electrodes 131-5 and 132-5. Since the connection between the plated layer and the insulating layer is relatively weak, it may be highly likely that a gap between the insulating layer and the plated layer may be widened or foreign substances may enter, and the possibility of delamination may increase due to vulnerability to external impacts.

In an example embodiment, by reducing the average thickness of the plated layer t1 to be less than the average thickness of the insulating layer t2, the contact area between the plated layer and the insulating layer may be reduced, thereby preventing delamination and improving cohesion strength of the multilayer electronic component 1000 with the substrate 180.

The thickness t1 of the first and second plating layers 141-6 and 142-6 may be an average value of thicknesses at 5 points of the first and second connection portions 131a-5 and 132a-5 or the first and second band portions 131b-5 and 132b-5, spaced apart by an equal distance, and the thickness t2 of the insulating layer 151-6 may be an average value of thicknesses at 5 points of the first and second connection portions 131a-5 and 132a-5, spaced apart by an equal distance.

Figure 19:
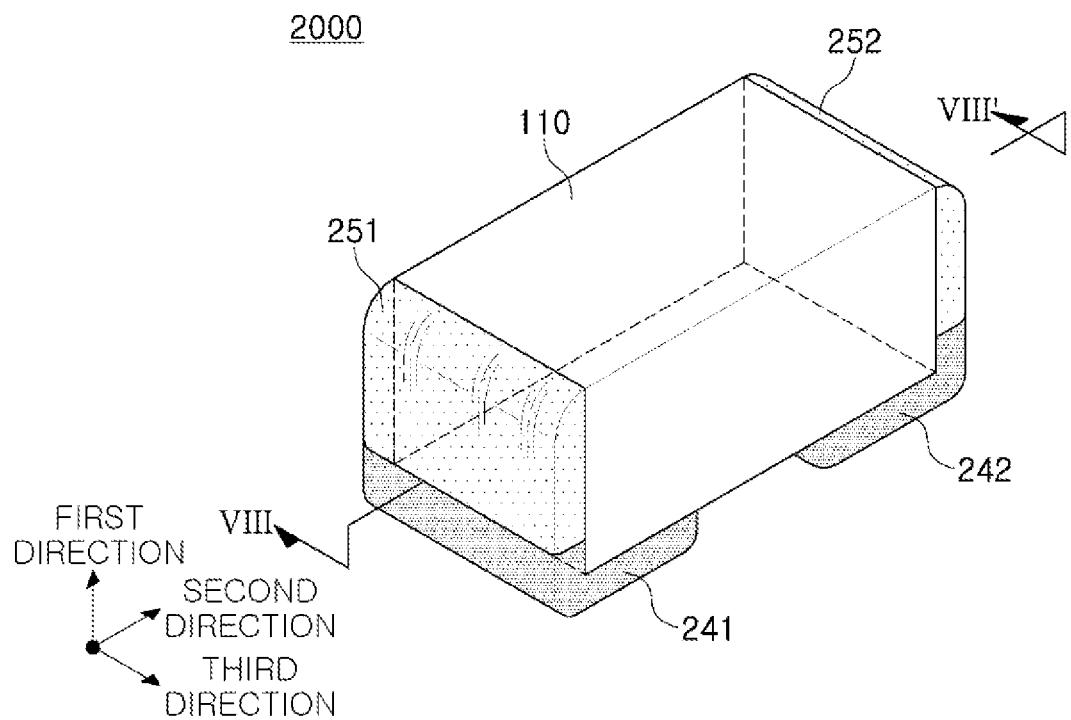
FIG. 19 is a perspective diagram illustrating a multilayer electronic component according to an example embodiment of the present disclosure.
Figure 20:
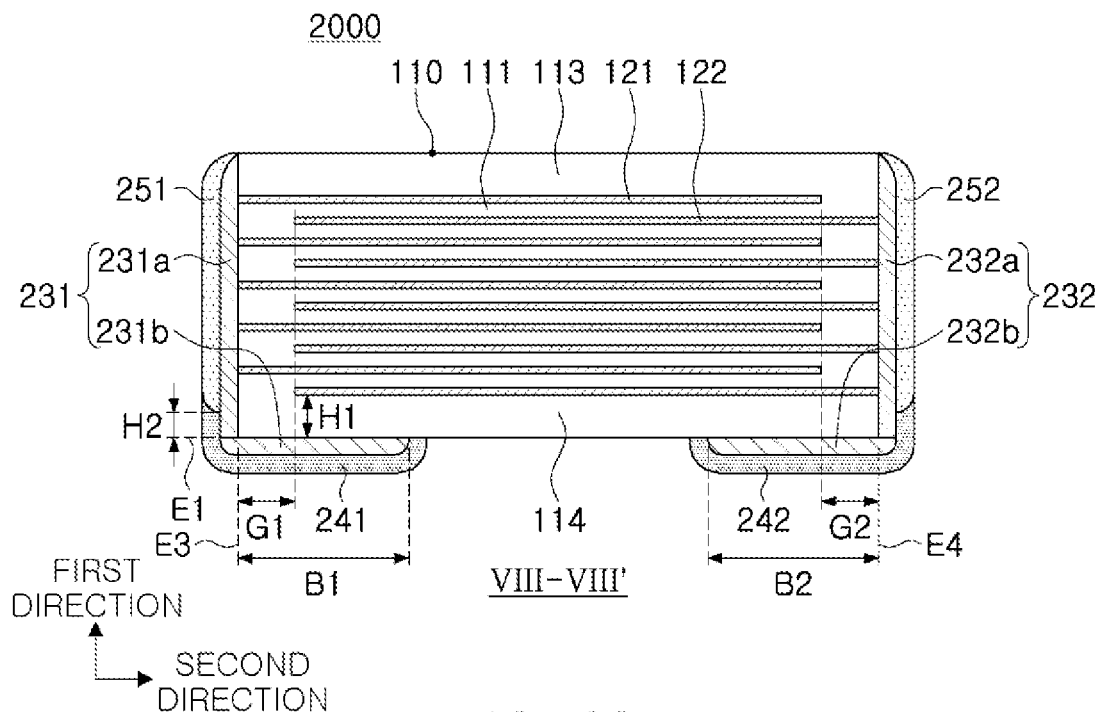
FIG. 20 is a cross-sectional diagram taken along line VIII-VIII' in FIG. 19.

FIG. 19 is a perspective diagram illustrating a multilayer electronic component 2000 according to an example embodiment. FIG. 20 is a cross-sectional diagram taken along line VIII-VIII' in FIG. 19.

Hereinafter, a multilayer electronic component 2000 according to an example embodiment will be described, and the description overlapping the aforementioned example embodiment will not be provided.

The multilayer electronic component 2000 in an example embodiment may include a dielectric layer 111 and first and second internal electrodes 121 and 122 alternately disposed with the dielectric layer 111 interposed therebetween, and may further include a body 110 including first and second surfaces 1 and 2 opposing each other in the first direction, third and fourth surfaces 3 and 4 connected to the first and second surfaces 1 and 2 and opposing in the second direction, and fifth and sixth surfaces 5 and 6 connected to the first and second surfaces 1 and 2 and the third and fourth surfaces 3 and 4 and opposing each other in the third direction; a first external electrode 231 including a first connection electrode 231a disposed on the third surface and a first band electrode 231b disposed on the first surface and connected to the first connection electrode; a second external electrode 232 including a second connection electrode 232a disposed on the fourth surface and a second band electrode 232b disposed on the first surface and connected to the second connection electrode; a first insulating layer 251 disposed on the first connection electrode; a second insulating layer 252 disposed on the second connection electrode; a first plating layer 241 disposed on the first band electrode; and a second plating layer 242 disposed on the second band electrode, wherein the first and second insulating layers 251 and 252 may include an oxide including zirconium (Zr).

The first connection electrode 231a may be disposed on the third surface 3 and may be connected to the first internal electrode 121, and the second connection electrode 231a may be disposed on the fourth surface 4 and may be connected to the second internal electrode 122. Also, a first insulating layer 251 may be disposed on the first connection electrode 231a', and a second insulating layer 252 may be disposed on the second connection electrode 232a.

Generally, when an external electrode is formed, a method of dipping the exposed surface of the internal electrode of the body into paste including a conductive metal using paste including a conductive metal may be mainly used. However, a thickness of the external electrode formed by the dipping method may be excessively increased in a central portion thereof in the thickness direction. Also, in addition to the thickness imbalance of the external electrode by using the dipping method, since the internal electrode is exposed to the third and fourth surfaces, to prevent permeation of moisture and plating solution through the external electrode, the thickness of the external electrode disposed on the third and fourth surfaces may be equal to or greater than a predetermined thickness.

Differently from the above example, in the example embodiment, since the insulating layers 251 and 252 are disposed on the connection electrodes 231a and 232a, even when a thickness of the connection electrodes 231a and 232a on the third and fourth surfaces is reduced, sufficient reliability may be secured.

The first and second connection electrodes 231a and 232a may have a shape corresponding to the third and fourth surfaces, respectively, and the surface of the first and second connection electrodes 231a and 232a facing the body 110 may have the same area as the third and fourth surfaces of the body 110. The first and second connection electrodes 231a and 232a may be disposed within a range not deviating from the third and fourth surfaces 3 and 4, respectively. The connection electrodes 231a and 232a may be disposed to not extend to the first, second, fifth, and sixth surfaces 1, 2, 5, and 6 of the body 110. Specifically, in an example embodiment, the first and second connection electrodes 231a and 232a may be spaced apart from the fifth and sixth surfaces, and accordingly, sufficient connectivity between the internal electrodes 121 and 122 and the external electrodes 231 and 232 may be secured, and the volume occupied by the external electrode may be reduced, such that per unit volume of the multilayer electronic component 2000 may increase.

In this regard, the first and second connection electrodes 231a and 232a may be spaced apart from the second surface 2. That is, since the external electrodes 231 and 232 are not disposed on the second surface, the volume occupied by the external electrodes 231 and 232 may be further reduced such that capacitance per unit volume of the multilayer electronic component 2000 may increase.

The connection electrodes 231a and 232a may extend to a corner of the body 110 and may include a corner portion disposed on the corner. That is, in an example embodiment, the first connection electrode may include a corner portion (not illustrated) extending to the 1-3 corner and the 2-3 corner, and the second connection electrode may include a corner portion (not illustrated) extending to the 1-4 corner and the 2-4 corner.

Also, the connection electrodes 231a and 232a may have a uniform and reduced thickness as compared to the external electrodes formed by a general dipping method.

The method of forming the connection electrodes 231a and 232a is not limited to any particular example, and for example, the connection electrodes 231a and 232a may be formed by a method of transferring a sheet including a conductive metal or an organic material such as a binder to the third and fourth surfaces, but an example embodiment thereof is not limited thereto, and connection electrodes 231a and 232a may be formed by plating a conductive metal on the third and fourth surfaces. That is, the connection electrodes 231a and 232a may be a fired layer formed by firing a conductive metal or a plating layer.

The thickness of the connection electrodes 231a and 232a is not limited to any particular example, and may be, for example, 2 to 7 μm. Here, the thickness of the connection electrodes 231a and 232a may indicate the maximum thickness, and may indicate the size of the connection electrodes 231a and 232a in the second direction.

In an example embodiment, the first and second connection electrodes 231a and 232a may include a metal and glass the same as those included in the internal electrodes 121 and 122. As the first and second connection electrodes 231a and 232a include the same metal as the metal included in the internal electrodes 121 and 122, electrical connectivity with the internal electrodes 121 and 122 may improve, and as the first and second connection electrodes 231a and 232a include glass, bonding strength with the body 110 and/or the insulating layers 251 and 252 may improve. In this case, the same metal as the metal included in the internal electrodes 121 and 122 may be Ni.

The first and second insulating layers 251 and 252 may be disposed on the first and second connection electrodes 231a and 232a and may prevent a plating layer from being formed on the first and second connection electrodes 231a and 232a. Also, the first and second insulating layers 251 and 252 may improve sealing properties, thereby reducing permeation of moisture or a plating solution.

The first and second insulating layers 251 and 252 may include an oxide including zirconium (Zr).

Accordingly, moisture resistance reliability may improve, and cracks caused by thermal reduction, radiation cracks caused by metal diffusion, and the like, may be prevented.

The first and second band electrodes 231b and 232b may be disposed on the first surface 1 of the body 110. The first and second band electrodes 231b and 232b may be electrically connected to the first and second internal electrodes 121 and 122 by being in contact with the first and second connection electrodes 231a and 232a, respectively.

A thickness of the external electrode formed by a general dipping method may be formed to be relatively great on the third and fourth surfaces and may partially extend to the first, second, fifth and sixth surfaces, such that it may be difficult to secure a high effective volume ratio.

In an example embodiment, the first and second connection electrodes 231a and 232a may be disposed on the surface on which the internal electrode is exposed, and the first and second band electrodes 231b and 232b may be disposed on the surface of the substrate, such that a high effective volume ratio may be secured.

When the internal electrodes 121 and 122 are laminated in the first direction, the multilayer electronic component 2000 may be horizontally mounted on a substrate such that the internal electrodes 121 and 122 may be parallel to the mounting surface. However, an example embodiment thereof is not limited to the horizontal mounting, and when the internal electrodes 121 and 122 are laminated in the third direction, the multilayer electronic component may be vertically mounted on the substrate such that the internal electrodes 121 and 122 may be perpendicular to the mounting surface.

The first and second band electrodes 231b and 232b may be formed of any material having electrical conductivity, such as metal, and a specific material may be determined in consideration of electrical properties and structural stability. For example, the first and second band electrodes 231b and 232b may be fired electrodes including conductive metal and glass, and may be formed by applying paste including conductive metal and glass to the first surface of the body, but an example embodiment thereof is not limited thereto, and the first and second band electrodes 231b and 232b may be plating layers formed by plating a conductive metal on the first surface of the body.

A material having excellent electrical conductivity may be used as the conductive metal included in the first and second band electrodes 231b and 232b, and the material is not limited to any particular example. For example, the conductive metal may be one or more of nickel (Ni), copper (Cu), and alloys thereof, and may include the same metal as the metal included in the internal electrodes 121 and 122.

Meanwhile, in an example embodiment, to secure sealing properties and high strength, the first external electrode 231 may include a third band electrode (not illustrated) disposed on the second surface 2 and connected to the first connection electrode 231a, and the second external electrode 232 may include a fourth band electrode (not illustrated) disposed on the second surface 2 and connected to the second connection electrode 232a.

In an example embodiment, the distance from an extension line E3 of the third surface to an end of the first band electrode 231b is defined as B1, the distance from an extension line E4 of the fourth surface to an end of the second band electrode 232b is defined as B2, a distance from an extension line of the third surface to an end of the third band electrode (not illustrated) is defined as B3, a distance from an extension line of the fourth surface to an end of the fourth band electrode (not illustrated) is defined as B4, an average size of the region in which the third surface and the second internal electrode 122 are spaced apart from each other, taken in the second direction, is defined as G1, and an average size of the region in which the fourth surface and the first internal electrode 121 are spaced apart from each other, taken in the second direction, is defined as G2, B1≥G1, B3≤G1, B2≥G2 and B4≤G2 may be satisfied. Accordingly, the volume occupied by the external electrode may be reduced, such that capacitance per unit volume of the multilayer electronic component 2000 may increase and the area in contact with solder during mounting may increase, thereby improving cohesion strength.

However, an example embodiment thereof is not limited to B1≥G1, B3≤G1, B2≥G2 and B4≤G2, and the example in which B1≥G1, B3≥G1, B2≥G2 and B4≥G2 are satisfied may be included in the example embodiment. Accordingly, in an example embodiment, the distance B1 from an extension line E3 of the third surface to an end of the first band electrode 231b is defined as B1, the distance from the extension line E4 of the fourth surface to the end of the second band electrode 232b is defined as B2, the distance from the extension line of the third surface to the end of the third band electrode (not illustrated) is defined as B3, the distance from the extension line of the fourth surface to the end of the fourth band electrode (not illustrated) is defined as B4, and the average size of the region in which the third surface and the second internal electrode 122 are spaced apart from each other, taken in the second direction, is defined as G1, and the average size of the region in which the fourth surface and the first internal electrode 121 are spaced apart from each other, taken in the second direction, is defined as G2, B1≥G1, B3≥G1, B2≥G2 and B4≥G2 may be satisfied.

The first and second plating layers 241 and 242 may be disposed on the first and second band electrodes 231b and 232b. The first and second plating layers 241 and 242 may improve mounting properties. The types of the first and second plating layers 241 and 242 are not limited to any particular example, and may be a plating layer including at least one of Ni, Sn, Pd, and alloys thereof, and may include a plurality of layers.

For example, the first and second plating layers 241 and 242 may be a Ni plating layer or a Sn plating layer, and the Ni plating layer and the Sn plating layer may be formed in order on the first and second band electrodes 231b and 232b.

In an example embodiment, the first and second plating layers 241 and 242 may extend to partially cover the first and second connection electrodes 231a and 232a, respectively.

When an average distance in the first direction from the first surface 1 to the internal electrode disposed most adjacent (closest) to the first surface 1 among the first and second internal electrodes 121 and 122 is defined as H1, and an average distance in the first direction from an extension line of the first surface 1 to an ends of the first and second plating layers 241 and 242 disposed on the first and second connection electrodes 231a and 232a is defined as H2, H1>H2 may be satisfied. Accordingly, permeation of the plating solution into the internal electrode during the plating process may be prevented, thereby improving reliability. In some embodiments, an average distance in the first direction from an extension line of the first surface 1 to an end of the first plating layer 241 disposed on the first connection electrode 231a or to an end of the second plating layer 242 disposed on the second connection electrode 232a is defined as H2.

In an example embodiment, the first and second insulating layers 251 and 252 may be disposed to be in direct contact with the first and second connection electrodes 231a and 232a, respectively, and the first and second connection electrodes 231a and 232a may include conductive metal and glass. Accordingly, since the plating layers 241 and 242 may not be disposed on the regions in which the insulating layers 251 and 252 are disposed among the exterior surfaces of the first and second connection electrodes 231a and 232a, erosion of the external electrodes caused by the plating solution may be effectively prevented.

In an example embodiment, the first and second insulating layers 251 and 252 may be disposed to be in direct contact with the first and second connection electrodes 231a and 232a, respectively, and the first and second connection electrodes 231a and 232a may include conductive metal and glass. Accordingly, since the plating layers 241 and 242 may not be disposed on the regions in which the insulating layers 251 and 252 are disposed among the exterior surfaces of the first and second connection electrodes 231a and 232a, erosion of the external electrodes caused by the plating solution may be effectively prevented.

In an example embodiment, the first plating layer 241 may be disposed to cover an end of the first insulating layer 251 disposed on the first external electrode 231, and the second plating layer 242 may be disposed to cover an end of the second insulating layer 252 disposed on the second external electrode 232. Accordingly, bonding force between the insulating layers 251 and 252 and the plating layers 241 and 242 may be strengthened, such that reliability of the multilayer electronic component 2000 may improve. Also, by first forming the first and second insulating layers 251 and 252 before forming the plating layers 241 and 242 on the external electrodes 231 and 232, permeation of the plating solution in the process of forming a plating layer may be reliably prevented. As the insulating layer is formed before the plating layer, the plating layers 241 and 242 may have a shape covering the ends of the insulating layers 251 and 252.

In an example embodiment, the first insulating layer 251 is disposed to cover the end of the first plating layer 241 disposed on the first external electrode 231, and the second insulating layer 252 may be disposed to cover an end of the second plating layer 242 disposed on the second external electrode 232. Accordingly, bonding force between the insulating layer 251 and the plating layers 241 and 242 may be strengthened, such that reliability of the multilayer electronic component 2000 may improve.

Figure 21:
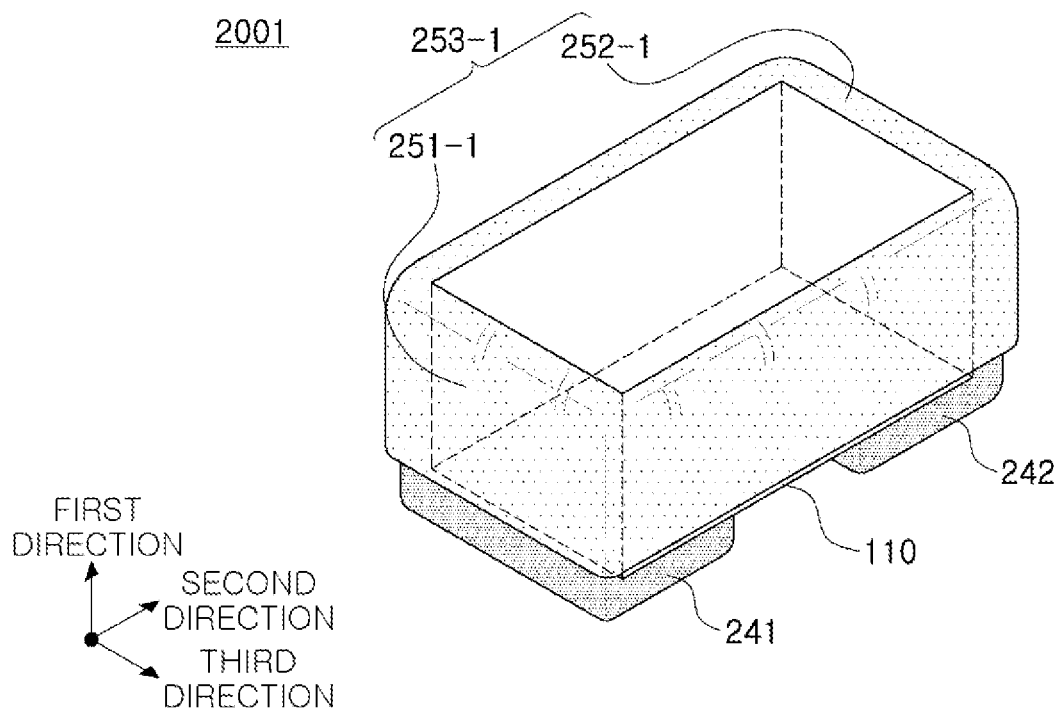
FIG. 21 is a diagram illustrating a modified example of the example in FIG. 19.

FIG. 21 is a diagram illustrating a modified example of the example in FIG. 19. Referring to FIG. 21, in the modified example 2001 of the multilayer electronic component 2000, the first and second insulating layers 251-1 and 252-1 may extend to the fifth and sixth surfaces 5 and 6 and may be connected to each other such that the insulating layers may be connected as an integrated insulating layer 253-1. In this case, the connected first and second insulating layers 253-1 may be disposed to cover portions of the fifth and sixth surfaces.

Figure 22:
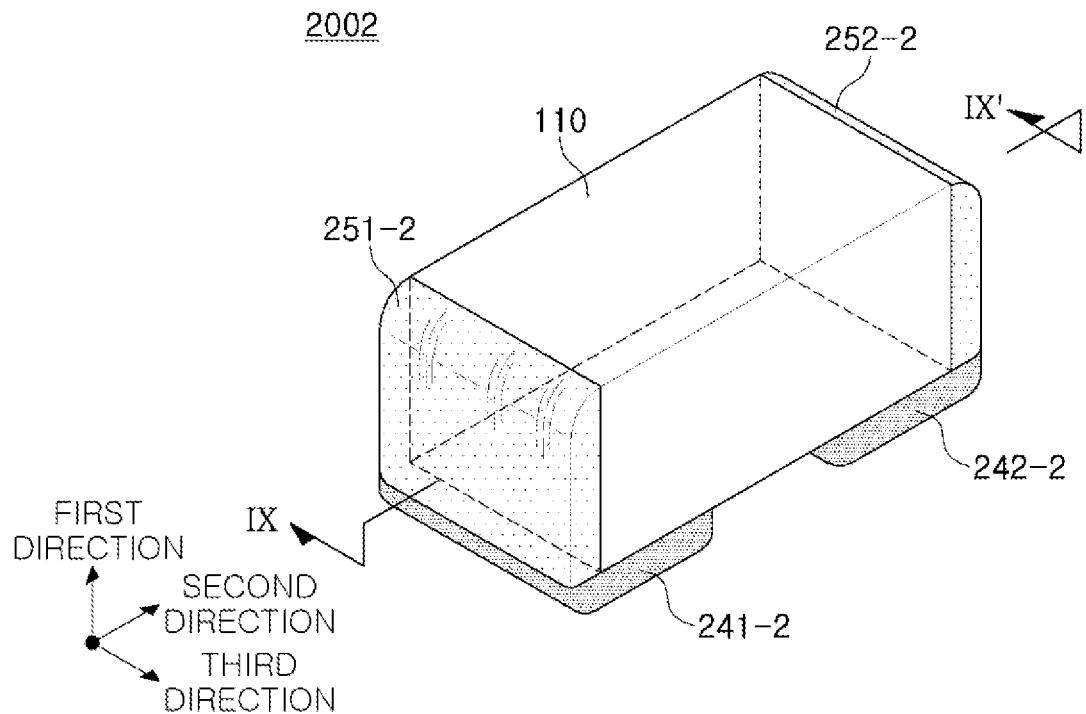
FIG. 22 is a perspective diagram illustrating a multilayer electronic component according to an example embodiment of the present disclosure.
Figure 23:
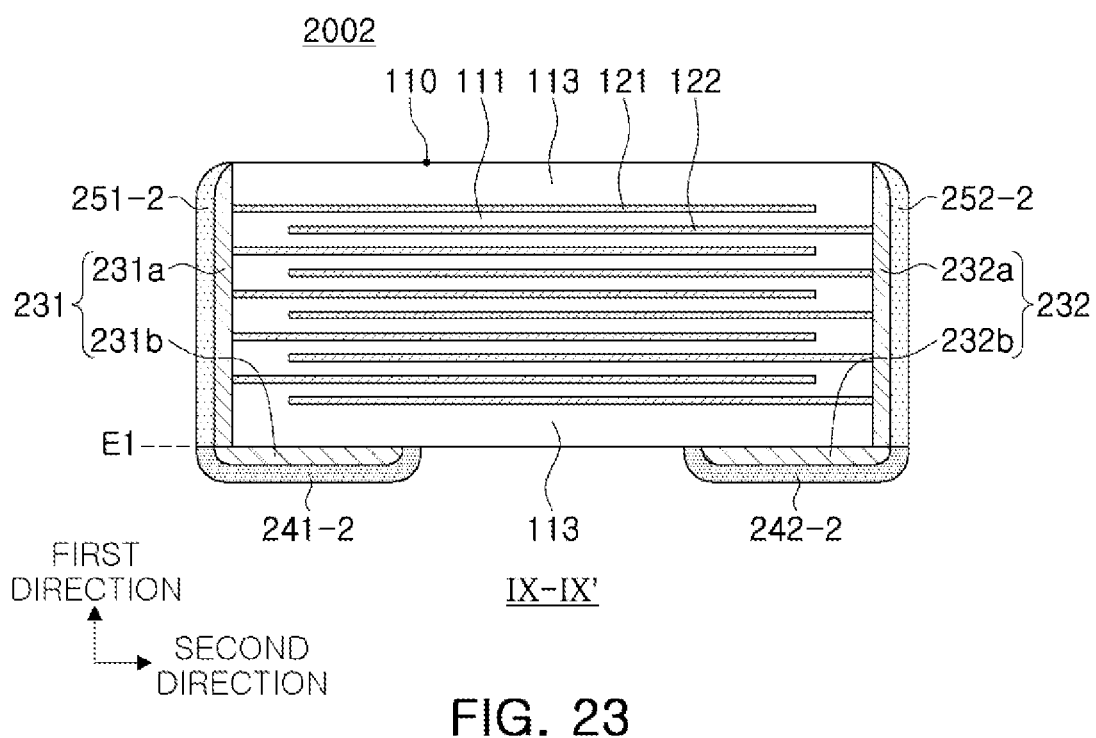
FIG. 23 is a cross-sectional diagram taken along line IX-IX' in FIG. 22.

FIG. 22 is a perspective diagram illustrating a multilayer electronic component 2002 according to an example embodiment. FIG. 23 is a cross-sectional diagram taken along line IX-IX' in FIG. 2.

Referring to FIGS. 22 and 23, in the multilayer electronic component 2002 in an example embodiment, the first and second plating layers 241-2 and 242-2 may be disposed to a region below the extension line of the first surface. Accordingly, a height of solder may be reduced during mounting and a mounting space may be reduced.

Also, the first and second insulating layers 251-2 and 252-2 may extend to a region below the extension line of the first surface and may be in contact with the first and second plating layers 241-2 and 242-2.

Figure 24:
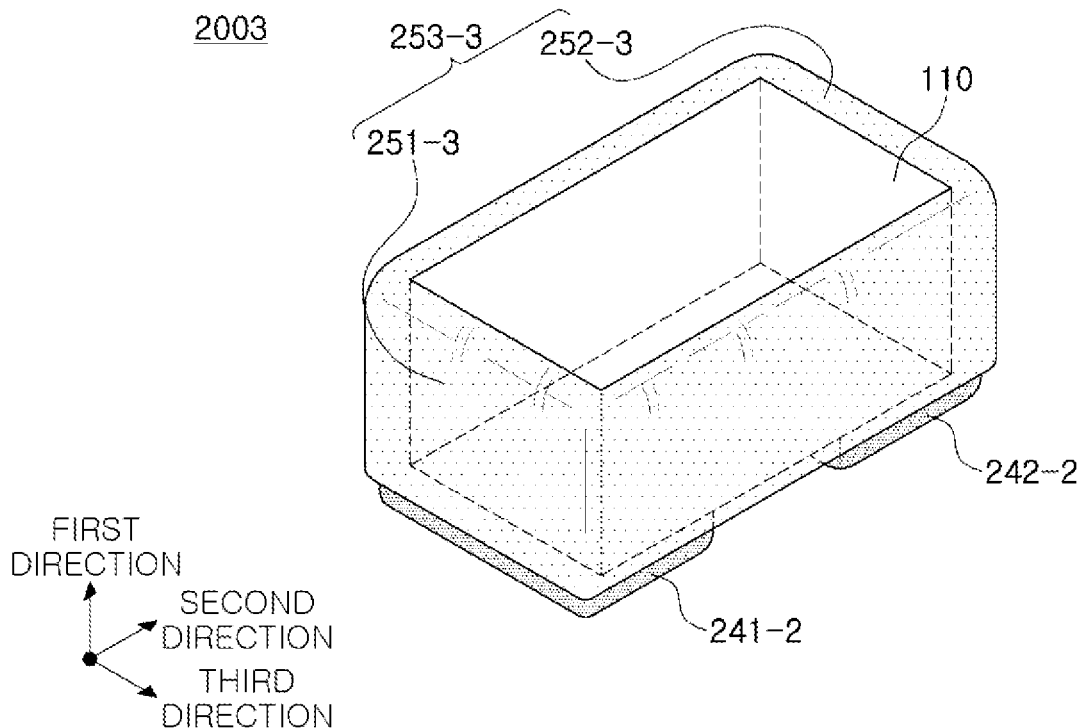
FIG. 24 is a diagram illustrating a modified example of the example in FIG. 22.

FIG. 24 is a diagram illustrating a modified example of the example in FIG. 22. Referring to FIG. 24, in the modified example 2003 of the multilayer electronic component 2002 in an example embodiment, the first and second insulating layers 251-3 and 252-3 may extend to the fifth and sixth surfaces 5 and 6 and may be connected to each other such that the insulating layers may be connected as an integrated insulating layer 253-3.

Figure 25:
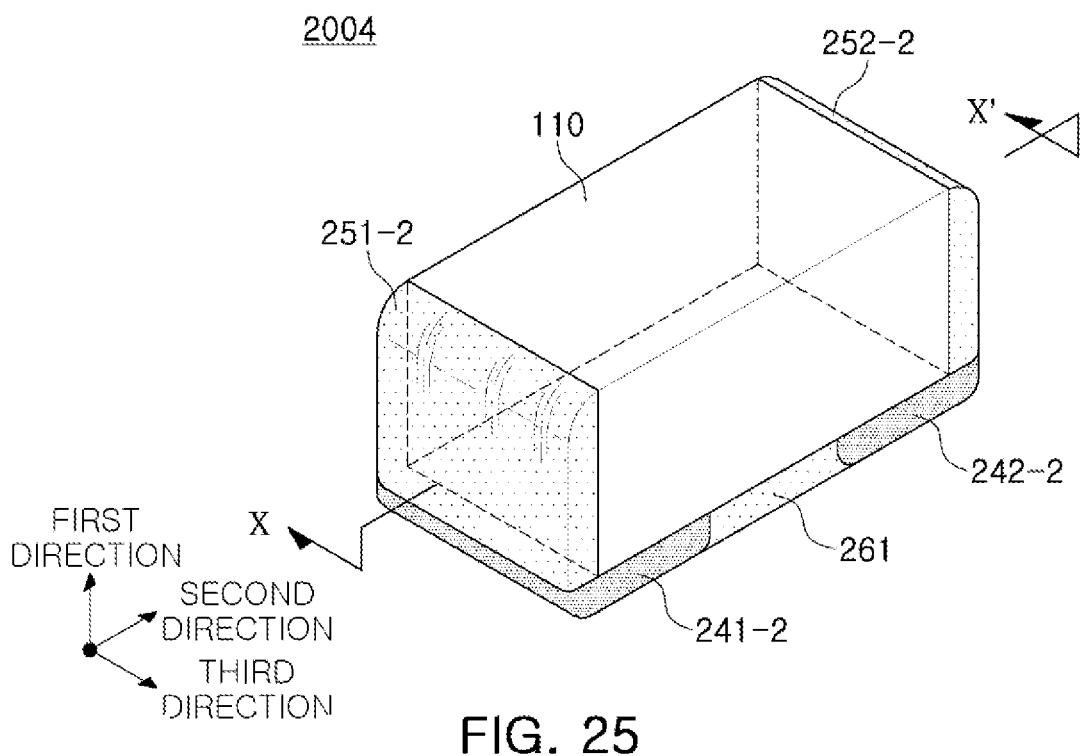
FIG. 25 is a perspective diagram illustrating a multilayer electronic component according to an example embodiment of the present disclosure.
Figure 26:
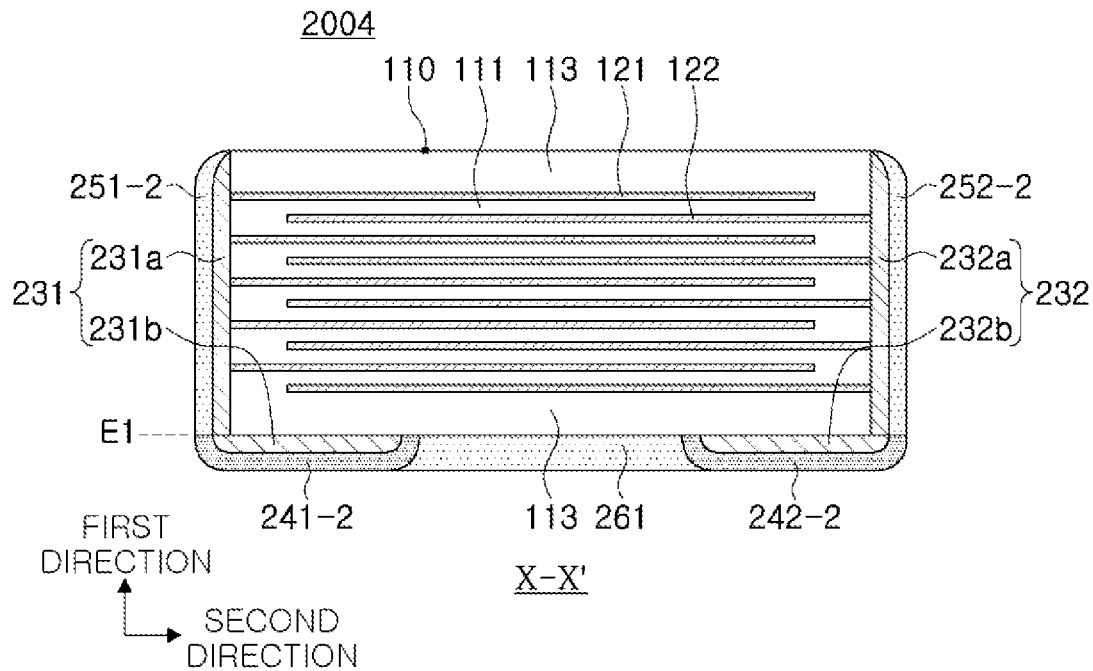
FIG. 26 is a cross-sectional diagram taken along line X-X' in FIG. 25.

FIG. 25 is a perspective diagram illustrating a multilayer electronic component 2004 according to an example embodiment. FIG. 26 is a cross-sectional diagram taken along line X-X' in FIG. 25.

Referring to FIGS. 25 and 26, the multilayer electronic component 2004 in an example embodiment may further include an additional insulating layer 261 disposed on the first surface 1 and disposed between the first band electrode 231b and the second band electrode 232b. Accordingly, a leakage current that may occur between the first band electrode 231b and the second band electrode 232b under a high voltage current may be prevented.

The type of the additional insulating layer 261 is not limited to any particular example. For example, the additional insulating layer 261 may include the same components as those of the insulating layers 251-2 and 252-2. The additional insulating layer 261 and the insulating layers 251-2 and 252-2 is not formed of the same material, and may be formed of different materials. For example, the additional insulating layer 261 may include at least one selected from an epoxy resin, an acrylic resin, ethyl cellulose, and the like, or glass.

Figure 27:
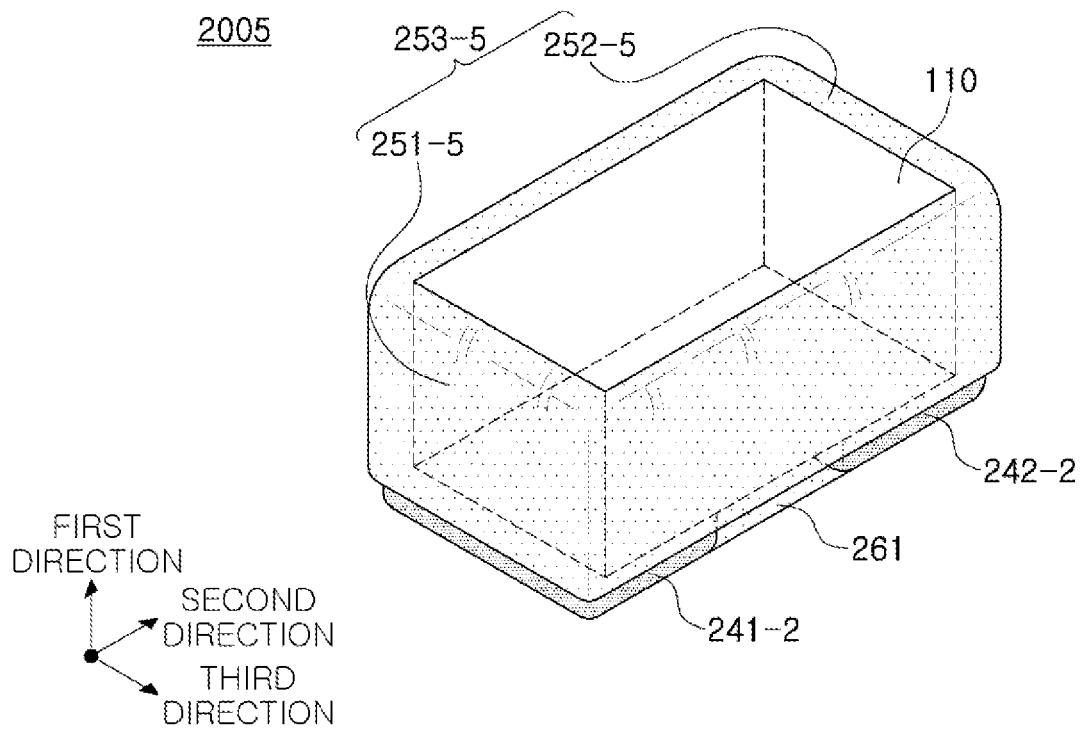
FIG. 27 is a diagram illustrating a modified example of the example in FIG. 25.

FIG. 27 is a diagram illustrating a modified example of the example in FIG. 25. Referring to FIG. 27, in the modified example 2005 of the multilayer electronic component 2004, the first and second insulating layers 251-5 and 252-5 may extend to the fifth and sixth surfaces 5 and 6 and may be connected to each other such that the insulating layers may be connected as an integrated insulating layer 253-5.

Figure 28:
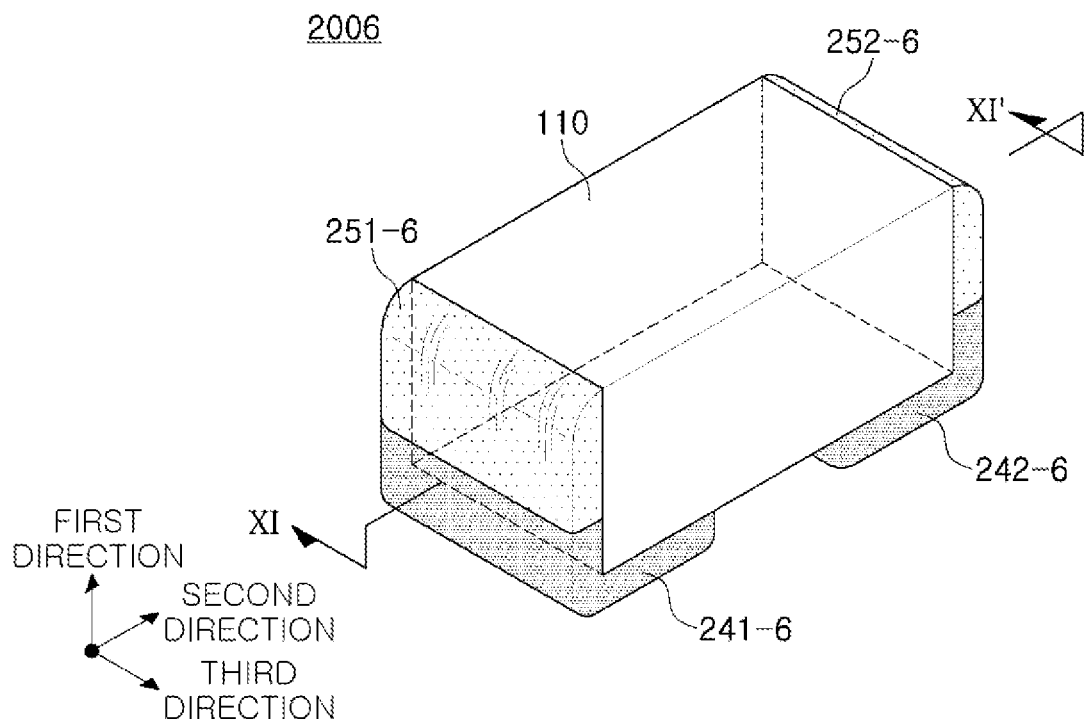
FIG. 28 is a perspective diagram illustrating a multilayer electronic component according to an example embodiment of the present disclosure.
Figure 29:
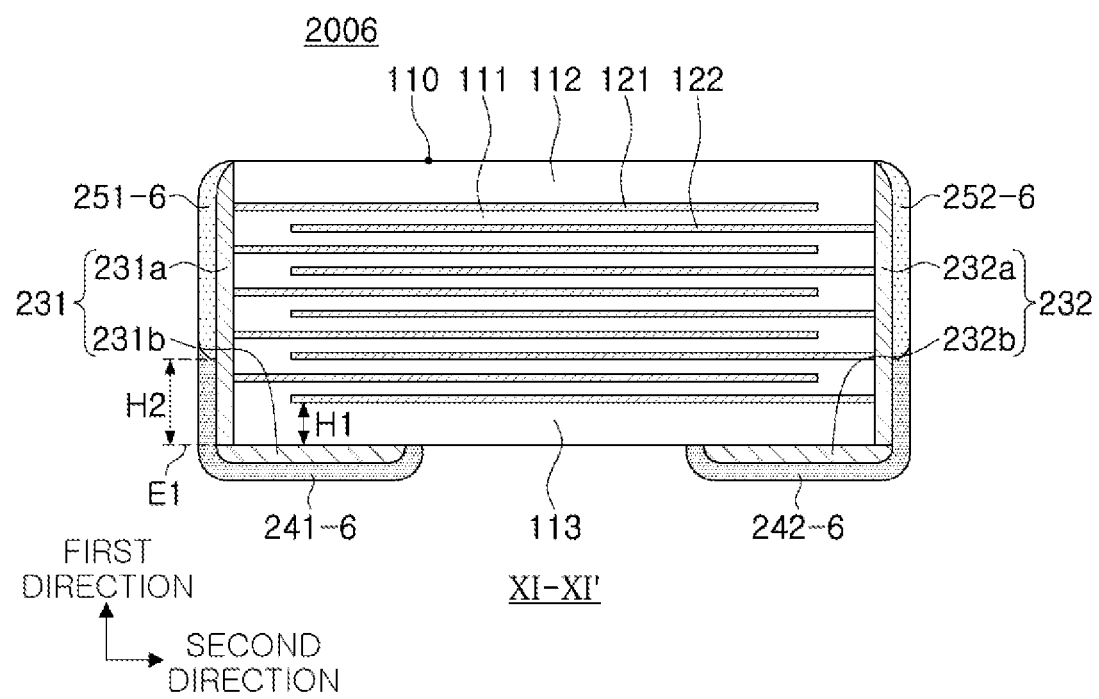
FIG. 29 is a cross-sectional diagram taken along line XI-XI' in FIG. 28.

FIG. 28 is a perspective diagram illustrating a multilayer electronic component 2006 according to an example embodiment. FIG. 29 is a cross-sectional diagram taken along line XI-XI' in FIG. 28.

Referring to FIGS. 28 and 29, the multilayer electronic component 2006 according to an example embodiment may include a first insulating layer 251-6 disposed on a first connection electrode 231a and a second insulating layer 252-6 disposed on a second connection electrode 232a. When an average distance in the first direction from the first surface 1 to an internal electrode disposed most adjacent (closest) to the first surface 1 among the first and second internal electrodes 121 and 122 is defined as H1, and an average distance in the first direction from an extension line of the first surface 1 to ends of the first and second plating layers 241-6 and 242-6 disposed on the first and second connection electrodes 231a and 232a is defined as H2, H1<H2 may be satisfied. Accordingly, the area in contact with the solder during mounting may increase, thereby improving cohesion strength.

More preferably, when the average size of the body 110 in the first direction is defined as T, H2<T/2 may be satisfied. That is, H1<H2<T/2 may be satisfied, which may be because the effect of improving moisture resistance reliability by an insulating layer may degrade when H2 is T/2 or more.

Figure 30:
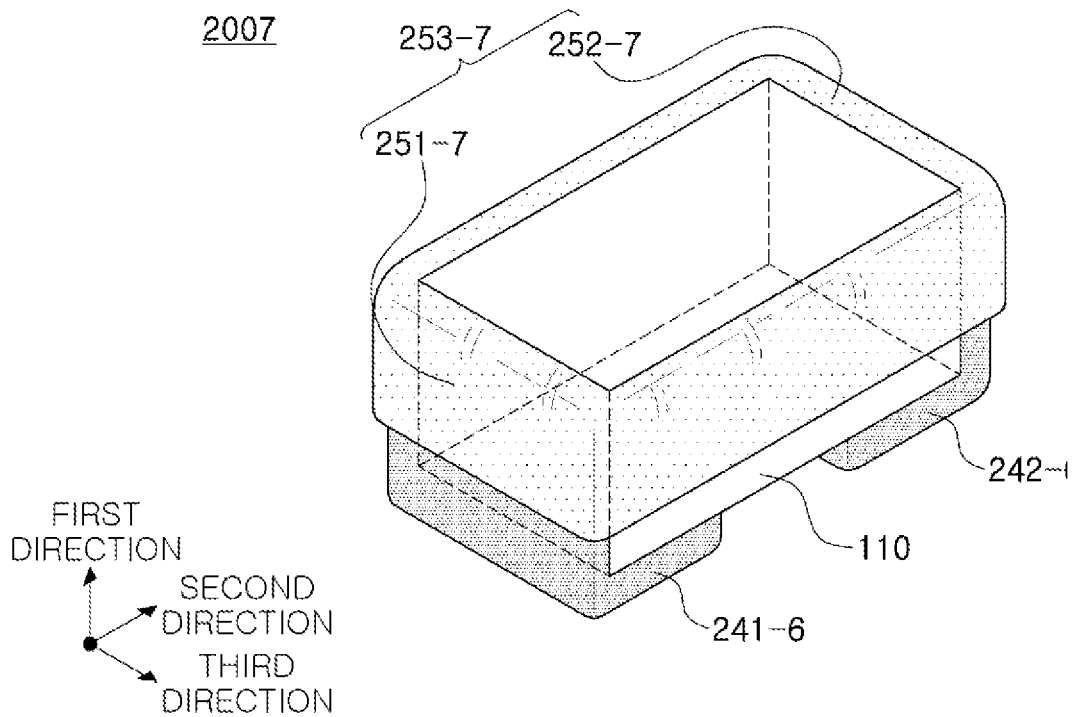
FIG. 30 is a diagram illustrating a modified example of the example in FIG. 28.

FIG. 30 is a diagram illustrating a modified example of the example in FIG. 28. Referring to FIG. 30, in the modified example 2007 of the multilayer electronic component 2006, the first and second insulating layers 251-7 and 252-7 may extend to the fifth and sixth surfaces 5 and 6 and may be connected to each other such that the insulating layers may be connected as an integrated insulating layer 253-7.

Figure 31:
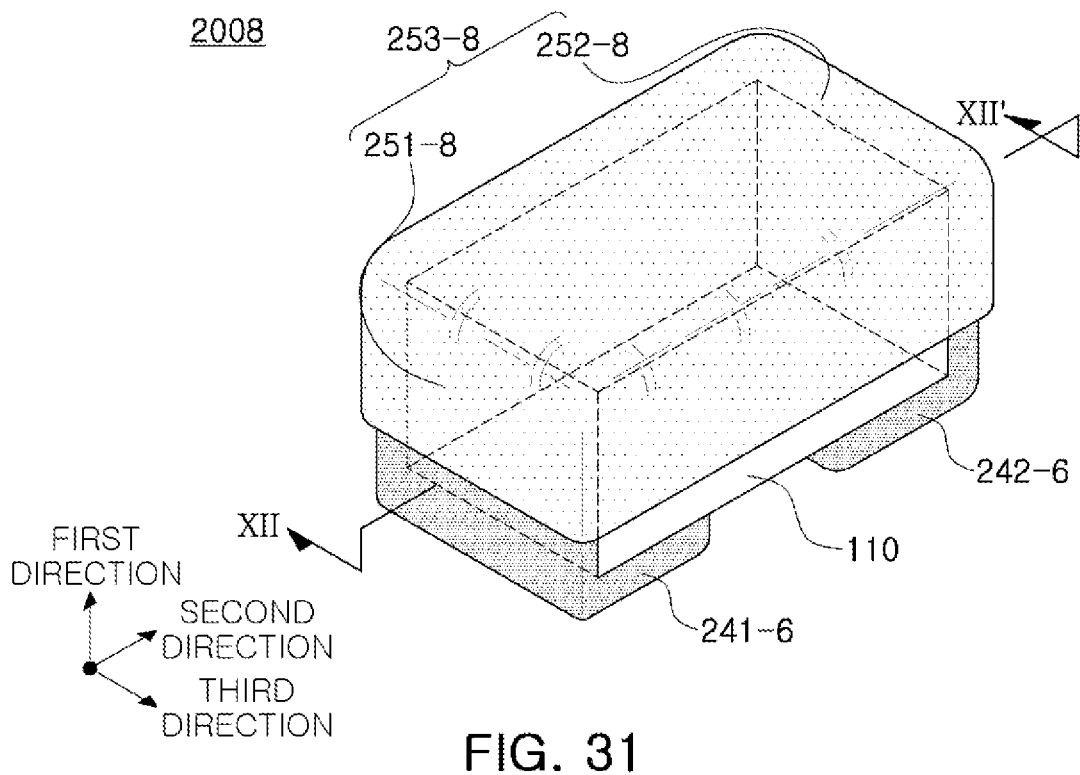
FIG. 31 is a perspective diagram illustrating a multilayer electronic component according to an example embodiment of the present disclosure.
Figure 32:
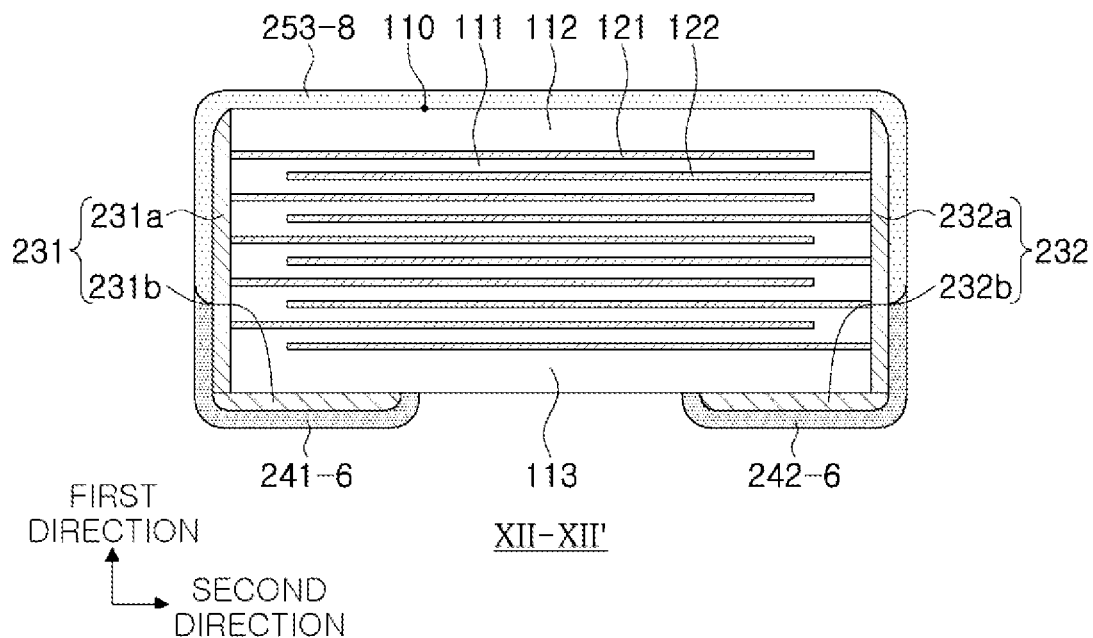
FIG. 32 is a cross-sectional diagram taken along line XII-XII' in FIG. 31.

FIG. 31 is a perspective diagram illustrating a multilayer electronic component according to an example embodiment. FIG. 32 is a cross-sectional diagram taken along line XII-XII' in FIG. 31.

In the multilayer electronic component 2008 in an example embodiment, the first and second insulating layers 251-8 and 252-8 may extend to the second, fifth and sixth surfaces 2, 5 and 6 and may be connected to each other such that the insulating layers may be connected as an integrated insulating layer 253-8. As illustrated in FIG. 30, the insulating layer 253-8 may cover an entirety of the second surface, and the fifth and sixth surfaces may partially cover the second surface.

Figure 33:
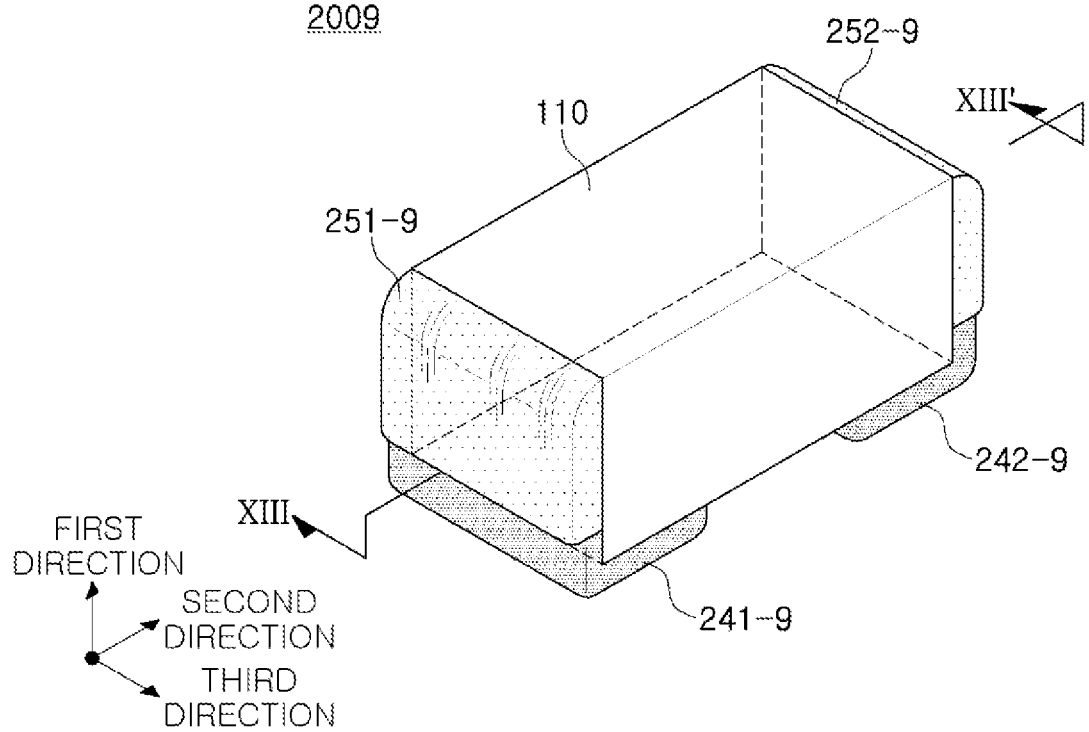
FIG. 33 is a perspective diagram illustrating a multilayer electronic component according to an example embodiment of the present disclosure.
Figure 34:
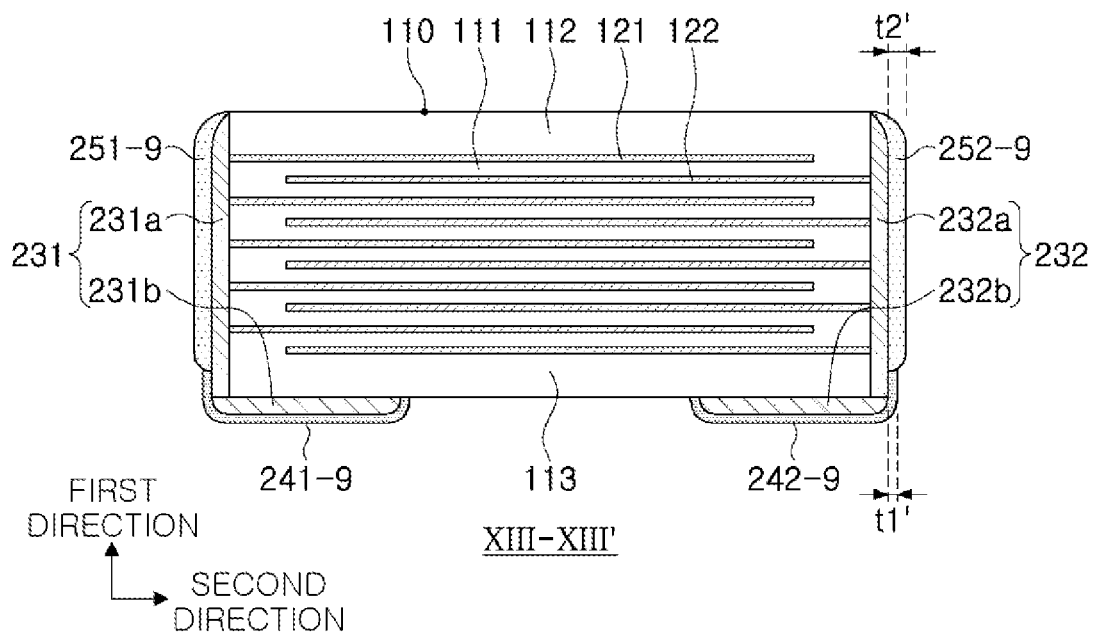
FIG. 34 is a cross-sectional diagram taken along line XIII-XIII' in FIG. 33.

FIG. 33 is a perspective diagram illustrating a multilayer electronic component 2009 according to an example embodiment. FIG. 34 is a cross-sectional diagram taken along line XIII-XIII' in FIG. 33.

Referring to FIGS. 33 and 34, an average thickness t1 of the first and second plating layers 241-9 and 242-9 of the multilayer electronic component 2009 in an example embodiment may be less than an average thickness t2 of the first and second insulating layers 251-9 and 252-9.

In an example embodiment, the average thickness t1 of the first and second plating layers 241-9 and 242-9 may be reduced to be less than the average thickness t2 of the first and second insulating layers 251-9 and 252-9 such that the contact area between the plating layer and the insulating layer may be reduced. Accordingly, delamination may be prevented and cohesion strength of the multilayer electronic component 2009 with the substrate 180 may improve.

The average thickness t1 of the first and second plating layers 241-9 and 242-9 may be an average value of thicknesses measured at five points, spaced apart by an equal distance, on the first and second plating layers 241-9 and 242-9 disposed on the first and second connection electrodes 231a and 232a, respectively, or disposed on the first and second band electrodes 231b and 232b, respectively. The average thickness t2 of the insulating layers 251-9 and 252-9 may be an average value of thicknesses measured at five points, spaced apart by an equal distance, on the insulating layers 251-9 and 252-9 disposed on the first and second connection electrodes 231a and 232a, respectively. For example, the measurements may be taken by scanning the cross-section of the body 110 using a scanning electron microscope (SEM). Other methods and/or tools appreciated by one of ordinary skill in the art, even if not described in the present disclosure, may also be used.

Figure 35:
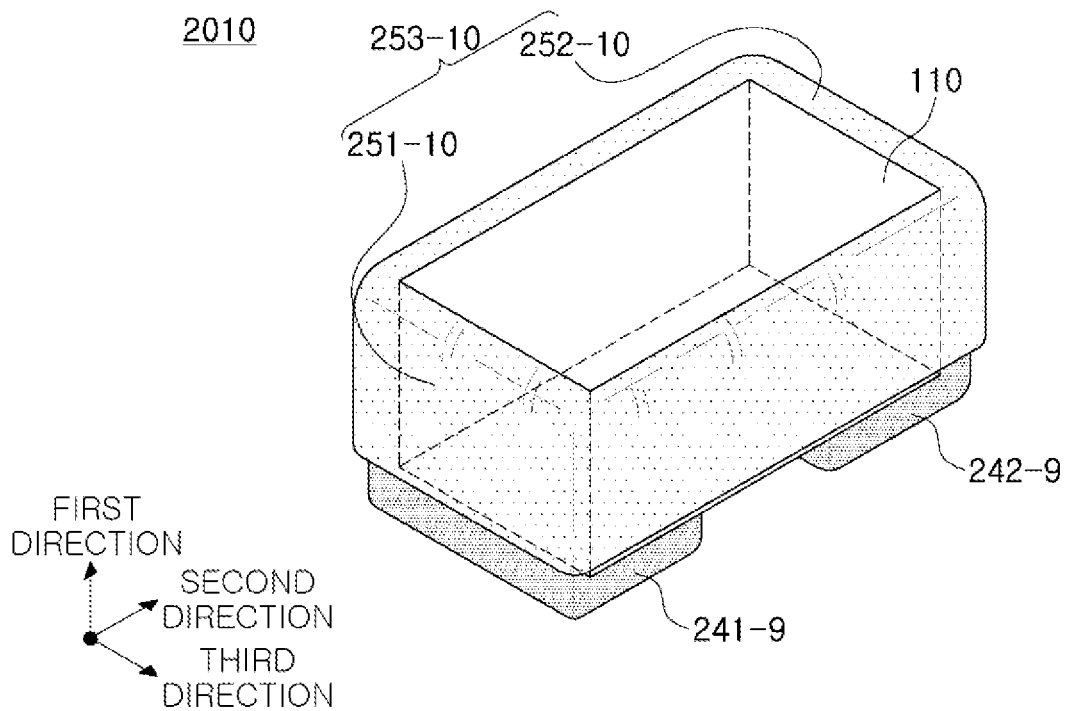
FIG. 35 is a diagram illustrating a modified example of the example in FIG. 33.

FIG. 35 is a diagram illustrating a modified example of the example in FIG. 33. Referring to FIG. 35, in the modified example 2010 of the multilayer electronic component 2009 in an example embodiment, the first and second insulating layers 251-10 and 252-10 may extend to the fifth and sixth surfaces 5 and 6 and may be connected to each other, such that the insulating layers may be connected as an integrated insulating layer 253-10.

Figure 36:
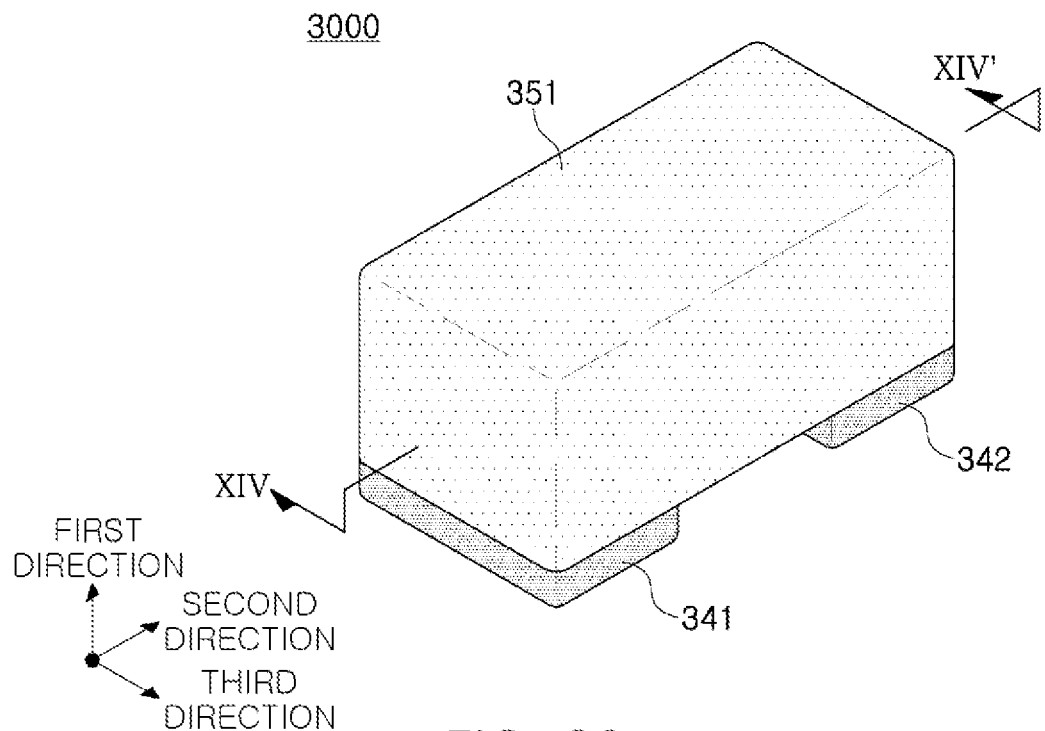
FIG. 36 is a perspective diagram illustrating a multilayer electronic component according to an example embodiment of the present disclosure.
Figure 37:
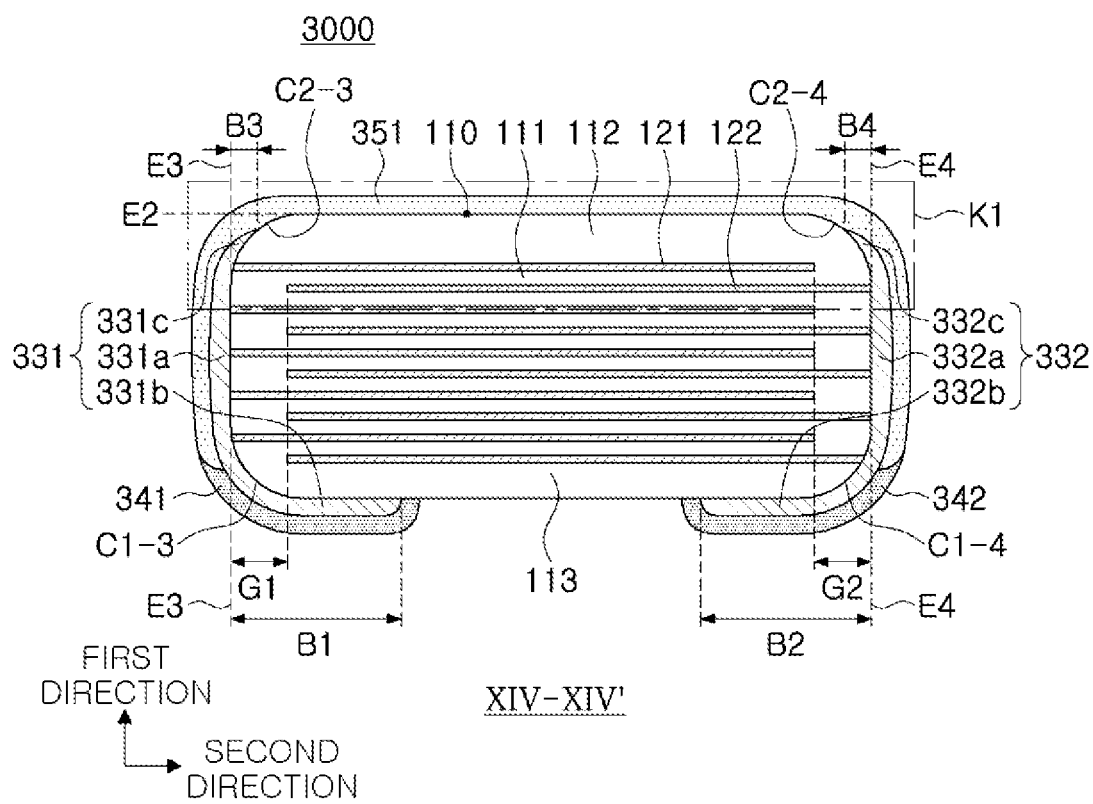
FIG. 37 is a cross-sectional diagram taken along line XIV-XIV' in FIG. 36.
Figure 38:
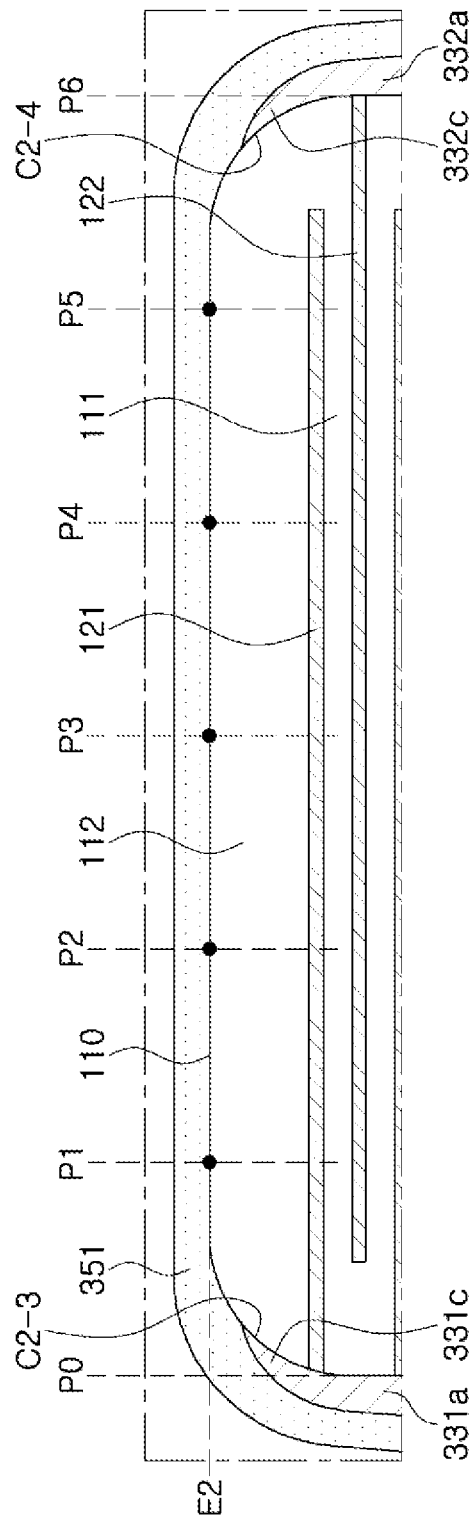
FIG. 38 is an enlarged diagram illustrating region K1 in FIG. 36.

FIG. 36 is a perspective diagram illustrating a multilayer electronic component 3000 according to an example embodiment. FIG. 37 is a cross-sectional diagram taken along line XIV-XIV' in FIG. 36. FIG. 38 is an enlarged diagram illustrating region K1 in FIG. 36.

Referring to FIGS. 36 to 42, in the multilayer electronic component 3000 in an example embodiment may include a dielectric layer 111 and first and second internal electrodes 121 and 122 alternately disposed with the dielectric layer interposed therebetween and may further include a body 110 including first and second surfaces 1 and 2 opposing each other in the first direction, third and fourth surfaces 3 and 4 connected to the first and second surfaces 1 and 2 and opposing in the second direction, and fifth and sixth surfaces 5 and 6 connected to the first and second surfaces 1 and 2 and the third and fourth surfaces 3 and 4 and opposing each other in the third direction; a first external electrode 331 including a first connection portion 331a disposed on the third surface of the body, a first band portion 331b extending from the first connection portion to a first portion of the first surface, and a first corner portion 331c extending from the first connection portion to a corner connecting the second and third surfaces of the body to each other; a second external electrode 332 including second connection portion 332a disposed on the fourth surface of the body, a second band portion 332b extending from the second connection portion to a second portion of the first surface, and a second corner portion 332c extending from the second connection portion to a corner connecting the second and fourth surfaces of the body to each other; an insulating layer 351 disposed on the first and second connection portions 331a and 332a and covering the second surface and the first and second corner portions; a first plating layer 341 disposed on the first band portion; and a second plating layer 342 disposed on the second band portion, wherein the first and second insulating layers may include an oxide including zirconium (Zr).

In an example embodiment, when an average distance in the second direction from an extension line of the third surface to an end of the first corner portion 331c is defined as B3, an average distance in the second direction from an extension line of the fourth surface to an end of the second corner portion 332c is defined as B4, the average size of the region in which the third surface and the second internal electrode are spaced apart from each other, taken in the second direction, is defined as G1, and an average size of the region in which the fourth surface and the first internal electrode are spaced apart from each other, taken in the second direction, is defined as G2, B3≤G1 and B4≤G2 may be satisfied. Accordingly, the volume occupied by the external electrodes 331 and 332 may be reduced, such that capacitance per unit volume of the multilayer electronic component 3000 may be increased.

In this case, when the average distance in the second direction from an extension line of the third surface to an end of the first band portion 331b is defined as B1, and the average distance from the extension line of the fourth surface to an end of the second band portion 332b is defined as B2, B1≥G1 and B3≥G2 may be satisfied. Accordingly, the area in contact with the solder during mounting may increase, such that cohesion strength may improve.

The multilayer electronic component 3000 according to an example embodiment may include a dielectric layer 111 and first and second internal electrodes 121 and 122 alternately disposed with the dielectric layer interposed therebetween, and may further include a body 110 including first and second surfaces 1 and 2 opposing each other in the first direction, third and fourth surfaces 3 and 4 connected to the first and second surfaces 1 and 2 and opposing in the second direction, and fifth and sixth surfaces 5 and 6 connected to the first and second surfaces 1 and 2 and the third and fourth surfaces 3 and 4 and opposing each other in the third direction. The body 110 of the multilayer electronic component 3000 may have the same configuration as that of the body of the multilayer electronic component 1000 other than the configuration in which the ends of the first or second surface of the body has a reduced shape.

The external electrodes 331 and 332 may be disposed on the third surface 3 and the fourth surface 4 of the body 110. The external electrodes 331 and 332 may include the first and second external electrodes 331 and 332 disposed on the third and fourth surfaces 3 and 4 of the body 110, respectively, and connected to the first and second internal electrodes 121 and 122, respectively.

The external electrodes 331 and 332 may include a first external electrode 331 including a first connection portion 331a disposed on a third surface, a first band portion 331b extending from the first connection portion to a first portion of the first surface, and a first corner portion 331c extending from the first connection portion to a corner connecting the second surface and the third surface to each other, and a second external electrode 132 including a second connection portion 332a disposed on the fourth surface, a second band portion 332b extending from the second connection portion to a second portion of the first surface, and a second corner portion 332c extending from the second connection portion to a corner connecting the second and fourth surfaces to each other. The first connection portion 331a may be connected to the first internal electrode 121 on the third surface, and the second connection portion 332a may be connected to the second internal electrode 122 on the fourth surface.

In an example embodiment, the first and second connection portions 331a and 332a may be spaced apart from the fifth and sixth surfaces. Accordingly, the volume of the external electrodes 331 and 332 may be reduced, thereby reducing the size of the multilayer electronic component 3000.

As the margin region in which the internal electrodes 121 and 122 is not disposed overlaps the dielectric layer 111, a step difference may be formed due to the thickness of the internal electrodes 121 and 122, such that the corner connecting the first surface to the third to sixth surfaces and/or the corner connecting the second surface to the third to sixth surfaces may have a reduced shape in a direction of a center of the body 110 in the first direction with respect to the first surface or the second surface. Alternatively, the corner connecting the first surface 1 to the third to sixth surfaces 3, 4, 5, 6 and/or the corner connecting the second surface 2 to the third to sixth surfaces 3, 4, 5, and 6 may have a reduced shape in a direction of a center of the body 110 in the first direction with respect to the first surface or the second surface. Alternatively, as a separate process is performed to round the corners connecting the surfaces of the body 110 to prevent chipping defects, the corners connecting the first and third to sixth surfaces and/or the corner connecting the second surface and the third to sixth surfaces may have a rounded shape.

The corner may include a 1-3 corner C1-3 connecting the first surface and the third surface, a 1-4 corner C1-4 connecting the first surface and the fourth surface, a 2-3 corner C2-3 connecting the second surface and the third surface, and a 2-4 corner C2-4 connecting the second surface and the fourth surface. Also, the corners may include a 1-5 corner connecting the first and fifth surfaces, a 1-6 corner connecting the first and sixth surfaces, a 2-5 corner connecting the second and fifth surfaces, and a 2-6 corner connecting the second surface and the sixth surface. However, to prevent the step difference due to the internal electrodes 121 and 122, after lamination, when the internal electrodes may be cut to be exposed to the fifth and sixth surfaces 5 and 6 of the body, and a single dielectric layer or two or more dielectric layers may be laminated on both side surfaces of the capacitance formation portion Ac in the third direction (the width direction) to form the margin portions 114 and 115, the portion connecting the first surface to the fifth and sixth surfaces and the portion connecting the second surface to the fifth and sixth surfaces may not have a reduced shape.

The first to sixth surfaces of the body 110 may be almost flat surfaces, and non-flat regions may be viewed as corners. Also, a region disposed on a corner among the external electrodes 131 and 132 may be viewed as a corner portion.

In this regard, the first and second corner portions 331c and 332c may be disposed below the extension line E2 of the second surface, and the first and second corner portions 331c and 332c may be spaced apart from the second surface. That is, since the external electrodes 331 and 332 are not disposed on the second surface, the volume occupied by the external electrodes 331 and 332 may be further reduced, thereby increasing capacitance per unit volume of the multilayer electronic component 3000. Also, the first corner portion 331c may be disposed on a portion of a 2-3 corner C2-3 connecting the third surface and the second surface, and the second corner portion 332c may be formed on a portion of the 2-4 corner C2-4 connecting the fourth surface and the second surface.

The extension line E2 of the second surface may be defined as below.

Seven linear lines PC, P1, P2, P3, P4, P5, P6, and P7 spaced apart by an equal distance in the thickness direction may be drawn in the length direction from the third surface to the fourth surface on the length-thickness cross-section (L-T cross-section) in a center in the width direction, and the line crossing the point at which P2 meets the second surface and the point at which P4 meets the second surface may be defined as the extension line E2 of the second surface.

The external electrodes 331 and 332 may be formed using any having electrical conductivity, such as metal, and a specific material may be determined in consideration of electrical properties and structural stability, and the external electrodes 331 and 332 may have a multilayer structure.

The external electrodes 331 and 332 may be a fired electrode including a conductive metal and glass, or a resin-based electrode including a conductive metal and a resin.

Also, the external electrodes 331 and 332 may have a form in which a plastic electrode and a resin-based electrode may be formed in order on the body. Also, the external electrodes 331 and 332 may be formed by transferring a sheet including the conductive metal to the body or by transferring a sheet including a conductive metal to the fired electrode.

As the conductive metal included in the external electrodes 331 and 332, a material having excellent electrical conductivity may be used, and the material is not limited to any particular example. For example, the conductive metal may be one or more of Cu, Ni, Pd, Ag, Sn, Cr, and alloys thereof. Preferably, the external electrodes 331 and 332 may include at least one of Ni and a Ni alloy, and accordingly, connectivity with the internal electrodes 121 and 122 including Ni may improve.

The insulating layer 351 may be disposed on the first and second connection portions 331a and 332a.

Since the first and second connection portions 331a and 332a may be connected to the internal electrodes 121 and 122, the first and second connection portions 331a and 332a may be paths for permeation of a plating solution in a plating process or moisture permeation during actual use. In the example embodiment, since the insulating layer 351 is disposed on the connection portions 331a and 332a, permeation of external moisture or a plating solution may be prevented.

The insulating layer 351 may be disposed to be in contact with the first and second plating layers 341 and 342. In this case, the insulating layer 351 may be in contact with the ends of the first and second plating layers 341 and 342 by partially covering the ends, or the first and second plating layers 341 and 342 351 may be in contact with the ends of the insulating layer 351 by partially covering the ends.

The insulating layer 353 may be disposed on the first and second connection portions 331a and 332a, and may be disposed to cover the second surface and the first and second corner portions 331c and 332c. Also, the insulating layer 351 may cover the region in which the ends of the first and second corner portions 331c and 332c are in contact with the body 110 and may block the moisture permeation path, thereby improving moisture resistance reliability.

The insulating layer 351 may be disposed on the second surface and may extend to the first and second connection portions 331a and 332a. Also, when the external electrodes 331 and 332 are not disposed on the second surface, the insulating layer may be disposed to entirely cover the second surface. The insulating layer 351 may not necessarily have to be disposed on the second surface, and the insulating layer may not be disposed on a portion or an entirety of the second surface, and the insulating layer may be divided into two regions and the two regions may be disposed on the first and second connection portions 331a and 332a, respectively. However, even in this case, the insulating layer may be disposed to entirely cover the first and second corner portions 331c and 332c. When the insulating layer is not disposed on an entirety of the second surface, the insulating layer may be disposed below an extension line of the second surface. Also, the insulating layer is not disposed on the second surface, and may extend from the first and second connection portions 331a and 332a to the fifth and sixth surfaces and may form an integrated insulating layer.

In an example embodiment, the insulating layer 351 may be disposed to cover portions of the fifth and sixth surfaces and may improve reliability. In this case, portions of the fifth and sixth surfaces not covered by the insulating layer may be exposed.

Further, the insulating layer 351 may be disposed to cover an entirety of the fifth and sixth surfaces, and in this case, the fifth and sixth surfaces may not be exposed, thereby improving moisture resistance reliability.

The insulating layer 351 may prevent the plating layers 341 and 342 from being formed on the external electrodes 331 and 332 on which the insulating layer 351 is disposed, and may improve sealing properties and may reduce permeation of moisture or a plating solution. The components, composition, average thickness, and effects of the insulating layer 351 may be the same as the insulating layers 151, 251, 252, and 253 included in the multilayer electronic components 1000 and 2000 and various embodiments thereof, and accordingly, the descriptions thereof will not be provided.

The first and second plating layers 341 and 342 may be disposed on the first and second band portions 331b and 332b, respectively. The plating layers 341 and 342 may improve mounting properties, and as the plating layers 341 and 342 are disposed on the band portions 331b and 332b, the mounting space may be reduced, and permeation of a plating solution into the internal electrode may be reduced, thereby improving reliability. One end of the first and second plating layers 341 and 342 may be in contact with the first surface, and the other end may be in contact with the insulating layer 351.

The type of the plating layers 341 and 342 is not limited to any particular example, and may be a plating layer including at least one of Cu, Ni, Sn, Ag, Au, Pd, and alloys thereof, and may include a plurality of layers.

For example, the plating layers 341 and 342 may be a Ni plating layer or a Sn plating layer, and a Ni plating layer and the Sn plating layer and the Ni plating layer may be formed in order on the first and second band portions 331b and 332b.

In an example embodiment, the insulating layer 351 may be disposed to be in direct contact with the first and second external electrodes 331 and 332, and the first and second external electrodes 331 and 332 may include a conductive metal and glass. Accordingly, since the plating layers 341 and 342 may not be disposed in the region in which the insulating layer 351 is disposed among the external surfaces of the first and second external electrodes 331 and 332, erosion of the external electrodes caused by the plating solution may be effectively prevented.

In an example embodiment, the insulating layer 351 may be disposed to be in direct contact with the first and second external electrodes 331 and 332, and the first and second external electrodes 331 and 332 may include a conductive metal and glass. Accordingly, since the plating layers 341 and 342 may not be disposed in the region in which the insulating layer 351 is disposed among the external surfaces of the first and second external electrodes 331 and 332, erosion of the external electrodes caused by the plating solution may be effectively prevented.

In an example embodiment, the first plating layer 341 may be disposed to cover an end of the insulating layer 351 disposed on the first external electrode 331, and the second plating layer 342 may be disposed to cover an end of the insulating layer 351 disposed on the second external electrode 332. Accordingly, bonding force between the insulating layer 351 and the plating layers 341 and 342 may be strengthened, such that reliability of the multilayer electronic component 3000 may improve. Also, by first forming the insulating layer 351 before forming the plating layers 241 and 242 on the external electrodes 331 and 332, permeation of the plating solution in the process of forming a plating layer may be reliably prevented. As the insulating layer is formed before the plating layer, the plating layers 341 and 342 may have a shape covering the end of the insulating layer 351.

In an example embodiment, the insulating layer 351 may be disposed to cover the end of the first plating layer 341 disposed on the first external electrode 331, and the insulating layer 352 may be disposed to cover an end of the second plating layer 342 disposed on the second external electrode 332. Accordingly, bonding force between the insulating layer 351 and the plating layers 341 and 342 may be strengthened, such that reliability of the multilayer electronic component 3000 may improve.

In an example embodiment, the first and second plating layers 341 and 342 may be extended to partially cover the first and second connection portions 331a and 332a, respectively. When an average distance in the first direction from the first surface 1 to an internal electrode disposed most adjacent (closest) to the first surface 1 among the internal electrodes 121 and 122 is defined as H1, and an average distance in the first direction from an extension line of the first surface 1 to ends of the plating layers 341 and 342 disposed on the first and second connection portions 331a and 332a is defined as H2, H1>H2 may be satisfied. Accordingly, permeation of the plating solution into the internal electrode during the plating process may be prevented, thereby improving reliability. In some embodiments, an average distance in the first direction from an extension line of the first surface 1 to an end of the first plating layer 341 disposed on the first connection portion 331a or to an end of the second plating layer 342 disposed on the second connection portion 332a is defined as H2.

In an example embodiment, when an average distance in the first direction from the first surface 1 to an internal electrode disposed most adjacent (closest) to the first surface 1 among the internal electrodes 121 and 122 is defined as H1, and an average distance in the first direction from an extension line of the first surface 1 to ends of the plating layers 341 and 342 disposed on the first and second connection portions 331a and 332a is defined as H2, H1<H2 may be satisfied. Accordingly, the area in contact with the solder during mounting may increase, thereby improving cohesion strength. More preferably, when the average size of the body 110 in the first direction is defined as T, H2<T/2 may be satisfied. That is, H1<H2<T/2 may be satisfied, which may be because, when H2 is T/2 or more, the effect of improving moisture resistance reliability by the insulating layer may degrade.

In an example embodiment, the first and second plating layers 341 and 342 may be disposed below an extension line of the first surface. Accordingly, the height of the solder may be reduced during mounting and the mounting space may be reduced. Also, the insulating layer 351 may extend to a region below the extension line of the first surface and may be in contact with the first and second plating layers 341 and 342.

In an example embodiment, the average size of the body in the second direction is defined as L, the average distance in the second direction from an extension line of the third surface to an end of the first band portion is defined as B1, the average size of the body in the second direction from an extension line of the fourth surface to an end of the second band portion is defined as B2, $0.2 \leq B1/L \leq 0.4$ and $0.2 \leq B2/L \leq 0.4$ may be satisfied.

When B1/L and B2/L are less than 0.2, it may be difficult to secure sufficient fixing strength. When B2/L is greater than 0.4, a leakage current may be generated between the first band portion 331b and the second band portion 332b under a high-voltage current, and the first band portion 331b and the second band portion 332b may be electrically connected due to plating spread.

In an example embodiment, an additional insulating layer disposed on the first surface and disposed between the first band portion 331b and the second band portion 332b may be further included. Accordingly, a leakage current which may occur between the first band portion 331b and the second band portion 332b under a high voltage current may be prevented.

The type of the additional insulating layer is not limited to any particular example. For example, the additional insulating layer may include the same component as those of the insulating layer 351. The additional insulating layer and the insulating layer 351 is not formed of the same material, but may be formed of different materials. For example, the additional insulating layer may include one or more selected from epoxy resin, acrylic resin, ethyl cellulose, and the like, or may include glass.

In an example embodiment, when the average distance in the second direction from an extension line of the third surface to an end of the first band portion is defined as B1, and the average distance in the second direction from an extension line of the fourth surface to an end of the second band portion is defined as B2, B3<B1 and B4<B2 may be satisfied. The average length B1 of the first band portion 331b may be longer than the average length B3 of the first corner portion 331c, and the average length of the second band portion 332b may be longer than the average length B4 of the second corner portion 332c. Accordingly, the region in contact with the solder during mounting may increase, thereby improving cohesion strength.

In greater detail, when the average distance in the second direction from an extension line of the third surface 3 to an end of the first band portion 331b is defined as B1, the average distance in the second direction from an extension line of the fourth surface 4 to an end of the second band portion 332b is defined as B2, the average distance in the second direction from an extension line of the third surface 3 to an end of the first corner portion 331c is defined as B3, and the average distance in the second direction from an extension line of the fourth surface 4 to an end of the second corner portion 332c is defined as B4, B3<B1 and B4<B2 may be satisfied.

In an example embodiment, an average thickness of the first and second plating layers 341 and 342 may be less than an average thickness of the insulating layer 351.

The insulating layer 351 may prevent permeation of external moisture or the plating solution, but connectivity with the plating layers 341 and 342 may be relatively weak, which may cause delamination of the plating layer. When the plating layer is delaminated, cohesion strength with the substrate may be reduced. Here, the delamination of the plating layer may refer to separation of a portion of the plating layer or physical separation of the plating layer from the external electrodes 331 and 332. Since the connection between the plated layer and the insulating layer is relatively weak, it may be highly likely that a gap between the insulating layer and the plated layer may be widened or foreign substances may enter, and the possibility of delamination may increase due to vulnerability to external impacts.

In an example embodiment, by reducing the average thickness of the plated layer to be less than the average thickness of the insulating layer, the contact area between the plated layer and the insulating layer may be reduced, thereby preventing delamination and improving cohesion strength of the multilayer electronic component 3000 with the substrate.

The size of the multilayer electronic component 3000 is not limited to any particular example.

However, to obtain both miniaturization and high capacitance, it may be necessary to increase the number of laminated layers by reducing the thicknesses of the dielectric layer and the internal electrode, and accordingly, in the multilayer electronic component 3000 having a size of 1005 (length×width, 1.0 mm×0.5 mm) or less, the effect of improving reliability and capacitance per unit volume in the example embodiment may be distinct.

Accordingly, when manufacturing errors, external electrode sizes, or the like are considered, and when the length of the multilayer electronic component 3000 is 1.1 mm or less and the width is 0.55 mm or less, the effect of improving reliability in the example embodiment may be distinct. Here, the length of the multilayer electronic component 3000 may refer to the maximum size of the multilayer electronic component 3000 in the second direction, and the width of the multilayer electronic component 3000 may refer to the maximum size of the multilayer electronic component 3000 in the third direction. For example, the measurements may be taken by scanning the multilayer electronic component 3000 using an optical microscope (SEM). Other methods and/or tools appreciated by one of ordinary skill in the art, even if not described in the present disclosure, may also be used.

According to the aforementioned example embodiments, by disposing an insulating layer on the connection portion of the external electrode and a plating layer on the band portion of the external electrode, capacitance per unit volume of the multilayer electronic component may improve and reliability may improve.

Also, a mounting space of the multilayer electronic component may be reduced.

Also, as in the insulating layer includes glass and oxide including aluminum (Al), moisture resistance reliability and acid resistance against a plating solution may improve, and cracks may be prevented.

While example embodiments have been illustrated and described above, it will be apparent to those skilled in the art that modifications and variations could be made without departing from the scope in the example embodiment as defined by the appended claims.

What is claimed is:

1. A multilayer electronic component, comprising:
a body including a dielectric layer and first and second internal electrodes alternately disposed while having the dielectric layer interposed therebetween, and including first and second surfaces opposing each other in a first direction, third and fourth surfaces connected to the first and second surfaces and opposing each other in a second direction, and fifth and sixth surfaces connected to the first to fourth surfaces and opposing each other in a third direction;
a first external electrode including a first connection portion disposed on the third surface and a first band portion extended from the first connection portion onto a portion of the first surface;
a second external electrode including a second connection portion disposed on the fourth surface and a second band portion extended from the second connection portion onto a portion of the first surface;
a first insulating layer disposed on the first connection portion;
a second insulating layer disposed on the second connection portion;
a first plating layer disposed on the first band portion; and
a second plating layer disposed on the second band portion,
wherein the first and second insulating layers include an oxide including zirconium (Zr), and
wherein the first and second insulating layers further include one or more of Mg, Ca, or oxides thereof.

2. The multilayer electronic component of claim 1, wherein an average thickness of the insulating layer is greater than 20 nm and equal to or less than 1000 nm.

3. The multilayer electronic component of claim 1, wherein an average thickness of the insulating layer is 50 nm or more and 1000 nm or less.

4. The multilayer electronic component of claim 1, wherein an average thickness of the insulating layer is greater than 400 nm and equal to or less than 1000 nm.

5. The multilayer electronic component of claim 1, wherein the first oxide including zirconium (Zr) is $ZrO_2$.

6. The multilayer electronic component of claim 1, wherein the dielectric layer is substantially free of yttrium (Y).

7. The multilayer electronic component of claim 1, wherein the first and second insulating layers are substantially free of yttrium (Y).

8. The multilayer electronic component of claim 1, wherein, among elements present in the first and second insulating layers, a number of moles of zirconium (Zr) element based on a total number of moles of elements other than oxygen is 0.95 or more.

9. The multilayer electronic component of claim 1, wherein $H1>H2$ in which H1 indicates an average size of a region in the first direction, measured from the first surface to an internal electrode disposed closest to the first surface among the first and second internal electrodes, and H2 indicates an average size of the first or second plating layer in the first direction, measured from an extension line of the first surface to an end of the first or second plating layer disposed on the first or second connection portion.

10. The multilayer electronic component of claim 1, wherein $H1<H2$ in which H1 indicates an average size of a region in the first direction, measured from the first surface to an internal electrode disposed closest to the first surface among the first and second internal electrodes, and H2 indicates an average size of the first or second plating layer in the first direction, measured from an extension line of the first surface to an end of the first or second plating layer disposed on the first or second connection portion.

11. The multilayer electronic component of claim 10, wherein $H2<T/2$ in which T indicates an average size of the body in the first direction.

12. The multilayer electronic component of claim 1, wherein the first and second plating layers are disposed below an extension line of the first surface.

13. The multilayer electronic component of claim 1, wherein, an average size of the body in the second direction is defined as L, an average distance in the second direction from an extension line of the third surface to an end of the first band portion is defined as B1, an average distance in the second direction from an extension line of the fourth surface to an end of the second band portion is defined as B2, and $0.2 \leq B1/L \leq 0.4$ and $0.2 \leq B2/L \leq 0.4$ are satisfied.

14. The multilayer electronic component of claim 1, further comprising:

an additional insulating layer disposed on the first surface and disposed between the first band portion and the second band portion.

15. The multilayer electronic component of claim 1, wherein an average thickness of the dielectric layer is 0.35 m or less.

16. The multilayer electronic component of claim 1, wherein an average thickness of the first and second internal electrodes is 0.35 m or less.

17. The multilayer electronic component of claim 1, further comprising:
 a capacitance formation portion including the first and second internal electrodes alternately disposed with the dielectric layer interposed therebetween and a cover portion disposed on both end surfaces of the capacitance formation portion in the first direction,
 wherein an average size of the cover portion in the first direction is 15 m or less.

18. The multilayer electronic component of claim 1, wherein an average thickness of the first and second plating layers is less than an average thickness of the first and second insulating layers.

19. The multilayer electronic component of claim 1, wherein the first plating layer is disposed to cover one end close to the first surface of the first insulating layer, and the second plating layer is disposed to cover another end close to the first surface of the second insulating layer.

20. The multilayer electronic component of claim 1, wherein the first insulating layer is disposed to cover an end disposed on said first external electrode of the first plating layer, and the second insulating layer is disposed to cover another end disposed on the second outer electrode of the second plating layer.

21. The multilayer electronic component of claim 1, wherein the first external electrode further includes a first side band portion extending from the first connection portion to portions of the fifth and sixth surfaces and the second external electrode further includes a second side band portion extending from the second connection portion to portions of the fifth and sixth surfaces, and
 wherein the sizes of the first and second side band portions in the second direction may gradually increase toward the first surface.

22. The multilayer electronic component of claim 1, wherein the first and second external electrodes are spaced apart from the fifth and sixth surfaces.

23. The multilayer electronic component of claim 1, wherein the first and second external electrodes are spaced apart from the second surfaces.

24. The multilayer electronic component of claim 1, wherein the first and second insulating layers are disposed to extend from the first and second connection portions onto the second surface.

25. The multilayer electronic component of claim 1, wherein the first and second insulating layers are disposed to extend from the first and second connection portions onto the fifth and sixth surface.

26. The multilayer electronic component of claim 1, wherein the first and second insulating layer are not disposed on the second, fifth and sixth surfaces.

27. The multilayer electronic component of claim 1, wherein the first external electrode further includes a third band portion extending from the first connection portion to a portion of the second surface, and the second external electrode further includes a fourth band portion extending from the second connection portion to a portion of the second surface.

28. The multilayer electronic component of claim 1, wherein the body includes a 1-3 corner connecting the first surface to the third surface, a 1-4 corner connecting the first surface to the fourth surface, a 2-3 corner connecting the second surface to the third surface, and a 2-4 corner connecting the second surface to the fourth surface,
 wherein the 1-3 corner and the 2-3 corner have a form reducing in a direction of a center of the body taken in the first direction toward the third surface, and the 1-4 corner and the 2-4 corner have a form reducing in a direction of the center of the body taken in the first direction toward the fourth surface, and
 wherein the first external electrode includes a corner portion disposed on the 1-3 corner and a corner portion extending from the first connection portion to the 2-3 corner, and the second external electrode includes a corner portion disposed on the 1-4 corner and a corner portion extending from the second connection portion to the 2-4 corner.

29. The multilayer electronic component of claim 28, wherein $B3 \leq G1$ and $B4 \leq G2$ are satisfied, in which B3 is an average distance in the second direction from an extension line of the third surface to an end of the first corner portion, B4 is an average distance in the second direction from an extension line of the fourth surface to an end of the second corner portion, G1 is an average size of a region in which the third surface and the second internal electrode are spaced apart from each other, taken in the second direction, and G2 is an average size of a region in which the fourth surface and the first internal electrode are spaced apart from each other, taken in the second direction.

30. The multilayer electronic component of claim 1, wherein the first external electrode includes a first connection electrode disposed on the third surface and a first band electrode disposed on the first surface and connected to the first connection electrode, and
 wherein the second external electrode includes a second connection electrode disposed on the fourth surface and a second band electrode disposed on the first surface and connected to the second connection electrode.

31. The multilayer electronic component of claim 30, wherein the first and second connection electrodes are spaced apart from the fifth and sixth surfaces.

32. The multilayer electronic component of claim 30, wherein the first and second connection electrodes are spaced apart from the second surfaces.

33. The multilayer electronic component of claim 20, wherein the first external electrode further includes a third band electrode disposed on the second surface and connected to the first connection electrode, and the second external electrode further includes a fourth band electrode disposed on the second surface and connected to the second connection electrode.

34. The multilayer electronic component of claim 30, wherein the first connection electrode and the second connection electrode include the same metal as a metal included in the first and second internal electrodes.

35. The multilayer electronic component of claim 30, wherein the first connection electrode and the second connection electrode include fired electrodes including a conductive metal and glass.

36. The multilayer electronic component of claim 30, wherein the first band electrode and the second band electrode are fired electrodes including a conductive metal and glass.

37. The multilayer electronic component of claim 30, wherein the first connection electrode and the second connection electrode include plating layers.

38. The multilayer electronic component of claim 30, wherein the first band electrode and the second band electrode include plating layers.

39. The multilayer electronic component of claim 1, wherein the first and second insulating layers include Ca or an oxide thereof.

* * * * *